(12) United States Patent
Nishiguchi et al.

(10) Patent No.: US 12,511,126 B2
(45) Date of Patent: Dec. 30, 2025

(54) DATA PROCESSING SYSTEM, DATA PROCESSING METHOD, AND DATA PROCESSING PROGRAM

(71) Applicant: FUJITSU LIMITED, Kawasaki (JP)

(72) Inventors: Yuki Nishiguchi, Kawasaki (JP); Yasuhiko Kanemasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 782 days.

(21) Appl. No.: 17/828,785

(22) Filed: May 31, 2022

(65) Prior Publication Data
US 2022/0405103 A1    Dec. 22, 2022

(30) Foreign Application Priority Data
Jun. 16, 2021    (JP) .................................. 2021-100356

(51) Int. Cl.
G06F 9/38    (2018.01)
G06F 9/48    (2006.01)
G06F 9/50    (2006.01)

(52) U.S. Cl.
CPC .......... *G06F 9/3851* (2013.01); *G06F 9/4862* (2013.01); *G06F 9/5038* (2013.01)

(58) Field of Classification Search
CPC ...... G06F 9/4881; G06F 16/285; G06F 3/067; G06F 9/3851; G06F 9/5038
See application file for complete search history.

(56) References Cited

U.S. PATENT DOCUMENTS 11,647,095 B1 *   5/2023   Barsade .............. G06F 16/9574
                                                   709/217
2006/0059251 A1 *  3/2006   Cunha ................. H04L 67/1017
                                                   709/223

(Continued)

FOREIGN PATENT DOCUMENTS

JP     2019-535058 A    12/2019
WO     WO 2018/053343 A1    3/2018

OTHER PUBLICATIONS

Quoc-Cuong To et al.; "A Survey of State-Management in Big Data Processing Systems"; received Sep. 26, 2017; VLDB Journal (2018) 27:847-872; Springer Nature 2018; (26 pages).

(Continued)

*Primary Examiner* — Lewis A Bullock, Jr.
*Assistant Examiner* — Carlos Alberto Espana
(74) *Attorney, Agent, or Firm* — STAAS & HALSEY LLP

(57) ABSTRACT

A data processing system comprising: a first information processing device and a second information processing device, the second information processing device including: a second memory; and a second processor coupled to the second memory and the second processor configured to: convert a first identifier included in a first processing request from the first information processing device into a reversibly convertible first conversion identifier in response to receiving the first processing request; transmit the first processing request including the converted first conversion identifier to another information processing system; reconvert, in response to receiving a first execution result of a process corresponding to the first processing request, the first conversion identifier included in the first execution result into the first identifier; and transmit the first execution result (Continued)

including the reconverted first identifier and the first conversion identifier to the first information processing device.

10 Claims, 46 Drawing Sheets

(56) References Cited

U.S. PATENT DOCUMENTS

| | | | |
|---|---|---|---|
| 2016/0196188 A1* | 7/2016 | Castellanos | G06F 11/1438 |
| | | | 714/19 |
| 2018/0121298 A1 | 5/2018 | Johnson et al. | |
| 2019/0230190 A1* | 7/2019 | Noguchi | H04L 67/60 |
| 2021/0266415 A1* | 8/2021 | Kawaguti | H04N 1/00212 |

OTHER PUBLICATIONS

Spark Streaming Programming Guide; "The Wayback Machine—http://web/archive.org/web/20210506163335/http://spark.apache.org/docs/latest/streaming-programming-guide.html"; downloaded Sep. 29, 2022; (20 pages).

Extended European Search Report dated Oct. 10, 2022 in corresponding European Patent Application No. 22176405.3 (13 pages).

* cited by examiner

FIG. 23
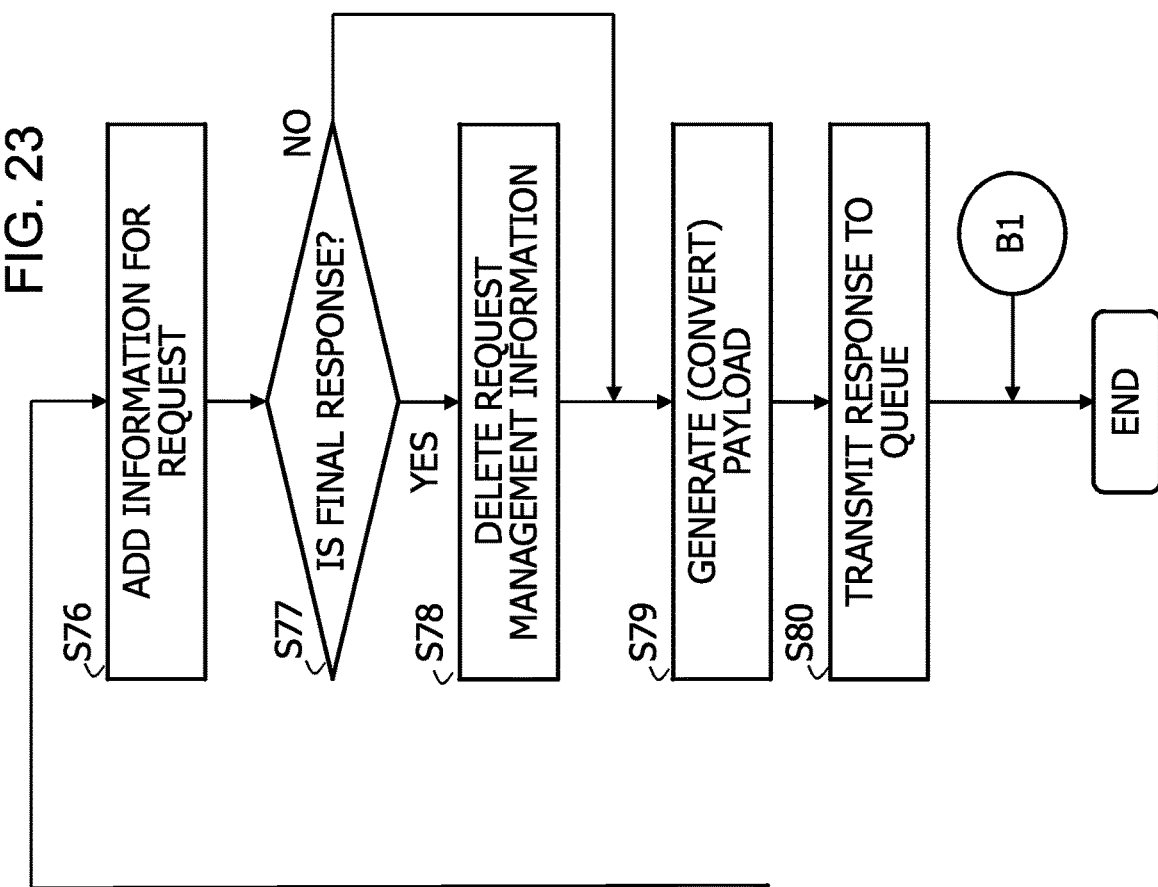
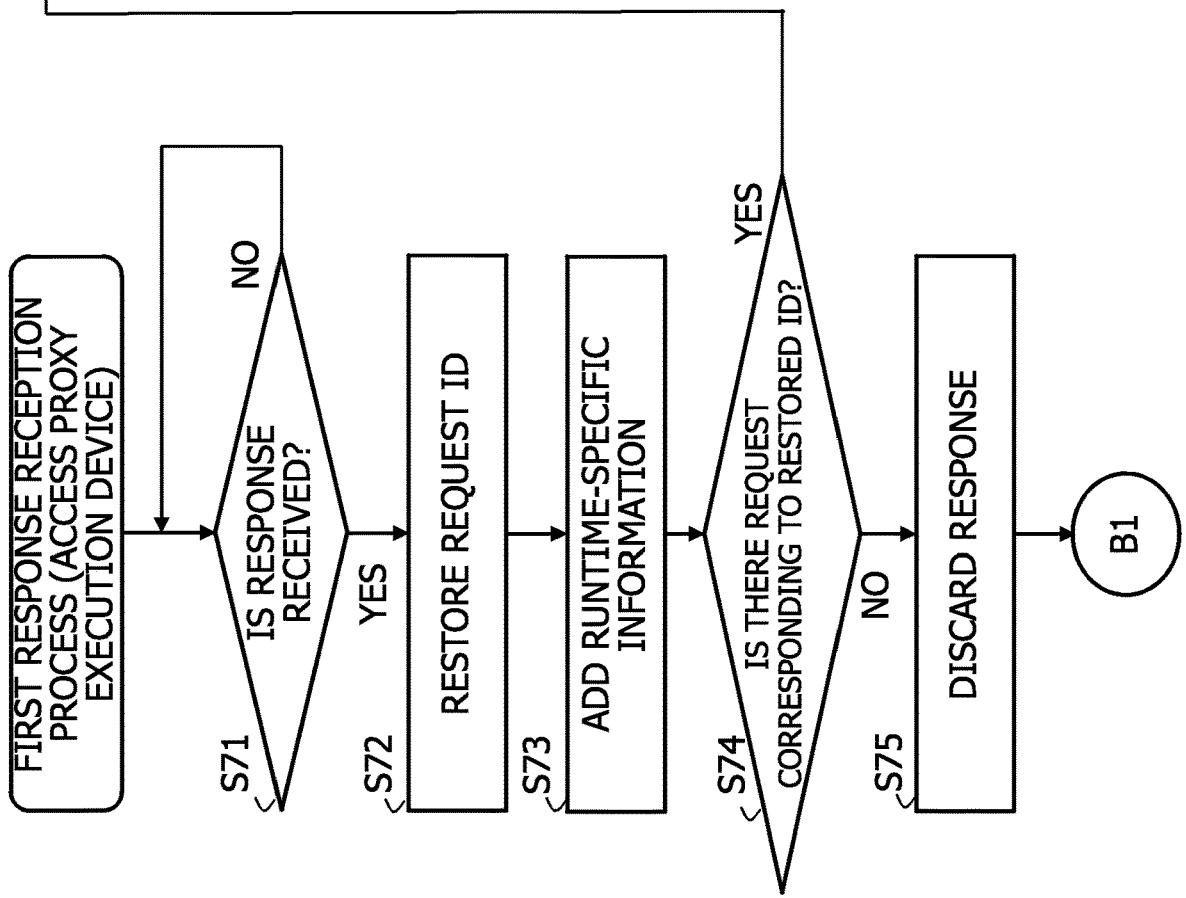

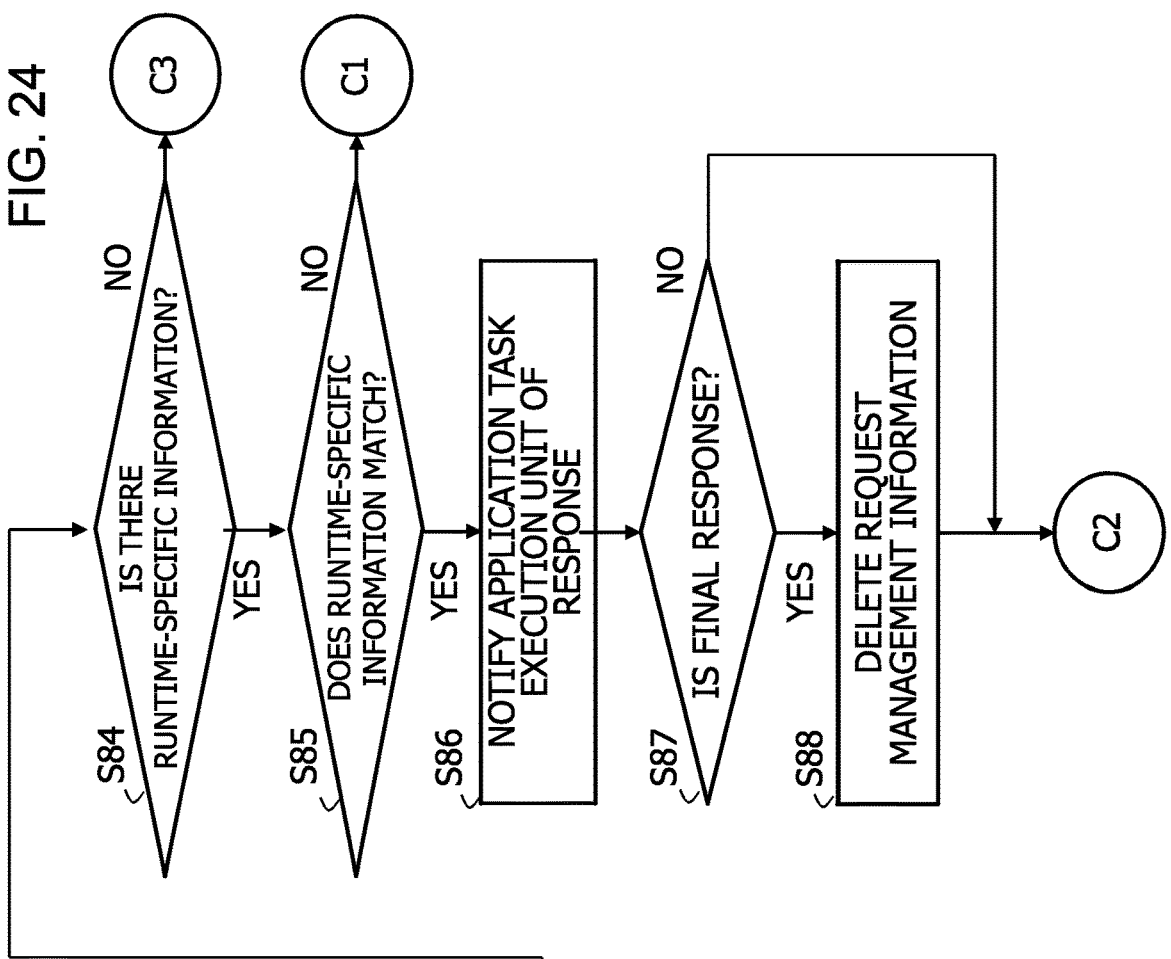
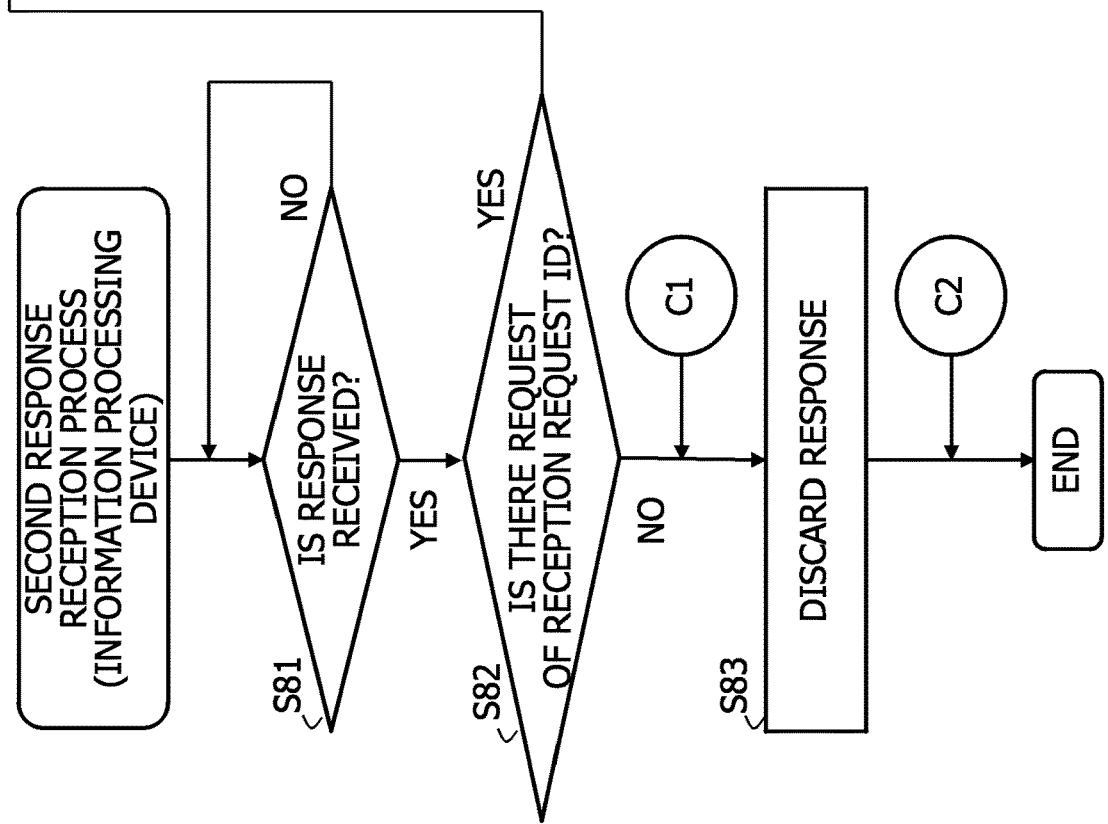
FIG. 24

FIG. 26A

SPECIFIC EXAMPLE OF REQUEST MANAGEMENT INFORMATION 131

| REQUEST ID | e4fde84d-eedc-3500-a9a0-000000000000 |
|---|---|
| TIME STAMP | 1614593910 |
| TIMEOUT TIME | 1614594510 |

FIG. 26B

SPECIFIC EXAMPLE OF REQUEST MANAGEMENT INFORMATION 231

| REQUEST ID | e4fde84d-eedc-3500-a9a0-000000000000 |
|---|---|
| TIME STAMP | 1614593910 |
| TIMEOUT TIME | 1614594510 |

FIG. 26C

SPECIFIC EXAMPLE OF REQUEST MANAGEMENT INFORMATION 131

| REQUEST ID | e4fde84d-eedc-3500-a9a0-000000000000 |
|---|---|
| TIME STAMP | 1614593910 |
| TIMEOUT TIME | 1614594510 |
| RUNTIME-SPECIFIC INFORMATION | 1614593916 |

FIG. 27A

REQUEST RQ1 (INFORMATION PROCESSING DEVICE
→ ACCESS PROXY EXECUTION DEVICE)

```
{
  "stage":0,
  "requestId":"e4fde84d-eedc-3500-a9a0-000000000000",
  "oid":"car001",
  "type":"ServiceRequest",
  "serviceId":"maintenanceCentre",
  "payload":{
    "command": "getLastMaintenanceInfo"
  },
  "eventTime":1614594510128
}
```

FIG. 27B

REQUEST RQ2 (ACCESS PROXY EXECUTION DEVICE
→ EXTERNAL SYSTEM)

```
{
  "serviceId":"maintenanceCentre",
  "requestId":"e4fde84d-eedc-3500-a9a1-614594510764",
  "command":{
    "command":"getLastMaintenanceInfo",
    "carId":"car001"
  },
  "timeout": 10000
}
```

RESPONSE RS1 (EXTERNAL SYSTEM → ACCESS PROXY EXECUTION DEVICE)

```
{
  "requestId":"e4fde84d-eedc-3500-a9a1-6145945107 64",
  "payload":{
    "date": "2020-06-10",
    "place": "Yokohama",
    "status": 1
  },
  "hasNext":false
}
```

FIG. 28A

RESPONSE RS2 (ACCESS PROXY EXECUTION DEVICE → INFORMATION PROCESSING DEVICE)

```
{
  "serviceId":"maintenanceCentre",
  "requestId":"e4fde84d-eedc-3500-a9a0-000000000000",
  "payload":{
    "date": "2020-06-10",
    "place": "Yokohama",
    "status": 1
  },
  "oid":"car001",
  "stage":0,
  "eventTime":1614594510128,
  "hasNext":false,
  "acceptedTime": 1614594510764
}
```

FIG. 28B

FIG. 31
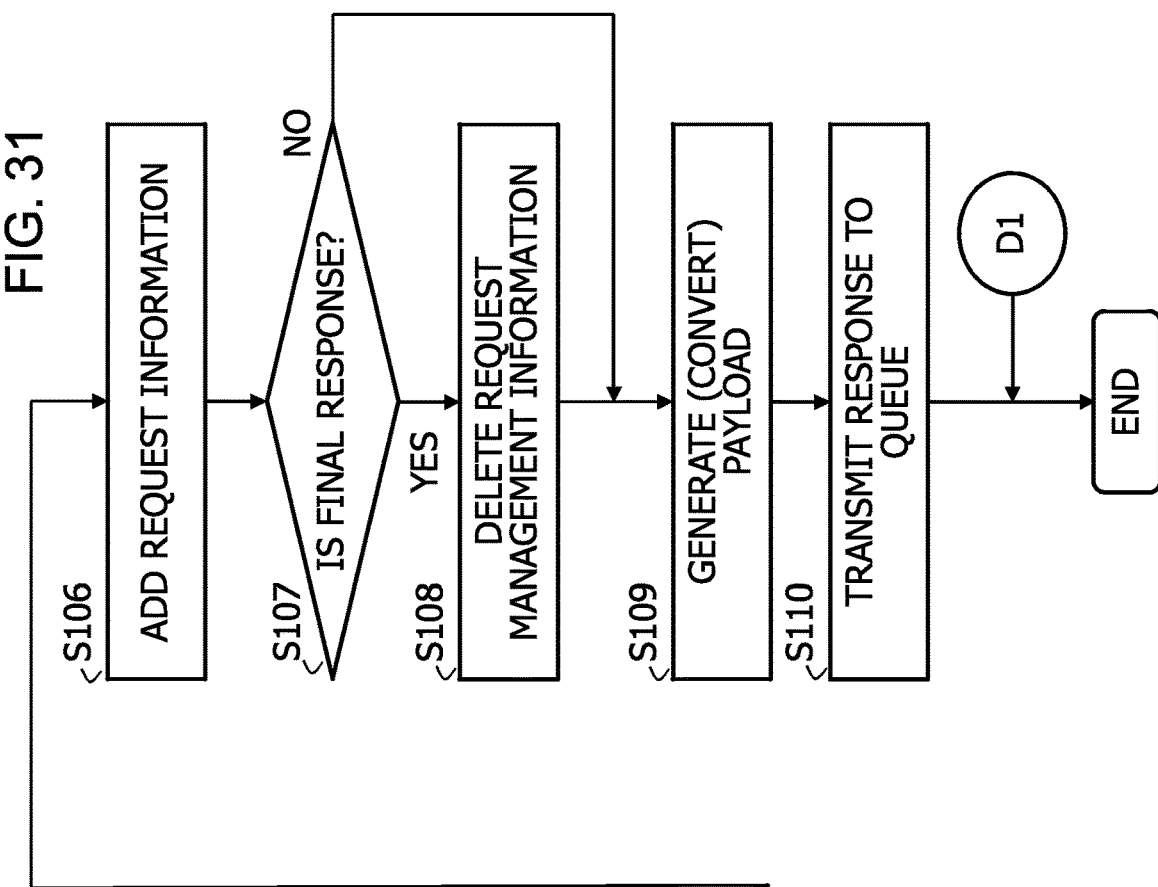
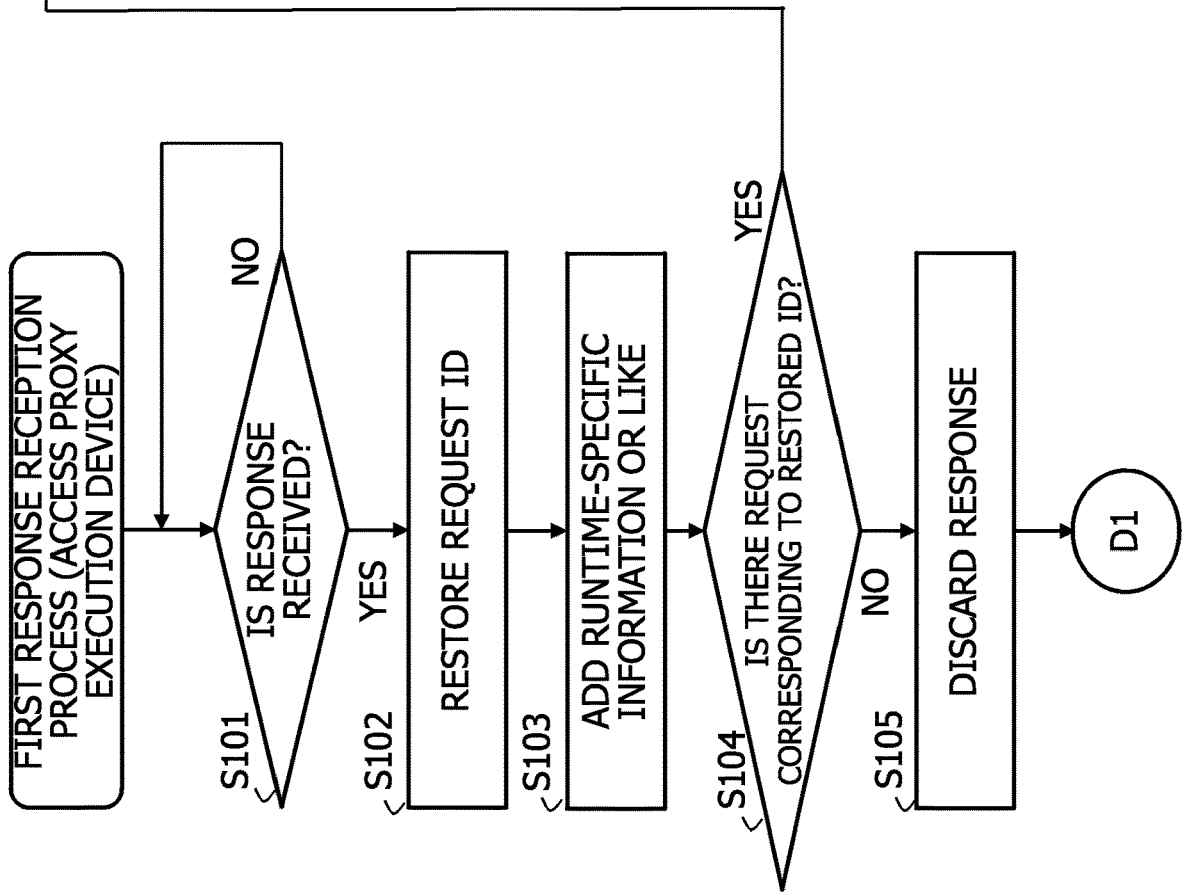

FIG. 35

SPECIFIC EXAMPLE OF REQUEST MANAGEMENT INFORMATION 131

| REQUEST ID | e4fde84d-eedc-3500-a9a0-000000000000 |
|---|---|
| TIME STAMP | 1614593910 |
| TIMEOUT TIME | 1614594510 |
| RUNTIME-SPECIFIC INFORMATION | 1614593916 |
| RESPONSE-SPECIFIC INFORMATION | 34 |

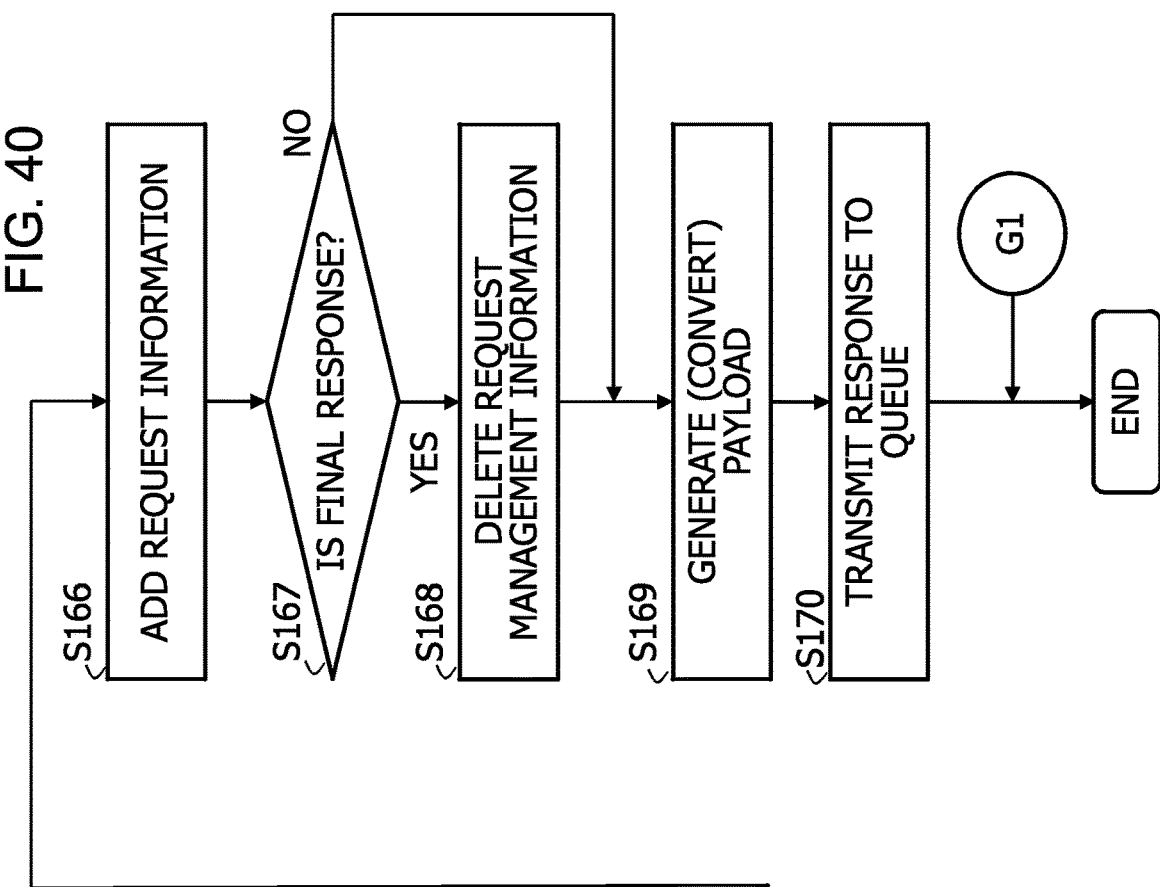
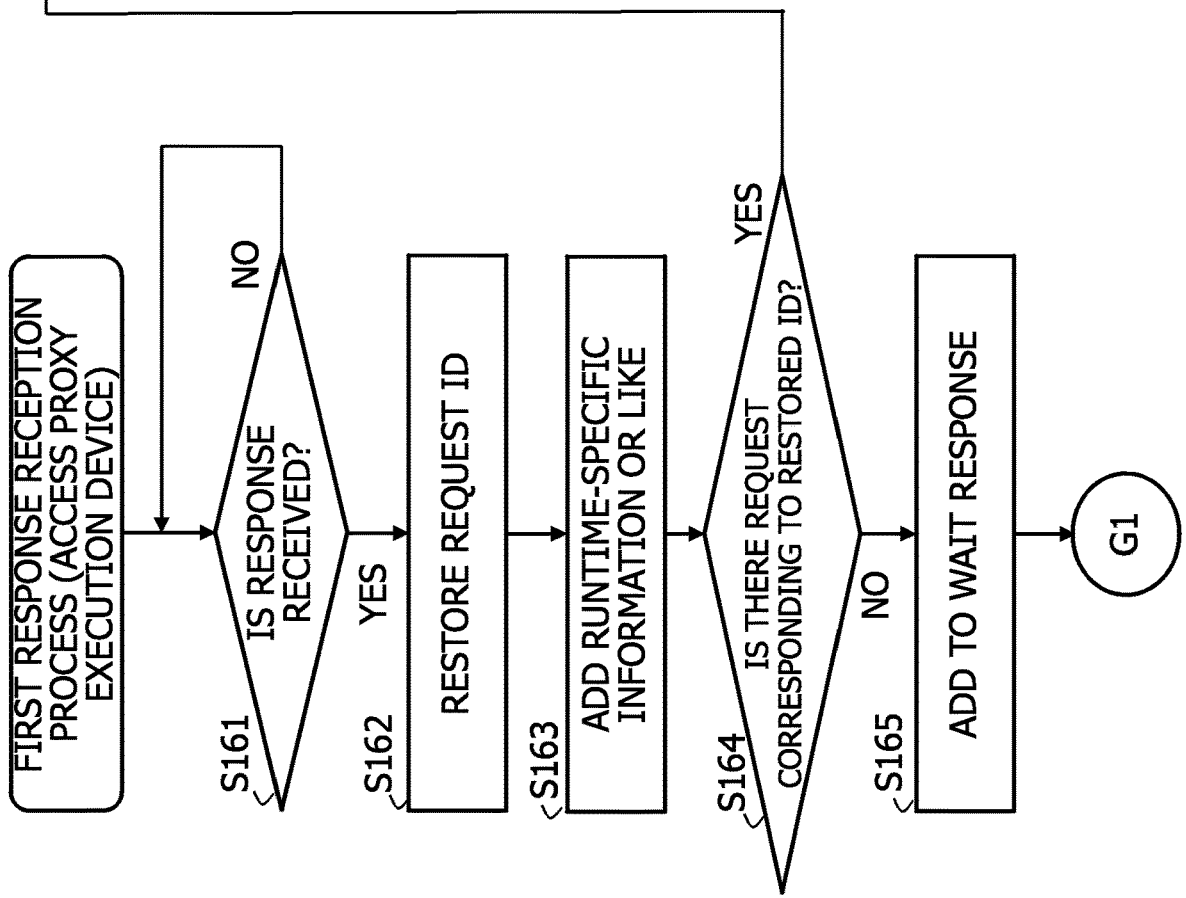

FIG. 46

REQUEST ID INFORMATION 232

| REQUEST ID | b0db6333-6196-4a76-ab0a-ced4d6dd9593, 7fc986ee-49b4-4c31-b09b-2ca0ba1df969 |
|---|---|

DATA PROCESSING SYSTEM, DATA PROCESSING METHOD, AND DATA PROCESSING PROGRAM

CROSS-REFERENCE TO RELATED APPLICATION

This application is based upon and claims the benefit of priority of the prior Japanese Patent Application No. 2021-100356, filed on Jun. 16, 2021, the entire contents of which are incorporated herein by reference.

FIELD

The present invention relates to a data processing system, a data processing method, and a data processing program.

BACKGROUND

In recent years, a stream processing system has been used in which a plurality of tasks (task programs) are sequentially executed and output for Internet of Things (IoT) data received from a plurality of sensors and the like.

In such a stream processing system, for instance, when there is a need during execution of a task for IoT data (hereinafter simply referred to as data), a processing request (hereinafter referred to as a request) is transmitted to another information processing system (hereinafter referred to as an external system or a specific information processing system). Then, in an external system, in this case, a process corresponding to the received request is executed, and the process result (hereinafter referred to as a response) is transmitted to the stream processing system. Then, in the stream processing system, the response received from the external system is processed in the task (for instance, refer to Japanese Translation of PCT Application No. 2019-535058).

SUMMARY

According to an aspect of the embodiments, a data processing system comprises: a first information processing device including: a first memory; and a first processor coupled to the first memory and the first processor configured to: execute, in response to receiving data to be processed, a task for the received data; and when a process of performing a first processing request for another information processing system is executed as the task for the data is executed, transmit the first processing request to a second information processing device, and the second information processing device including: a second memory; and a second processor coupled to the second memory and the second processor configured to: convert a first identifier included in the first processing request into a reversibly convertible first conversion identifier in response to receiving the first processing request; transmit the first processing request including the converted first conversion identifier to the other information processing system; reconvert, in response to receiving a first execution result of the process corresponding to the first processing request, the first conversion identifier included in the first execution result into the first identifier; and transmit the first execution result including the reconverted first identifier and the first conversion identifier to the first information processing device.

According to one aspect, it is possible to prevent the occurrence of inconsistency in a response transmitted from an external system.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 to FIG. 25 are flowcharts illustrating details of the stream data process according to the first embodiment.

FIG. 26A, FIG. 26B and FIG. 26C are diagrams illustrating specific examples of the request management information 131 and the request management information 231.

FIG. 27A and FIG. 27B illustrate diagrams explaining specific examples of requests.

FIG. 28A and FIG. 28B illustrate diagrams explaining specific examples of responses.

FIG. 31 to FIG. 34 are flowcharts illustrating details of the stream data process according to the second embodiment.

FIG. 35 is a diagram illustrating specific examples of the request management information 131.

FIG. 38 to FIG. 41 are flowcharts illustrating details of the stream data process according to the third embodiment.

FIG. 46 is a diagram illustrating a specific example of the request ID information 232.

DESCRIPTION OF EMBODIMENTS

In the above stream processing system, in order to secure failure resistance, for instance, the internal states of the tasks are periodically saved. Specifically, in the stream processing system, for instance, the internal states of the tasks are saved according to a distributed checkpoint method in which the internal states of the tasks are saved for each task. Then, in the stream processing system, for instance, when a failure, e.g., network disconnection occurs, the saved internal state is used to restore the state before the failure occurs (hereinafter referred to as a recovery), and each task is executed again from the restored state.

However, for instance, when a request is transmitted to an external system when a failure occurs, a request and a response are transmitted and received again between the stream processing system and the external system as the above recovery is executed. Therefore, response inconsistency may occur in the stream processing system. Hereinafter, a configuration of an information processing system 10 will be described.

Configuration of Information Processing System according to First Embodiment

Figure 1:
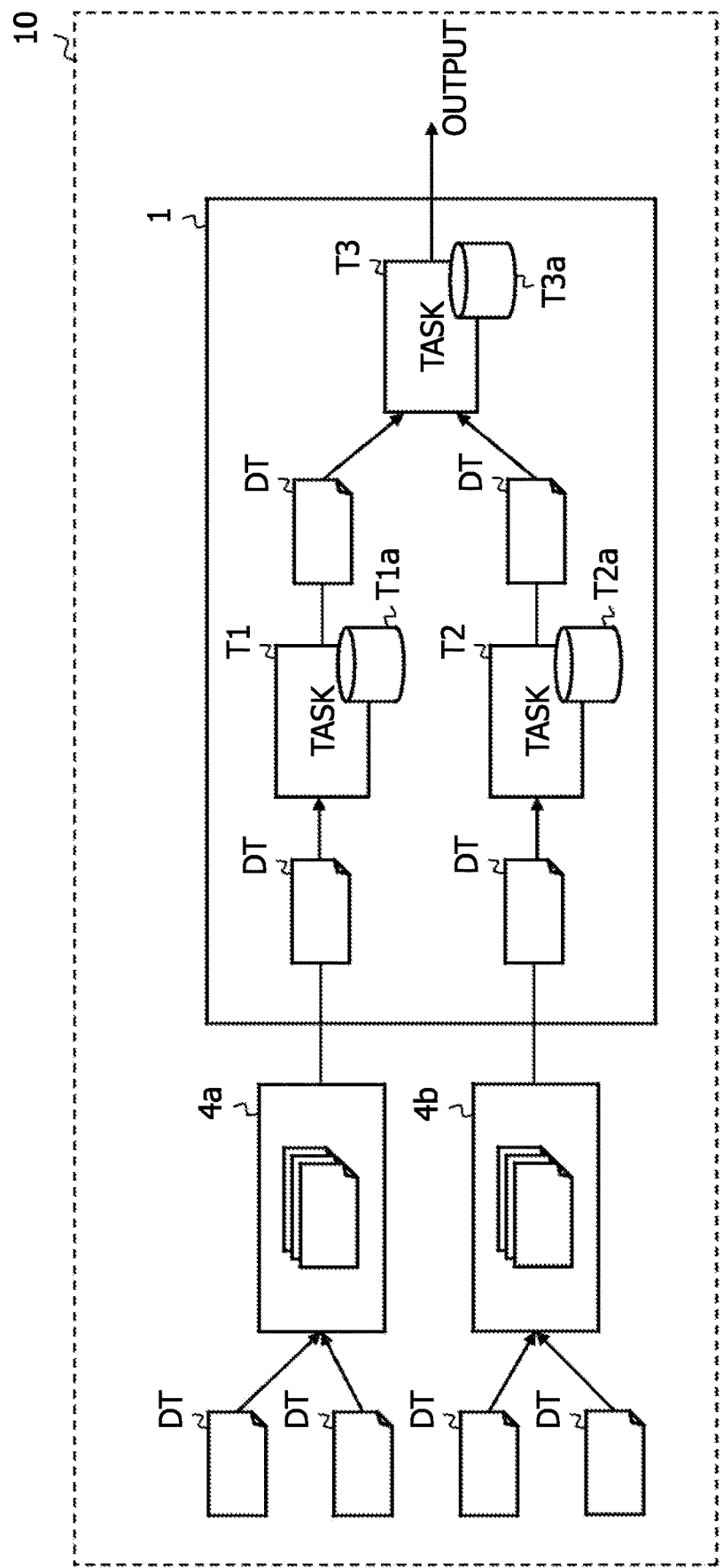
FIG. 1 is a diagram illustrating the configuration of the information processing system 10.

FIG. 1 is a diagram illustrating the configuration of the information processing system 10.

For instance, the information processing system 10 includes a queue 4a (hereinafter referred to as a storage device 4a) and a queue 4b (hereinafter referred to as a storage device 4b) which store sensor data DT transmitted from a plurality of sensors (not illustrated), and an information processing device 1 (hereinafter referred to as a stream processing device 1) which is one or more physical machines or virtual machines that execute tasks for each sensor data item DT stored in the queue 4a and the queue 4b. The sensor data DT is, for instance, data, e.g., a measurement value of a thermometer in a factory or a current position of a vehicle. Hereinafter, the queue 4a and the queue 4b will be collectively simply referred to as a queue 4.

Specifically, for instance, as illustrated in FIG. 1, the information processing device 1 performs a process of sequentially executing a task T1, a task T2, and a task T3 for each sensor data item DT (hereinafter referred to as a stream data process or data process). Hereinafter, the tasks including the task T1, the task T2 and the task T3 will be collectively simply referred to as a task T. Hereinafter, a case in which three tasks (the task T1, the task T2 and the task T3) are sequentially executed in the information processing device 1 will be described, but the information processing device 1 may sequentially execute a number of tasks other than three.

More specifically, for instance, as illustrated in FIG. 1, the information processing device 1 executes the task T1 for sensor data DT stored in the queue 4a and executes the task T2 for sensor data DT stored in the queue 4b. Then, the information processing device 1 executes the task T3, for instance, for the sensor data DT on which the task T1 has been executed (an execution result of the task T1) and the sensor data DT on which the task T2 has been executed (an execution result of the task T2). Then, the information processing device 1 outputs, for instance, the sensor data DT on which the task T3 has been executed (an execution result of the task T3) to a predesignated operation terminal (not illustrated) or the like.

Here, the stream data process may be performed in parallel in, for instance, a plurality of information processing devices 1. That is, in the plurality of information processing devices 1, for instance, a distributed stream data process for executing the task T1, the task T2, and the task T3 in parallel may be performed for each sensor data item DT. In addition, each of the task T1, the task T2 and the task T3 may be shared and executed by, for instance, the plurality of information processing devices 1.

In addition, for instance, as illustrated in FIG. 1, the information processing device 1 includes a storage device T1a that stores an internal state, e.g., an execution result of the task T1 (hereinafter referred to as an internal state of the task T1), a storage device T2a that stores an internal state, e.g., an execution result of the task T2 (hereinafter referred to as an internal state of the task T2), and a storage device T3a that stores an internal state, e.g., an execution result of the task T3 (hereinafter referred to as an internal state of the task T3).

Here, for instance, in order to secure failure resistance, the information processing system 10 periodically saves the internal states of the tasks. Specifically, for instance, the information processing system 10 saves the internal states of the tasks according to a distributed checkpoint method in which the internal states of the tasks are saved for each task. Then, for instance, when a failure, e.g., network disconnection occurs, the information processing system 10 restores the state before the failure occurs using the saved internal state, and executes each task again from the restored state. Hereinafter, the distributed checkpoint method will be described.

Distributed Checkpoint

FIG. 2 to FIG. 8 are diagrams illustrating a distributed checkpoint method.

In the information processing device 1, a barrier marker is transmitted and received between the tasks in order to notify each task of a timing at which the internal state is saved. Specifically, in each task, the internal state of each task is saved in response to receiving the barrier marker.

Figure 2:
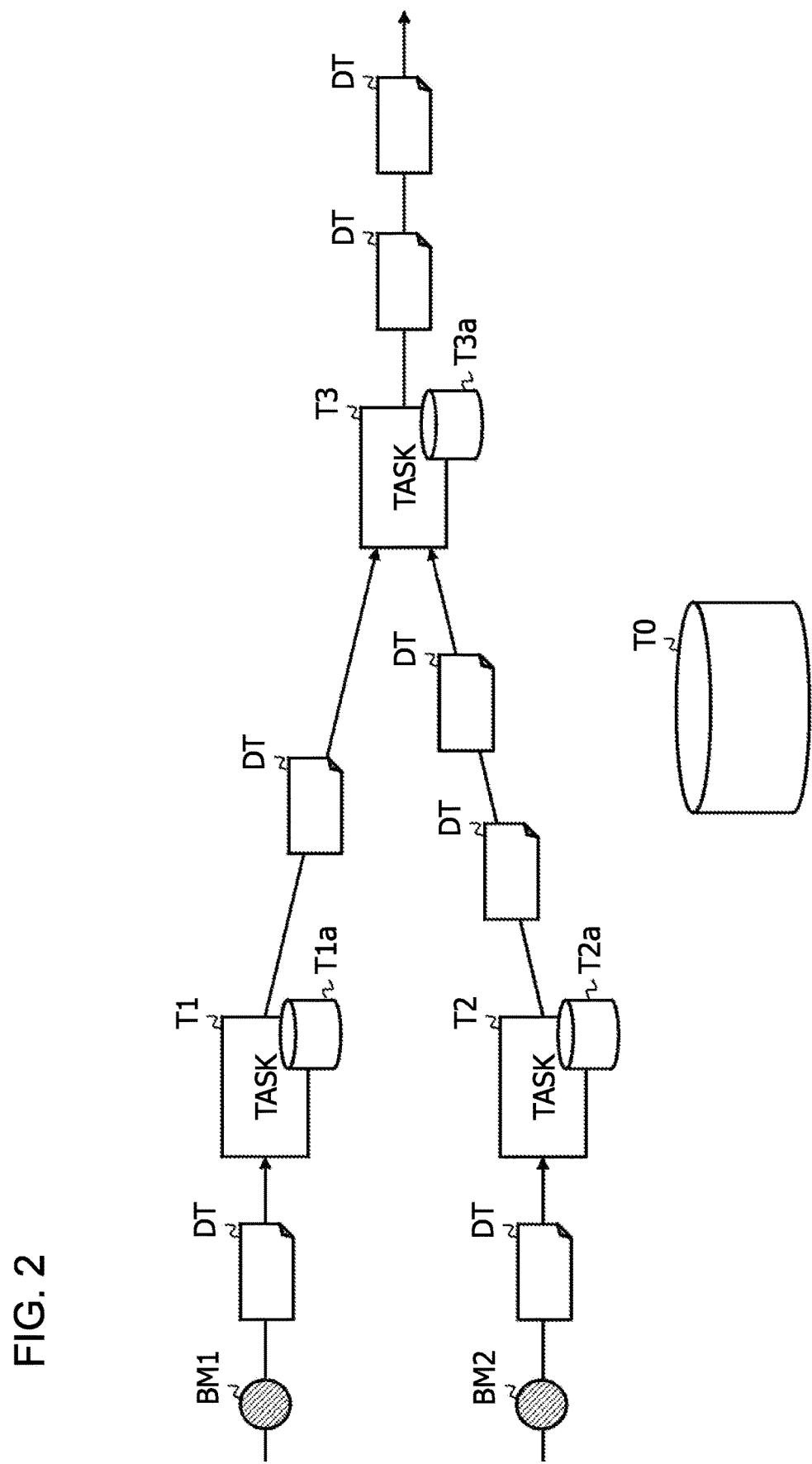
FIG. 2 to FIG. 8 are diagrams illustrating a distributed checkpoint method.

More specifically, for instance, as illustrated in FIG. 2, the information processing device 1 periodically transmits and receives barrier markers including a barrier marker BM1 and a barrier marker BM2 together with the sensor data DT. The barrier marker BM1 is a barrier marker that is transmitted to the task T3 via the task T1, and the barrier marker BM2 is a barrier marker that is transmitted to the task T3 via the task T2.

Figure 3:
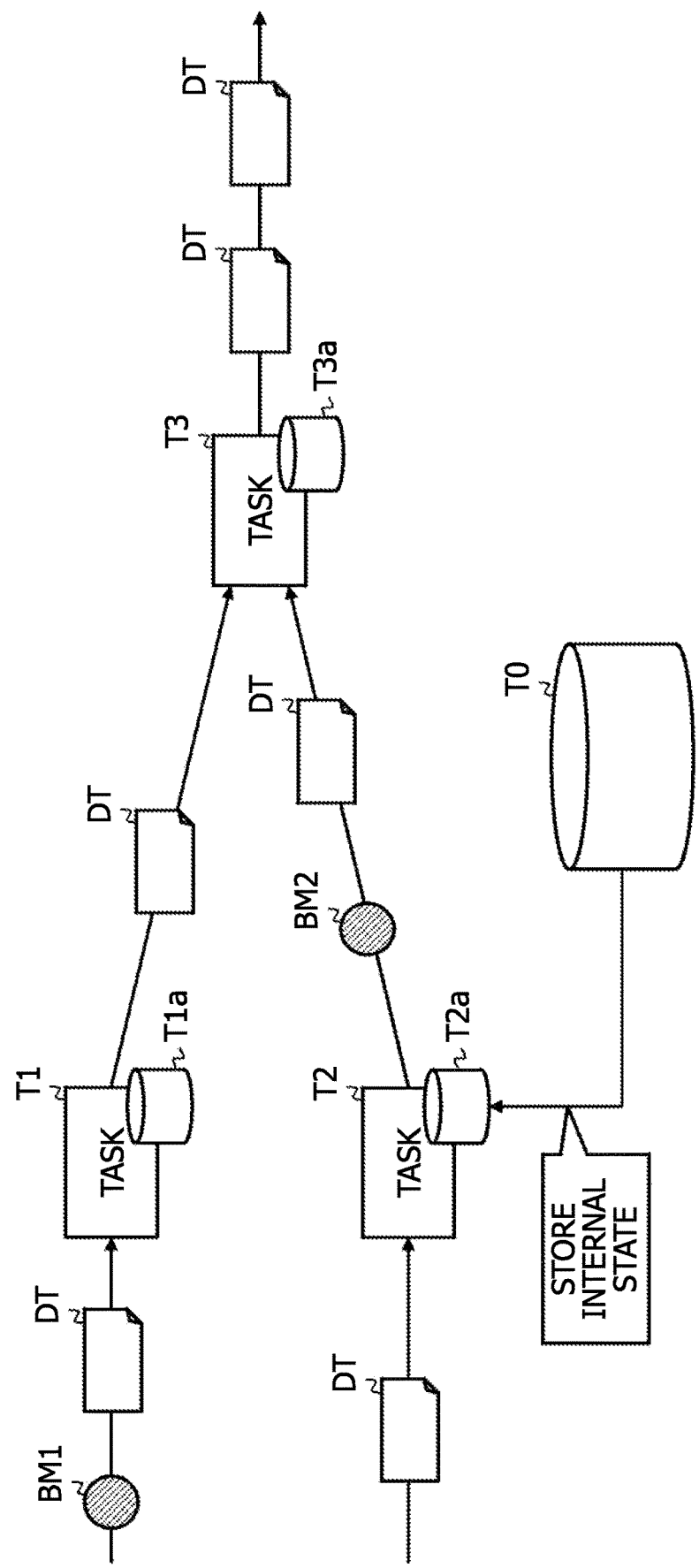

Then, for instance, as illustrated in FIG. 3, when the barrier marker BM2 reaches the task T2, in the task T2, the internal state stored in the storage device T2a is saved in a storage device T0 at the time at which the barrier marker BM2 is received.

Figure 4:
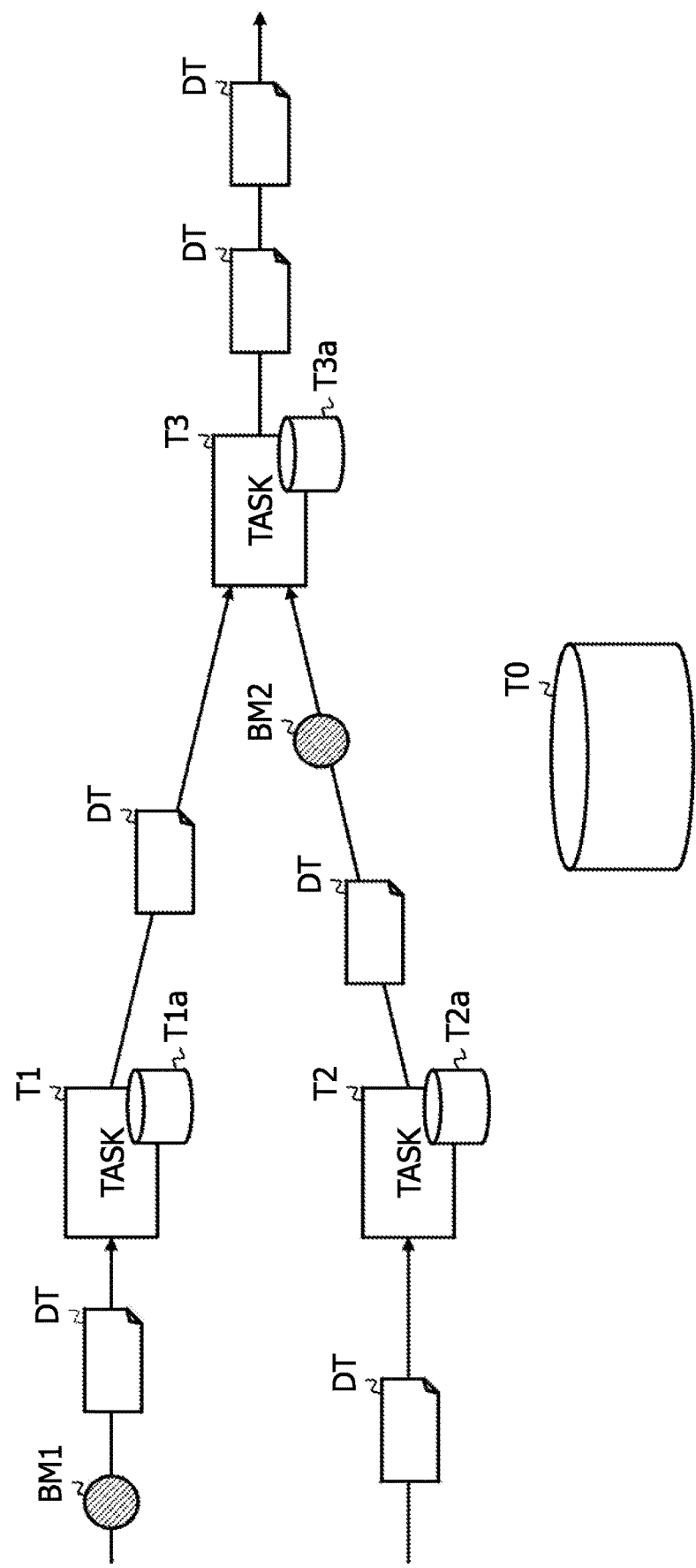

Subsequently, for instance, as illustrated in FIG. 4, when the barrier marker BM2 reaches the task T3, the task T3 waits until the barrier marker BM1 arrives.

That is, the task T3 is a task to be executed on the sensor data DT on which the task T1 has been executed (an execution result of the task T1) and the sensor data DT on which the task T2 has been executed (an execution result of the task T2). Therefore, the task T3 waits until the barrier marker arrives from all transmission sources (the task T1 and the task T2) of the sensor data DT for the task T3.

Then, for instance, when the barrier marker BM1 reaches the task T1, in the task T1, the internal state stored in the storage device T1a is saved in the storage device T0 at the time at which the barrier marker BM1 is received.

Figure 5:
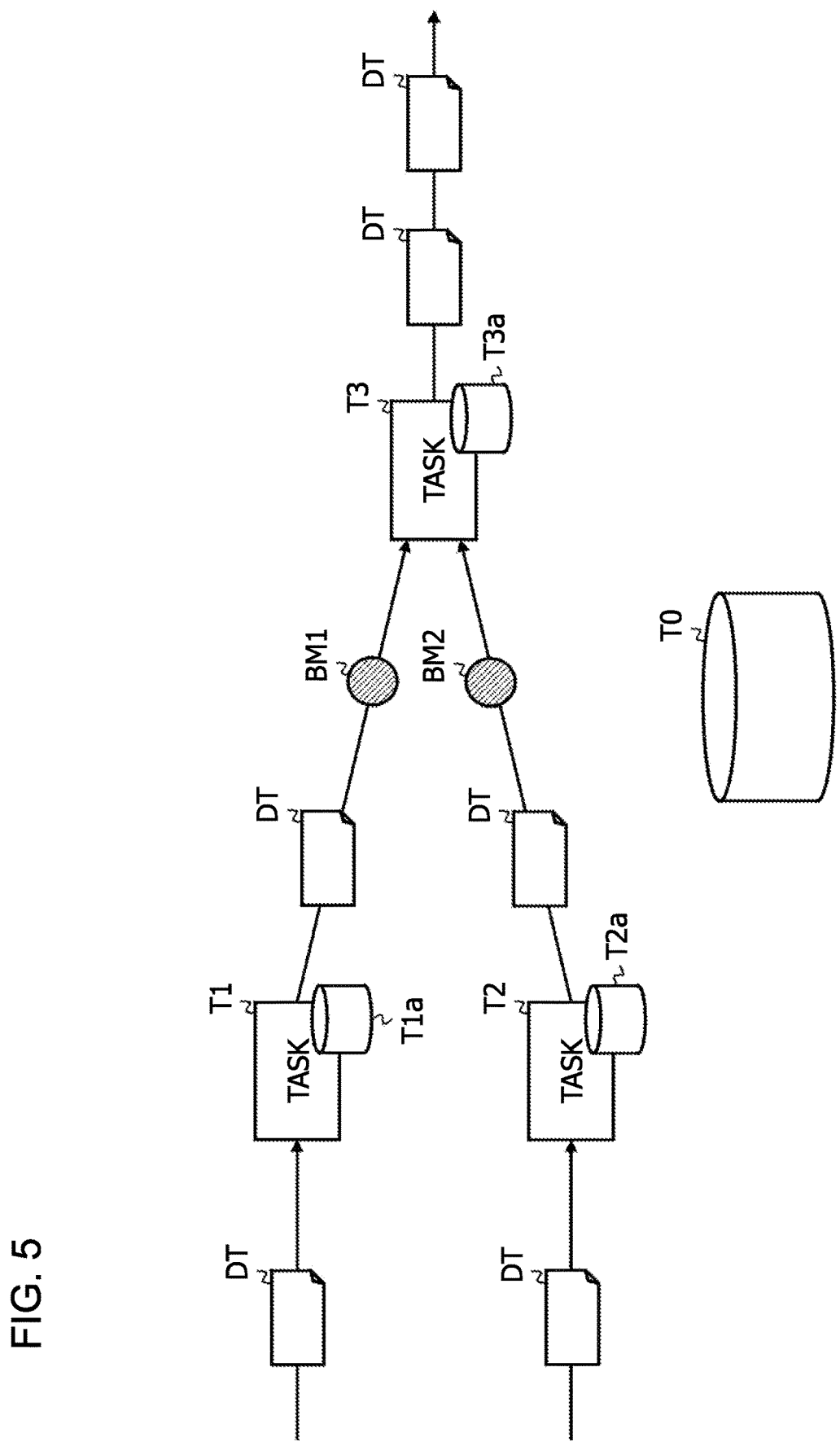
Figure 6:
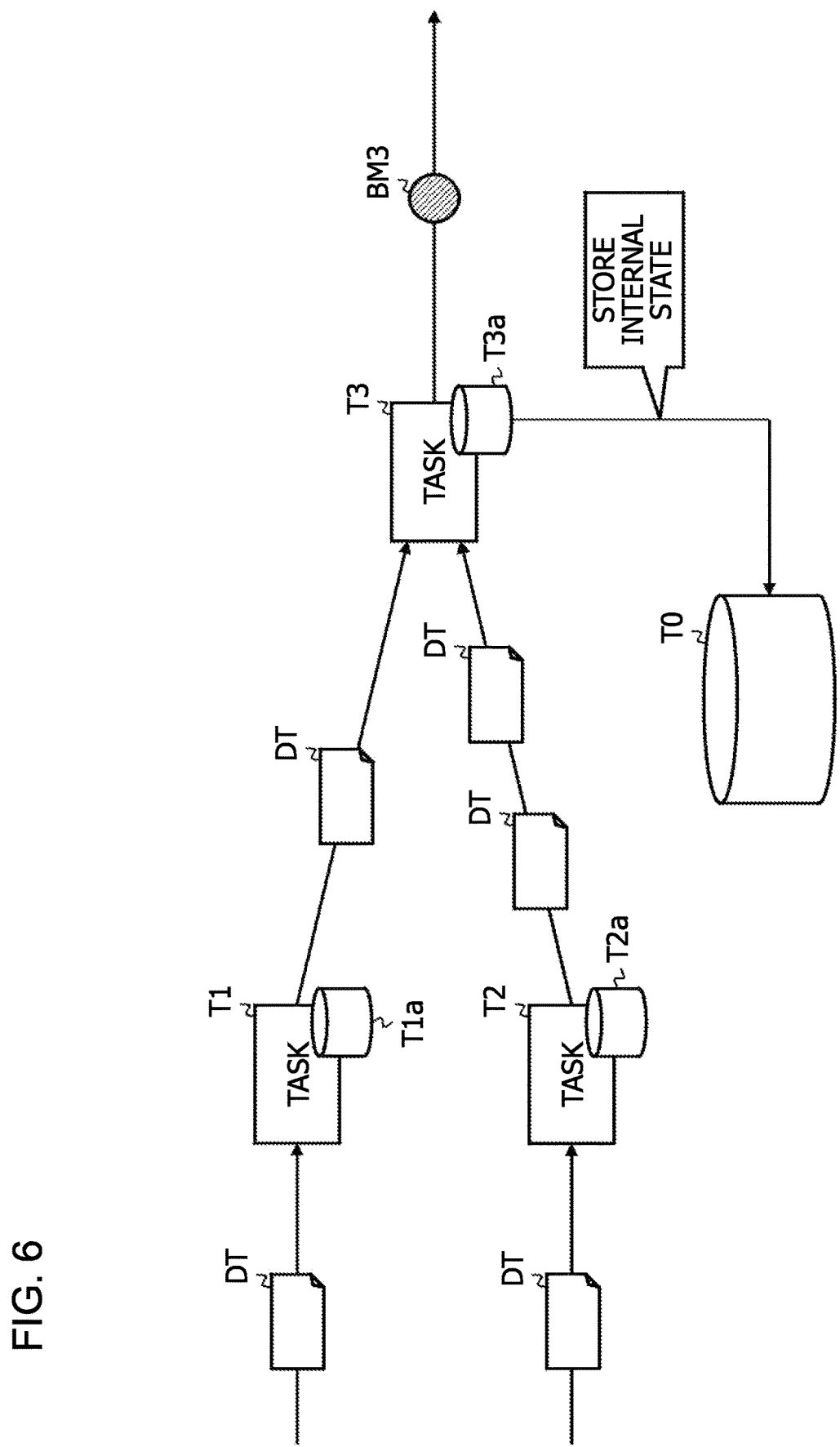

Then, for instance, as illustrated in FIG. 5, when the barrier marker BM1 reaches the task T3, in the task T3, it is determined that the barrier marker has arrived from all transmission sources of the sensor data DT for the task T3, and as illustrated in FIG. 6, the internal state stored in the storage device T3a is saved in the storage device T0 at the time at which the barrier marker BM1 is received. In addition, in this case, in the task T3, for instance, a barrier marker BM3 is transmitted to the next task T.

Thereby, the information processing device 1 can arrange sensor data DT to be processed until the internal state is saved between the tasks.

Figure 7:
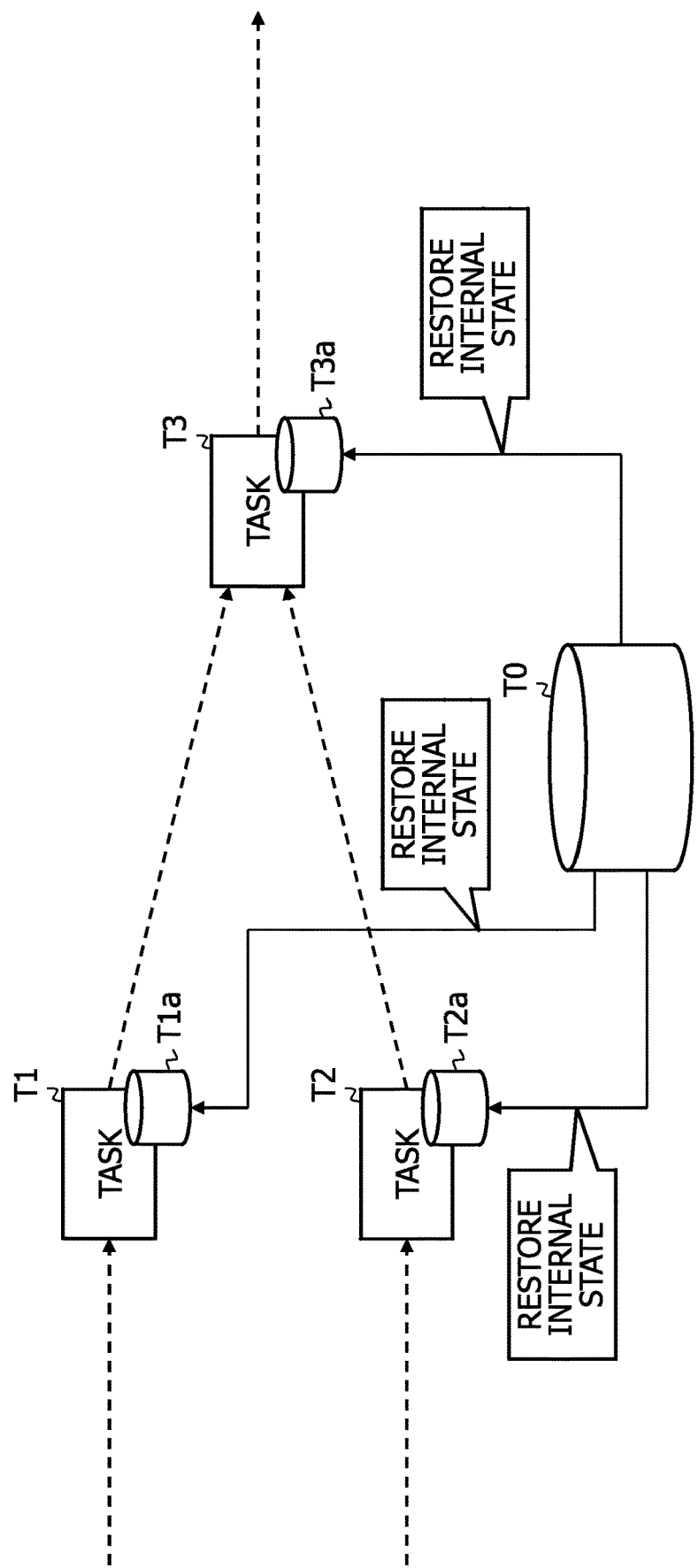

Here, for instance, when a checkpoint is completed by the arrival of the barrier marker BM3 to the terminal task in the information processing device 1, and the checkpoint is the last checkpoint completed before the failure occurs, if recovery is performed according to the occurrence of the failure, as illustrated in FIG. 7, the information processing device 1 returns the internal state transmitted from the storage device T1*a* according to the arrival of the barrier marker BM1 among the internal states stored in the storage device T0 to the storage device T1*a*. In addition, in this case, the information processing device 1 returns the internal state transmitted from the storage device T2*a* according to the arrival of the barrier marker BM2 among the internal states stored in the storage device T0 to the storage device T2*a*. In addition, in this case, the information processing device 1 returns the internal state transmitted from the storage device T3*a* according to the arrival of the barrier marker BM1 and the barrier marker BM2 among the internal states stored in the storage device T0 to the storage device T3*a*.

That is, when recovery is performed according to the occurrence of the failure, the information processing device 1 restores the states of the task T1, the task T2 and the task T3 to the state before the failure occurs using the internal state saved according to the distributed checkpoint method.

Figure 8:
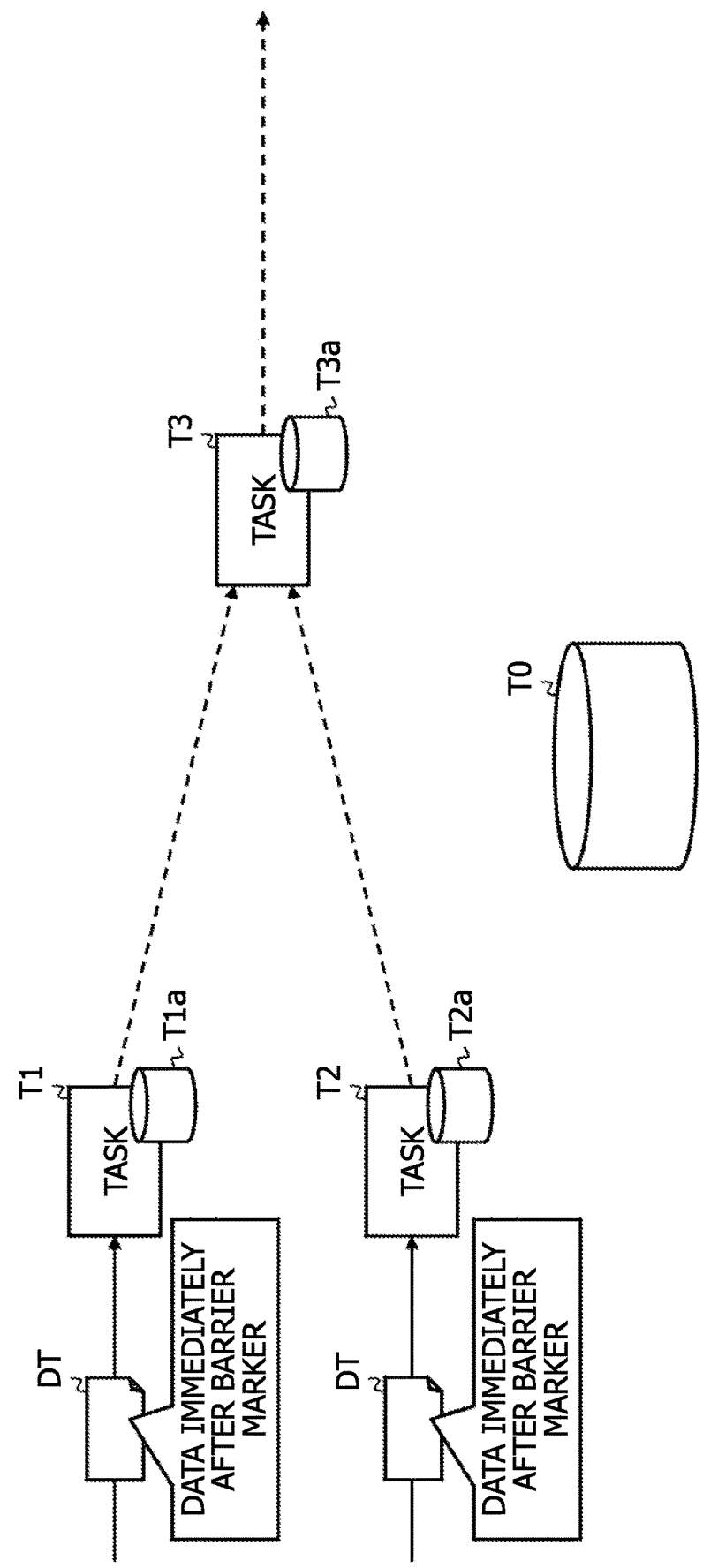

Then, as illustrated in FIG. 8, the information processing device 1 processes in order from the sensor data DT immediately after the barrier marker BM1 and the barrier marker BM2, and completes the recovery by catching up with a read position for the sensor data DT at the time at which the failure occurred.

Thereby, even when recovery is executed according to the occurrence of the failure, the information processing device 1 can prevent the occurrence of inconsistency between before and after the recovery.

Access to External System

Figure 9:
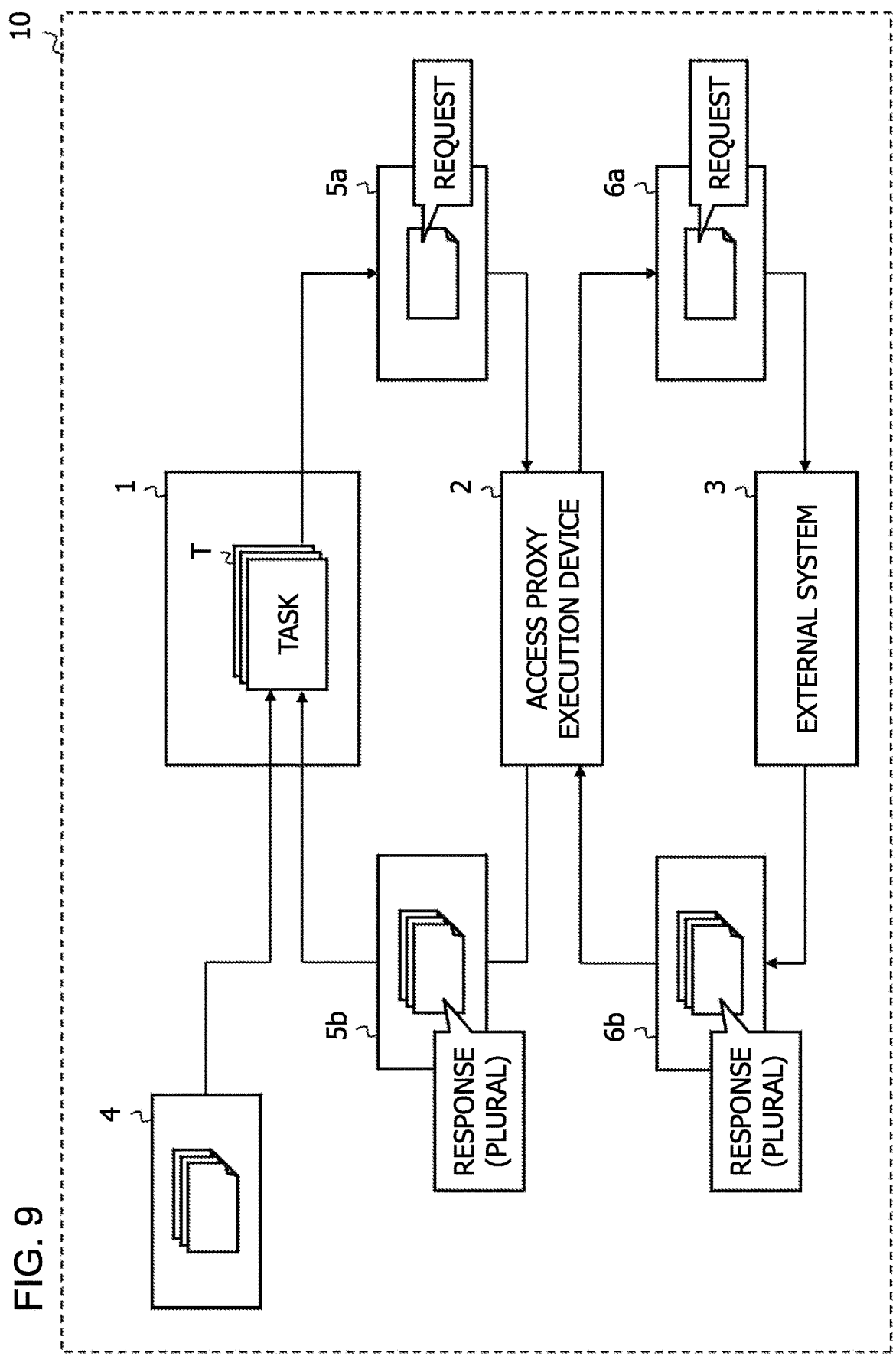
FIG. 9 to FIG. 11 are diagrams illustrating access to the external system 3.
Figure 10:
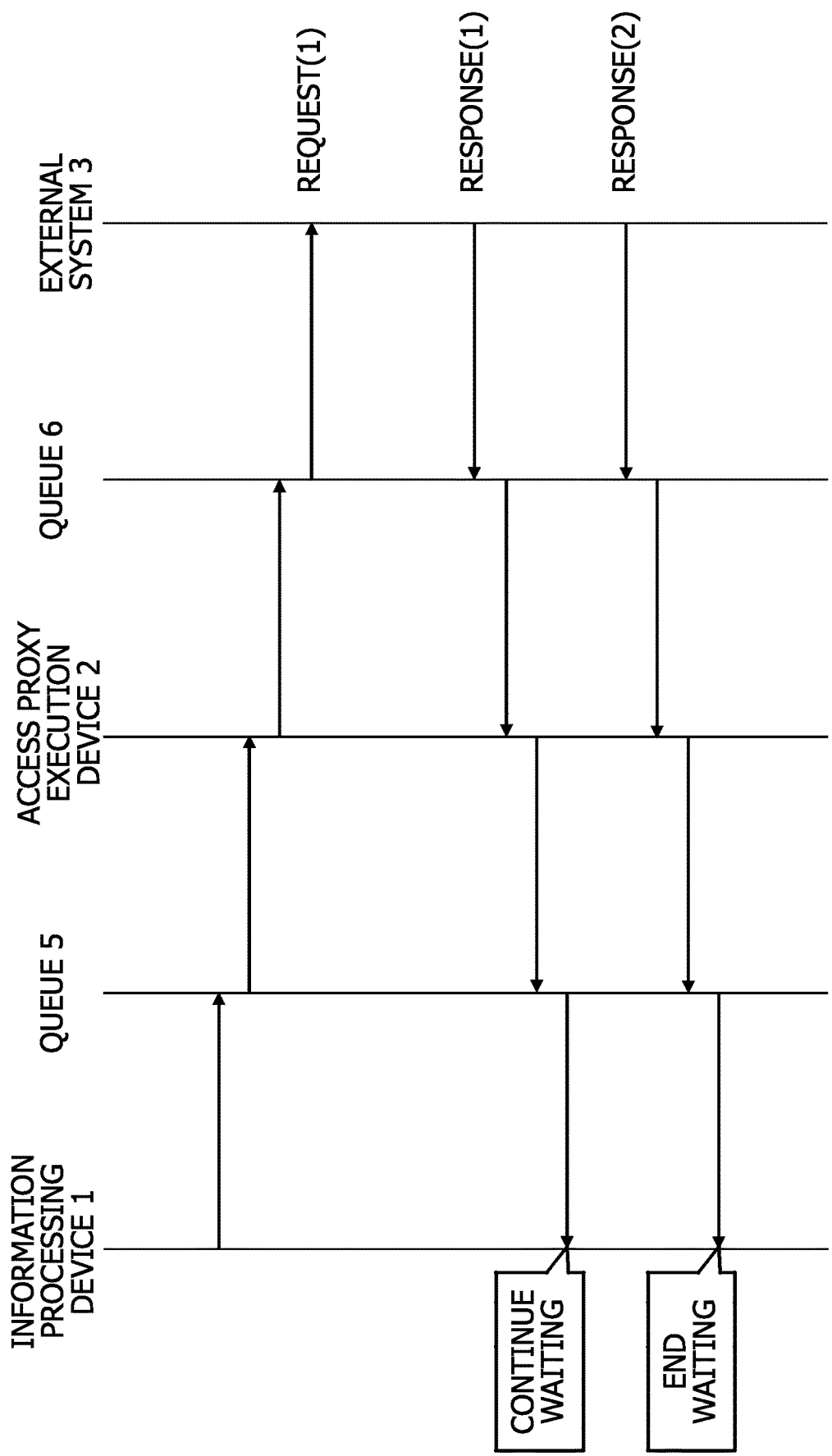
Figure 11:
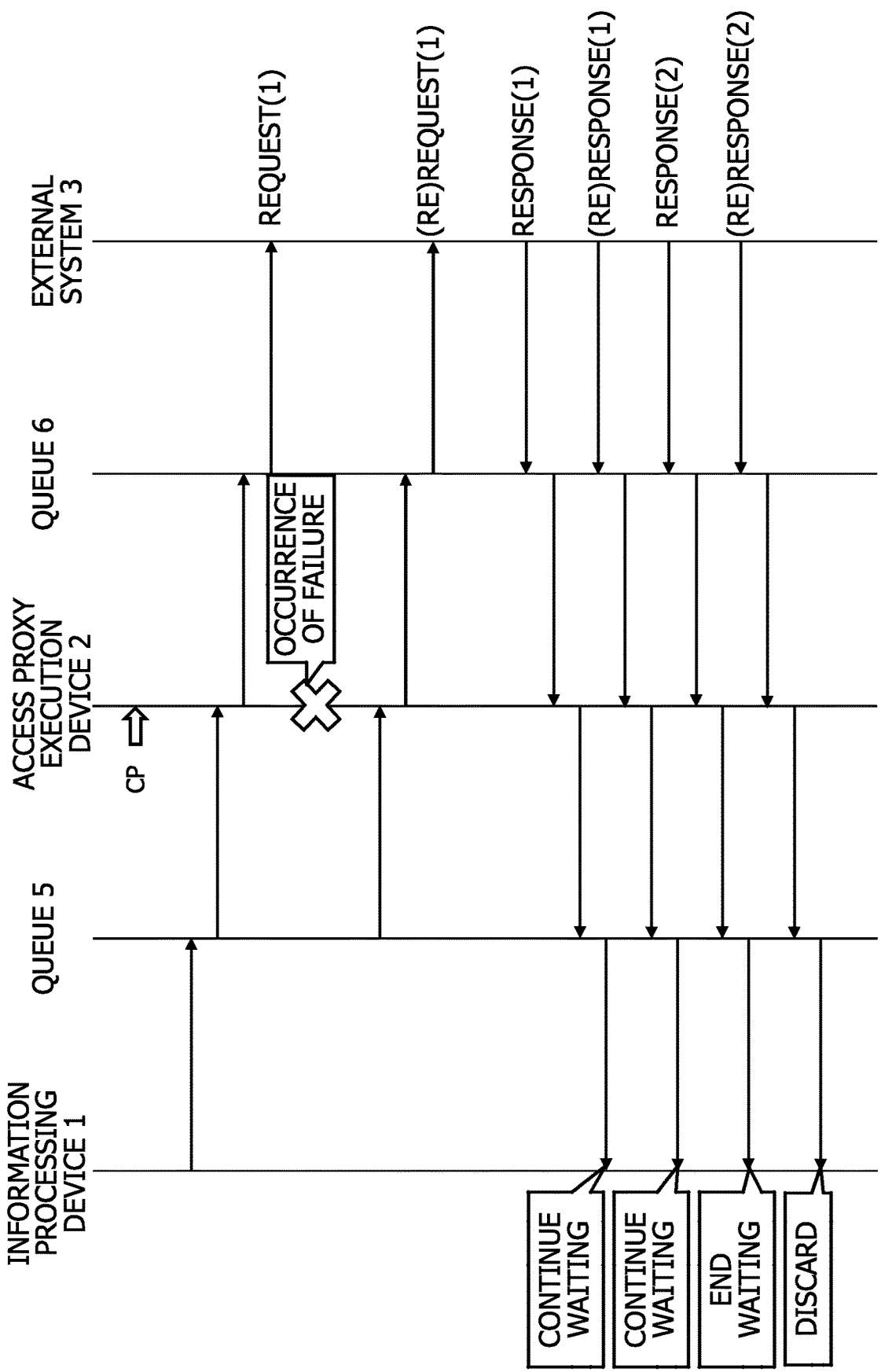

Next, access to an external system 3 will be described. FIG. 9 to FIG. 11 are diagrams illustrating access to the external system 3.

First, a configuration of the information processing device 1, an access proxy execution device 2 and the external system 3 will be described. FIG. 9 is a diagram illustrating a configuration of the information processing device 1, the access proxy execution device 2 and the external system 3.

The access proxy execution device 2 (hereinafter referred to as an information processing device 2) is, for instance, one or more physical machines or virtual machines, and transmits a request to the external system 3 and receives (waits for) a response from the external system 3 on behalf of the information processing device 1. For instance, the access proxy execution device 2 performs the stream data process in the same manner as in the information processing device 1, and secures failure resistance according to a distributed checkpoint method.

In addition, for instance, the external system 3 is a database system that manages various data items that are not stored in the information processing device 1 as the internal states of the tasks.

Then, for instance, when there is a need to transmit a request to the external system 3 as the task is executed for the sensor data DT, the information processing device 1 transmits the request that needs to be transmitted to the access proxy execution device 2.

Specifically, for instance, when there is a need during execution of a task for the sensor data DT, as illustrated in FIG. 9, the information processing device 1 stores a request for the external system 3 in a queue 5*a*.

Subsequently, for instance, the access proxy execution device 2 acquires the request stored in the queue 5*a* and stores the request in a queue 6*a*. Then, the external system 3 executes, for instance, a process corresponding to the request stored in the queue 6*a*.

Then, the external system 3 stores a plurality of responses to the request in a queue 6*b*, for instance, in response to the end of execution of the process corresponding to the request. Then, for instance, the access proxy execution device 2 acquires the plurality of responses stored in the queue 6*b* and stores the responses in a queue 5*b*. In addition, for instance, the information processing device 1 sequentially acquires the plurality of responses stored in the queue 5*b* and sequentially executes a task for each acquired response.

That is, when there is a need to transmit a request to the external system 3 as the task is executed the for the sensor data DT, the information processing device 1 transmits a request to the access proxy execution device 2. In this case, the information processing device 1 transmits and receives a request and a response between it and the access proxy execution device 2 via the queue 5*a* and the queue 5*b*. In addition, the access proxy execution device 2 transmits and receives a request and a response between it and the external system 3 via the queue 6*a* and the queue 6*b*.

Thereby, even when there is a need to transmit a request to the external system 3, the information processing device 1 does not need to wait until the response from the access proxy execution device 2 is received, and can continuously execute tasks for the next and subsequent sensor data DT. In a same manner, even when there is a need to transmit a request to the external system 3, the access proxy execution device 2 does not need to wait until the response from the external system 3 is received, and can continuously transmit the next and subsequent requests.

Therefore, for instance, the information processing device 1 can minimize a waiting time for the barrier marker generated according to access to the external system 3 (for instance, the waiting time for the barrier marker BM1 and the barrier marker BM2 in the task T3 illustrated in FIG. 2 and the like). Therefore, the information processing device 1 can minimize, for instance, a decrease in the processing speed in the tasks.

Next, a sequence chart diagram when access to the external system 3 is performed will be described. FIG. 10 and FIG. 11 are sequence chart diagrams when access to the external system 3 is performed. Hereinafter, the queue 5*a* and the queue 5*b* will be collectively simply referred to as a queue 5, and the queue 6*a* and the queue 6*b* will be collectively simply referred to as a queue 6.

As illustrated in FIG. 10, for instance, when there is a need during execution of a task for the sensor data DT, the information processing device 1 transmits a request (1) to the external system 3 via the queue 5, the access proxy execution device 2 and the queue 6. Then, when the external system 3 receives the request (1) transmitted from the information processing device 1, it executes a process corresponding to the received request (1).

Then, for instance, when the external system 3 generates a response (1) and a response (2) as the response corresponding to the request (1) transmitted from the information processing device 1, it transmits the response (1) to which information indicating that it is not the last response corresponding to the request (1) is added to the information processing device 1 via the queue 6, the access proxy execution device 2 and the queue 5. In addition, in this case, the external system 3 transmits the response (2) to which information indicating that it is the last response corresponding to the request (1) is added to the information processing device 1 via the queue 6, the access proxy execution device 2 and the queue 5.

Then, when the information processing device 1 receives the response (1), it waits until an additional response corresponding to the request (1) is received according to the information added to the received response (1). In addition, when the information processing device 1 receives the response (2), it ends waiting for the response corresponding to the request (1) according to the information added to the received response (2).

Here, for instance, when a request is transmitted to the external system 3 when the failure occurs, transmission of a request to the external system 3 and transmission of a response to the information processing device 1 may be performed again as the recovery is executed. Therefore, in the information processing device 1, for instance, inconsistency in the response to the request can occur.

Specifically, as illustrated in FIG. 11, for instance, when recovery is executed according to the occurrence of the failure in the access proxy execution device 2, and the internal state of the access proxy execution device 2 returns to a time CP, the access proxy execution device 2 can acquire the request (1) acquired after the time CP from the queue 5 again, and transmit it to the external system 3 via the queue 6.

Therefore, in this case, the request (1) is transmitted to the external system 3 twice, and the external system 3 transmits a response (1) (hereinafter referred to as a (re) response (1)) and a response (2) (hereinafter referred to as a (re) response (2)) corresponding to a second request (1) (hereinafter referred to as a (re) request (1)) to the information processing device 1, in addition to the response (1) and the response (2) corresponding to the first request (1).

Then, in this case, for instance, when the response (1), the (re) response (1), the response (2) and the (re) response (2) reach the information processing device 1 in that order, the information processing device 1 receives the received responses (the response (1), the (re) response (1) and the response (2)) as responses corresponding to the request (1) until the response (2) to which information indicating that it is the last response corresponding to the request (1) is added is received.

That is, in this case, the information processing device 1 receives the response (1) and the (re) response (1) which are responses having the same content as the response corresponding to the request (1), and inconsistency occurs in the response corresponding to the request (1).

Here, the information processing device 1 according to the present embodiment executes, for instance, a task for the received sensor data DT in response to receiving the sensor data DT to be processed. Then, when a process of performing a request for the external system 3 (hereinafter referred to as another information processing system) is executed as the task is executed for the sensor data DT, the information processing device 1 transmits the request to the access proxy execution device 2.

On the other hand, the access proxy execution device 2 according to the present embodiment converts the identifier included in the request into a reversibly convertible conversion identifier in response to receiving the request. Specifically, for instance, the access proxy execution device 2 generates a conversion identifier, which is a new identifier, by adding a time stamp (hereinafter referred to as an additional identifier) to the identifier included in the request (for instance, a request ID). Then, the access proxy execution device 2 transmits a request including the converted conversion identifier to the external system 3.

In addition, the access proxy execution device 2 reconverts the conversion identifier included in the response into an identifier in response to receiving the response corresponding to the request. Then, the access proxy execution device 2 transmits a response including the reconverted identifier and the conversion identifier to the information processing device 1.

That is, the access proxy execution device 2 according to the present embodiment converts the identifier included in the request into a conversion identifier, and therefore, even when the same request is transmitted a plurality of times as the recovery is executed, each request is transmitted to the external system 3 in a distinguishable manner. Then, when the access proxy execution device 2 receives the response from the external system 3, it transmits the received response to the information processing device 1 while the request corresponding to the response is distinguishable.

Thereby, even when the same request is transmitted a plurality of times as the recovery is executed, the information processing device 1 according to the present embodiment can identify a response corresponding to each request as the response corresponding to different requests. Therefore, the information processing device 1 can specify the response that needs to be discarded (the same response as the response that has already been received) among the responses received from the access proxy execution device 2, and prevent the occurrence of inconsistency in the response.

Hardware Configuration of Information Processing System

Figure 12:
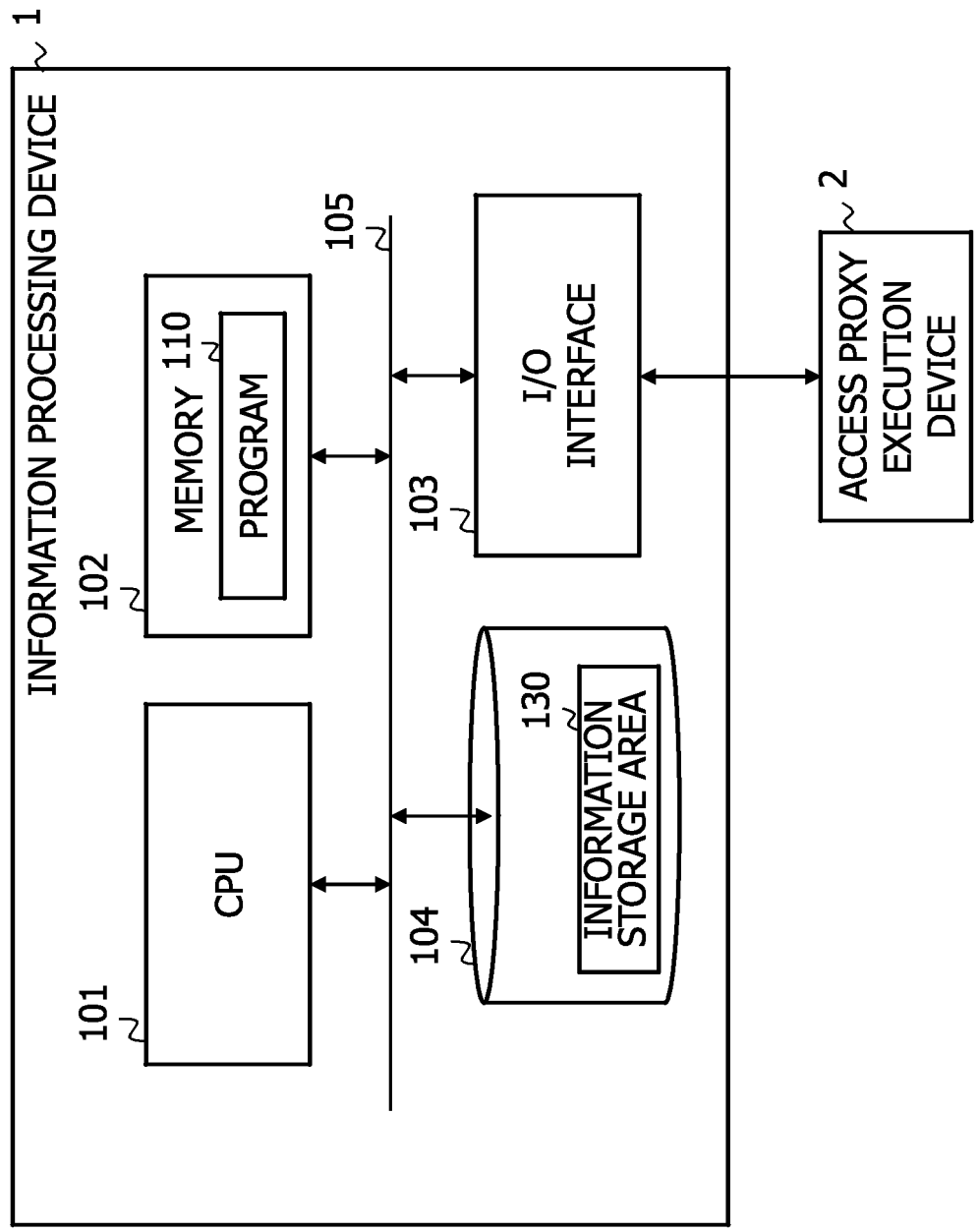
FIG. 12 is a diagram illustrating a hardware configuration of the information processing device 1.
Figure 13:
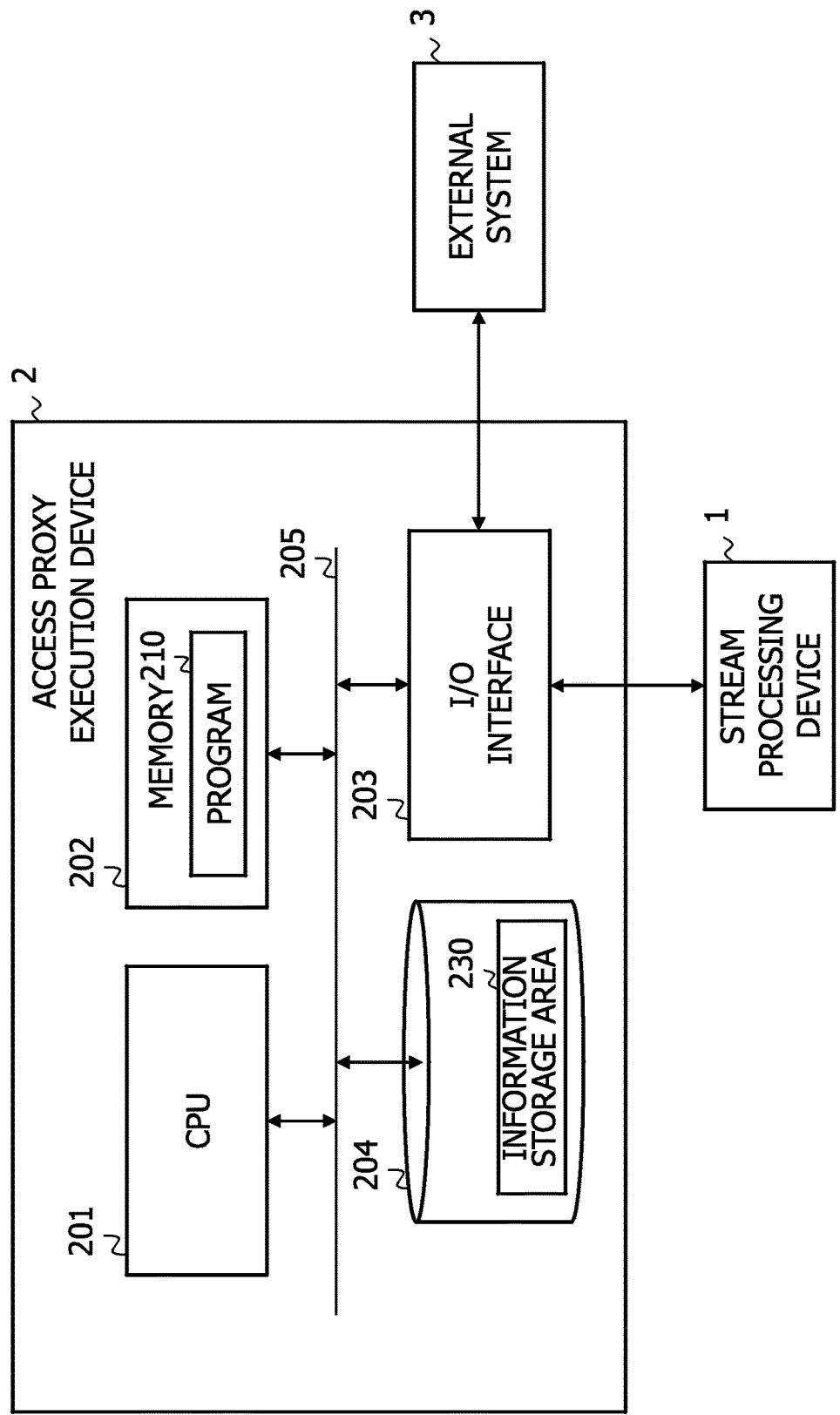
FIG. 13 is a diagram illustrating a hardware configuration of the access proxy execution device 2.

Next, a hardware configuration of the information processing system 10 will be described. FIG. 12 is a diagram illustrating a hardware configuration of the information processing device 1. In addition, FIG. 13 is a diagram illustrating a hardware configuration of the access proxy execution device 2.

First, a hardware configuration of the information processing device 1 will be described.

As illustrated in FIG. 12, the information processing device 1 includes a CPU 101, which is a processor, a memory 102, an I/O interface 103, and a storage medium 104. Respective units are connected to each other via a bus 105.

The storage medium 104 has, for instance, a program storage area (not illustrated) in which a program 110 for performing the stream data process is stored. In addition, the storage medium 104 has, for instance, an information storage area 130 in which information used when the stream data process is performed is stored. Here, the storage medium 104 may be, for instance, a hard disk drive (HDD) or a solid state drive (SSD).

The CPU 101 executes the program 110 loaded from the storage medium 104 into the memory 102 and performs the stream data process.

The I/O interface 103 is, for instance, an interface device, e.g., a network interface card, and can access the access proxy execution device 2 via a network, e.g., the Internet.

Next, a hardware configuration of the access proxy execution device 2 will be described.

As illustrated in FIG. 13, the access proxy execution device 2 includes a CPU 201, which is a processor, a memory 202, an I/O interface 203, and a storage medium 204. Respective units are connected to each other via a bus 205.

The storage medium 204 has, for instance, a program storage area (not illustrated) in which a program 210 for performing the stream data process is stored. In addition, the storage medium 204 has, for instance, an information storage area 230 in which information used when the stream data process is performed is stored. Here, the storage medium 204 may be, for instance, an HDD or an SSD.

The CPU 201 executes the program 210 loaded from the storage medium 204 into the memory 202 and performs the stream data process.

The I/O interface 203 is, for instance, an interface device, e.g., a network interface card, and can access the information processing device 1 and the external system 3 via a network, e.g., the Internet.

Figure 14:
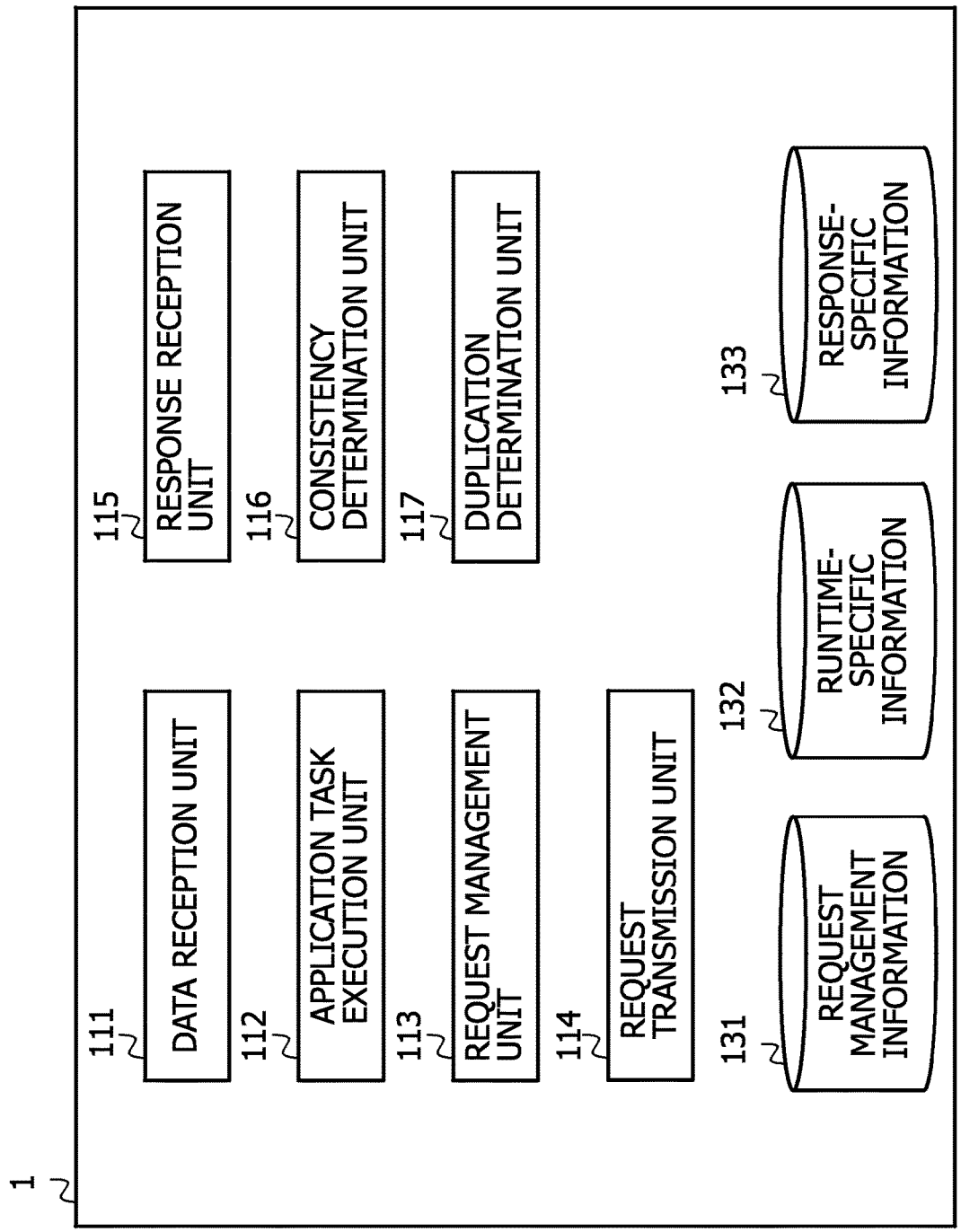
FIG. 14 is a functional block diagram of the information processing device 1.
Figure 15:
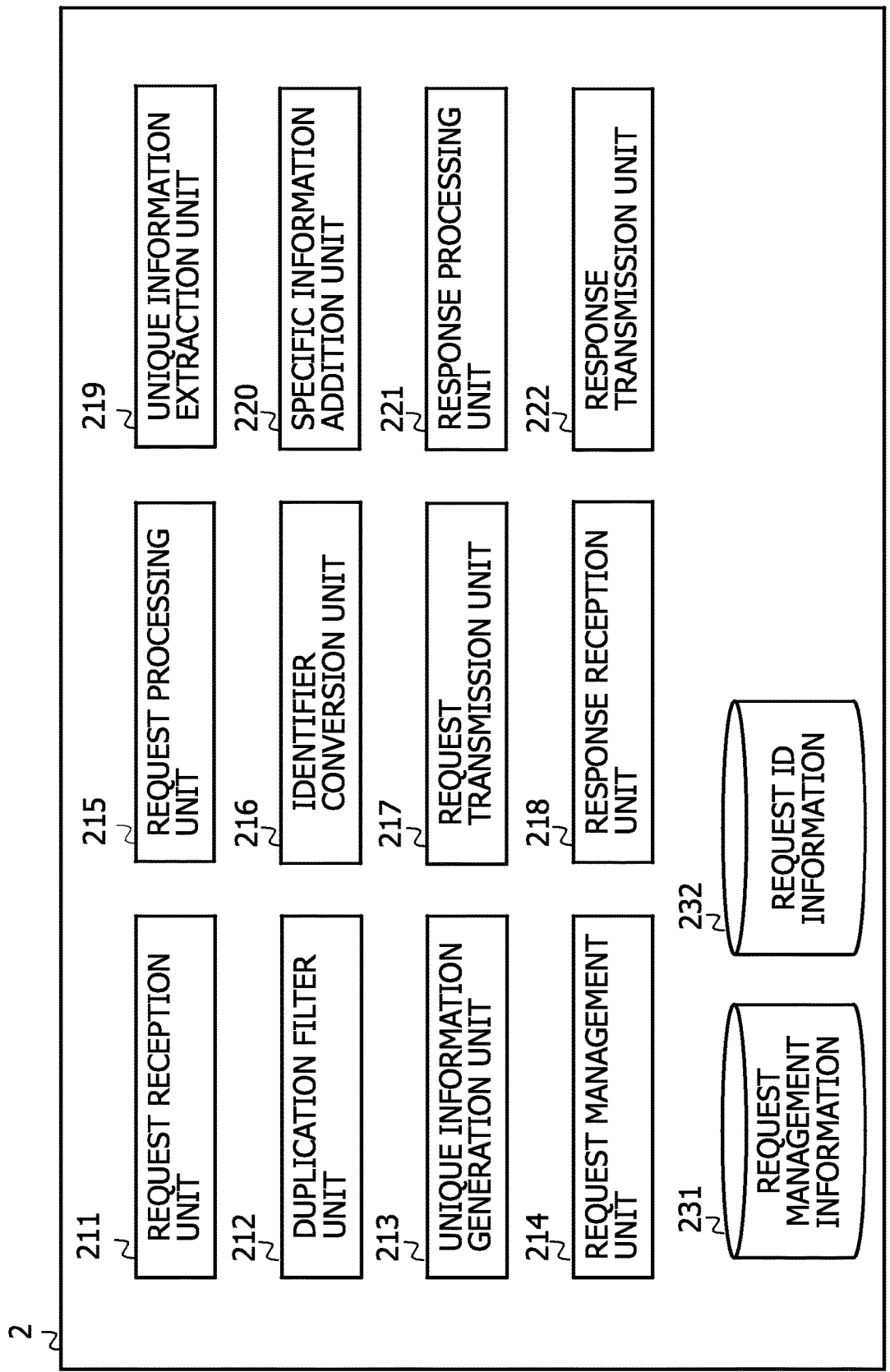
FIG. 15 is a functional block diagram of the access proxy execution device 2.

Functions of Information Processing System Next, functions of the information processing system 10 will be described. FIG. 14 is a functional block diagram of the information processing device 1. In addition, FIG. 15 is a functional block diagram of the access proxy execution device 2.

First, the functional block diagram of the information processing device 1 will be described.

As illustrated in FIG. 14, for instance, the information processing device 1 organically cooperates with hardware, e.g., the CPU 101 and the memory 102, and the program 110, and thus realizes various functions of a data reception unit 111, an application task execution unit 112 (hereinafter referred to as an app task execution unit 112), a request management unit 113, a request transmission unit 114, a response reception unit 115, a consistency determination unit 116, and a duplication determination unit 117.

In addition, the information processing device 1 stores, for instance, request management information 131, runtime-specific information 132, and response-specific information 133 in the information storage area 130.

The data reception unit 111 sequentially acquires, for instance, the sensor data DT stored in the queue 4. In addition, the data reception unit 111 receives, for instance, the sensor data DT transmitted from the previous stage task (the previous stage task that operates in the same information processing device 1 or another information processing device 1).

The application task execution unit 112 executes, for instance, a task for the sensor data DT received by the data reception unit 111.

For instance, when there is a need to transmit a request to the external system 3 as the task is executed by the application task execution unit 112, the request management unit 113 generates a request for the external system 3. Then, for instance, the request management unit 113 stores information relating to the generated request as the request management information 131 in the information storage area 130.

For instance, the request transmission unit 114 transmits the request generated by the request management unit 113 to the access proxy execution device 2.

The response reception unit 115 receives, for instance, the response transmitted from the access proxy execution device 2 (the response corresponding to the request transmitted from the request transmission unit 114). Specifically, the response reception unit 115 sequentially acquires, for instance, the responses stored in the queue 5.

For instance, the consistency determination unit 116 determines whether the response received by the response reception unit 115 is a response to be discarded from the content included in the response received by the response reception unit 115. Then, for instance, when the consistency determination unit 116 determines that the response received by the response reception unit 115 is a response to be discarded, the response received by the response reception unit 115 is discarded.

For instance, the duplication determination unit 117 determines whether the response received by the response reception unit 115 is the same response (hereinafter referred to as a duplication response) as the response received in the past from the content included in the response received by the response reception unit 115. Then, for instance, when the duplication determination unit 117 determines that the response received by the response reception unit 115 is a duplication response, the response received by the response reception unit 115 is discarded. The runtime-specific information 132 and the response-specific information 133 will be described below.

Next, a functional block diagram of the access proxy execution device 2 will be described.

As illustrated in FIG. 15, for instance, the access proxy execution device 2 organically cooperates with hardware, e.g., the CPU 201 and the memory 202, and the program 210, and thus realizes various functions of a request reception unit 211, a duplication filter unit 212, a unique information generation unit 213, a request management unit 214, a request processing unit 215, an identifier conversion unit 216, a request transmission unit 217, a response reception unit 218, a unique information extraction unit 219, a specific information addition unit 220, a response processing unit 221, and a response transmission unit 222.

In addition, the access proxy execution device 2 stores, for instance, request management information 231 and request ID information 232 in the information storage area 230.

The request reception unit 211 receives, for instance, the request transmitted from the information processing device 1. Specifically, the request reception unit 211 sequentially acquires, for instance, the request stored in the queue 5.

For instance, the duplication filter unit 212 determines whether the request received by the request reception unit 211 is the same request (hereinafter referred to as a duplication request) as the request received in the past from the content of the request received by the request reception unit 211. Then, for instance, when the duplication filter unit 212 determines that the request received by the request reception unit 211 is a duplication request, the request received by the request reception unit 211 is discarded.

For instance, in the unique information generation unit 213, the request reception unit 211 generates runtime-specific information corresponding to the request. The runtime-specific information is, for instance, a time stamp indicating the time when the request reception unit 211 receives the request.

For instance, the request management unit 214 stores information corresponding to the request received by the request reception unit 211 as the request management information 231 in the information storage area 130.

For instance, the request processing unit 215 converts the request received by the request reception unit 211 in response to the external system 3 which is a request transmission destination.

For instance, the identifier conversion unit 216 converts the identifier included in the request received by the request reception unit 211 into a reversibly convertible conversion identifier. The identifier is, for instance, a request ID that can identify each request.

Specifically, for instance, the identifier conversion unit 216 generates a conversion identifier by adding runtime-specific information generated by the unique information generation unit 213 to the identifier included in the request received by the request reception unit 211.

For instance, the request transmission unit 217 transmits the request including the conversion identifier converted by the identifier conversion unit 216 to the external system 3.

The response reception unit 218 receives, for instance, the response transmitted from the external system 3 (the response corresponding to the request transmitted from the request transmission unit 217). Specifically, the response reception unit 218 sequentially acquires, for instance, the response stored in the queue 6.

The unique information extraction unit 219 extracts, for instance, runtime-specific information from the response received by the response reception unit 218. Then, for instance, the unique information extraction unit 219 adds the extracted runtime-specific information to the response received by the response reception unit 218.

The specific information addition unit 220 acquires, for instance, response-specific information corresponding to the response received by the response reception unit 218. The response-specific information is, for instance, a storage position (offset) in the queue 6 in which the response received by the response reception unit 218 is stored. Then, for instance, the specific information addition unit 220 adds the acquired response-specific information to the response received by the response reception unit 218.

The response processing unit 221 converts, for instance, as needed, the response to which runtime-specific information is added by the unique information extraction unit 219 (the response to which response-specific information is added by the specific information addition unit 220).

The response transmission unit 222 transmits, for instance, the response converted by the response processing unit 221 to the information processing device 1. The request ID information 232 will be described below.

Outline of First Embodiment

Figure 16:
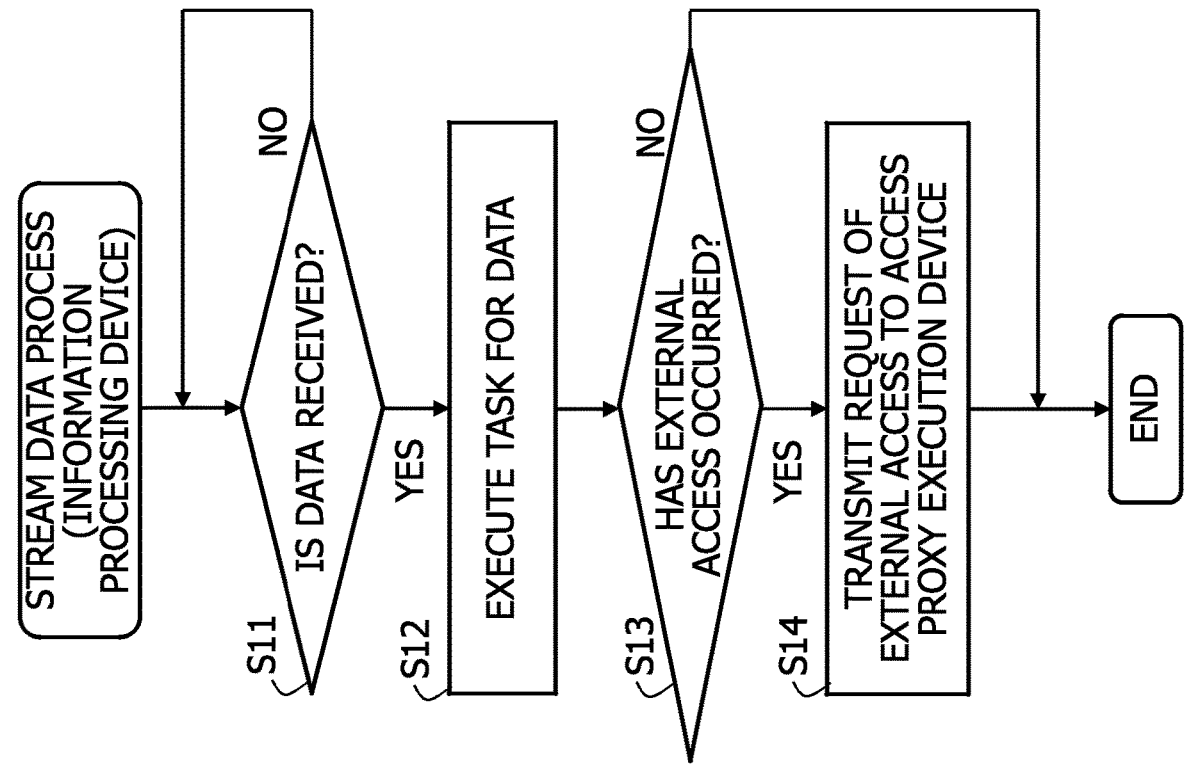
FIG. 16 and FIG. 17 are flowcharts illustrating the outline of the stream data process according to the first embodiment.
Figure 17:
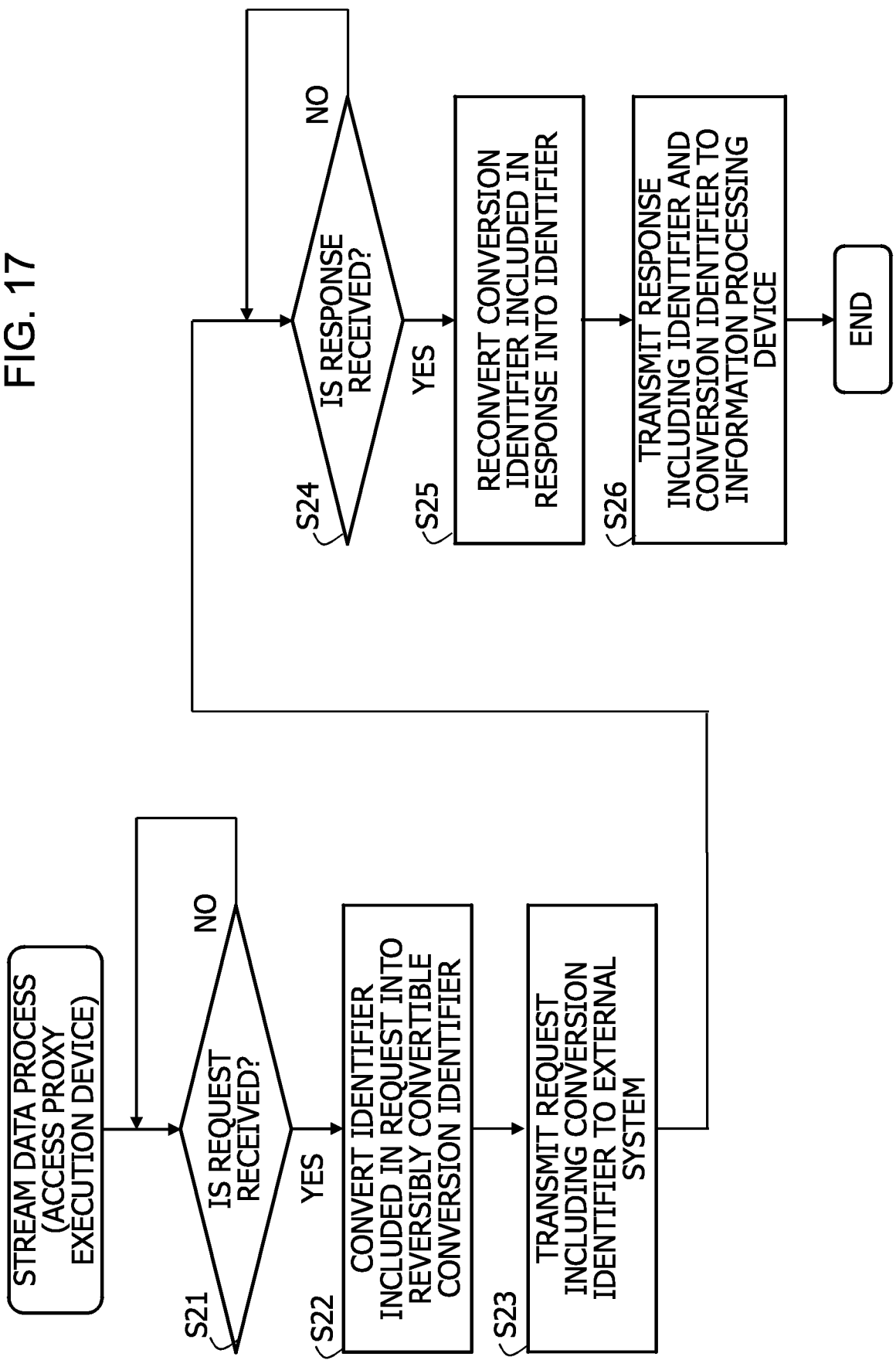
Figure 18:
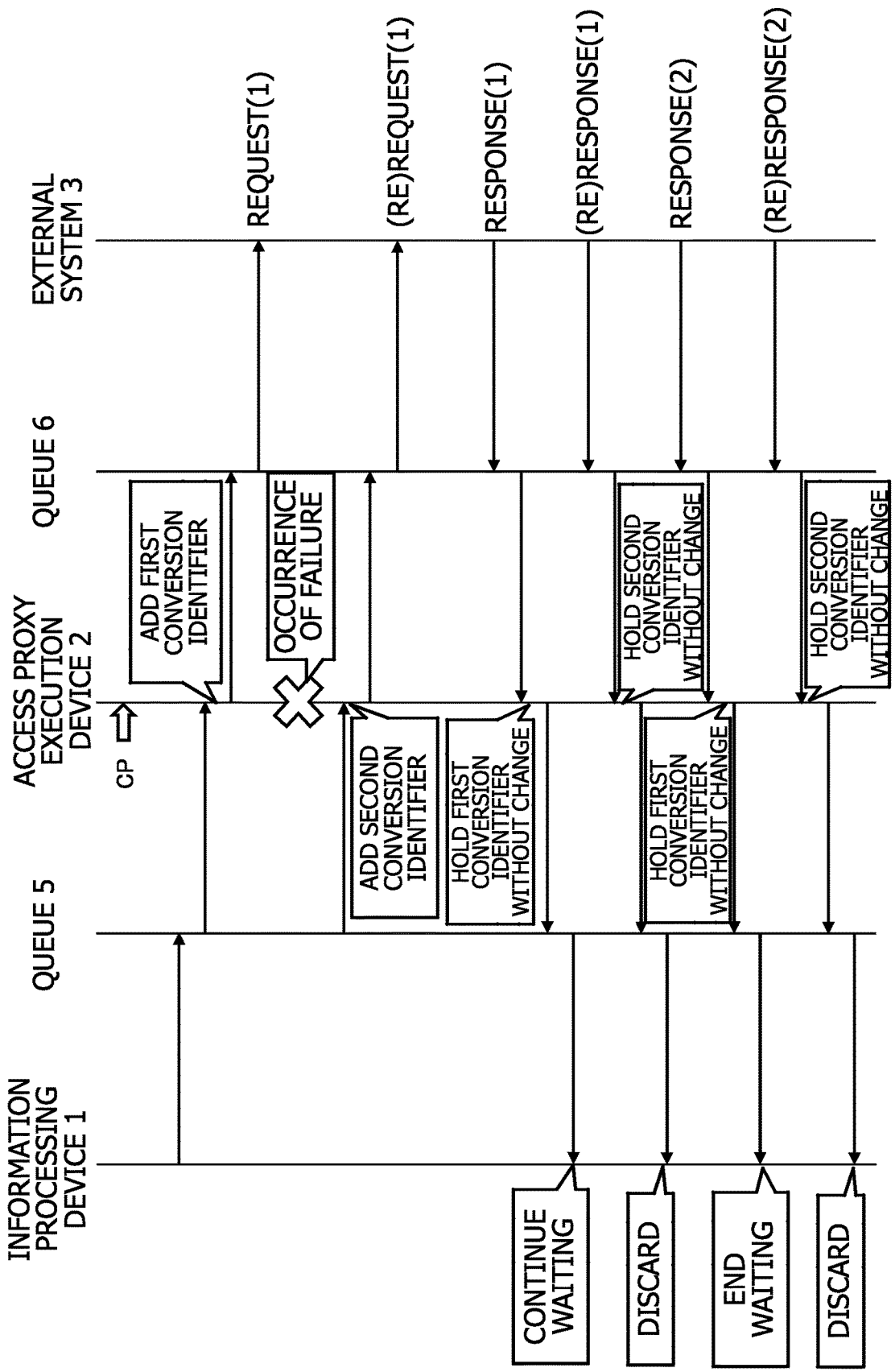
FIG. 18 is a diagram illustrating the outline of the stream data process according to the first embodiment.

Next, the outline of the first embodiment will be described. FIG. 16 and FIG. 17 are flowcharts illustrating the outline of the stream data process according to the first embodiment. In addition, FIG. 18 is a diagram illustrating the outline of the stream data process according to the first embodiment.

As illustrated in FIG. 16, for instance, the information processing device 1 waits until it receives the sensor data DT (NO in S11).

Then, when the sensor data DT is received (YES in S11), the information processing device 1 starts, for instance, execution of a task for the sensor data DT (S12).

Subsequently, for instance, when there is a need to transmit a request to the external system 3 as the task is executed for the sensor data DT (YES in S13), the information processing device 1 transmits the request for the external system 3 to the access proxy execution device 2 (S14).

Here, when there is no need to transmit a request to the external system 3 (NO in S13), the information processing device 1 does not execute the process of S14.

On the other hand, as illustrated in FIG. 17, for instance, the access proxy execution device 2 waits until the request transmitted from the information processing device 1 is received (NO in S21).

Then, when the request transmitted from the information processing device 1 is received (YES in S21), for instance, the access proxy execution device 2 converts the identifier included in the request into a reversibly convertible conversion identifier (S22).

In addition, the access proxy execution device 2 transmits, for instance, the request including the conversion identifier to the external system 3 (S23).

Then, for instance, the access proxy execution device 2 waits until the response from the external system 3 is received (NO in S24).

Then, when the response from the external system 3 is received (YES in S24), the access proxy execution device 2 reconverts, for instance, the conversion identifier included in the response into an identifier (S25).

In addition, the access proxy execution device 2 transmits, for instance, the response including the reconverted identifier and the conversion identifier to the information processing device 1 (S26).

Thereby, the information processing device 1 according to the present embodiment can identify a response corresponding to each request as the response corresponding to different requests even when the same request is transmitted a plurality of times as the recovery is executed. Therefore, the information processing device 1 can specify the response that needs to be discarded among the responses received from the access proxy execution device 2 and prevent the occurrence of inconsistency in the response.

Specifically, as illustrated in FIG. 18, for instance, when the request (1) and the (re) request (1), which are the same request, are generated as the recovery is executed, the conversion identifier (hereinafter referred to as a first conversion identifier) generated from the identifier included in the request (1) is added to the request (1), and another conversion identifier (hereinafter referred to as a second conversion identifier) generated from the identifier included in the (re) request (1) is added to the (re) request (1). That is, the first conversion identifier and the second conversion identifier that can distinguish and identify each request are added to the request (1) and the (re) request (1).

Then, each of the response (1) and the response (2) is, for instance, transmitted to the information processing device 1 while the first conversion identifier that can identify the request (1) corresponding to each response is held, and each of the (re) response (1) and the (re) response (2) is transmitted to the information processing device 1 while the second conversion identifier that can identify the (re) request (1) corresponding to each response is held.

Then, for instance, when the (re) response (1) is received after the response (1), the information processing device 1 determines that the identifier of the response (1) and the identifier of the (re) response (1) are the same, but the first conversion identifier of the response (1) and the second conversion identifier of the (re) response (1) are different from each other, and discards the (re) response (1). In addition, for instance, when the(re) response (2) is received after the response (1), it is determined that the identifier of the response (1) and the identifier of the (re) response (2) are the same, but the first conversion identifier of the response (1) and the second conversion identifier of the (re) response (2) are different from each other, and the (re) response (2) is discarded.

That is, in this case, the information processing device 1 determines that the (re) request (1), which is the same request as the request (1), has occurred, for instance, and discards the (re) response (1) and the (re) response (2).

On the other hand, for instance, when the response (2) is received after the response (1), the information processing device 1 determines that the identifier of the response (1) and the identifier of the response (2) are the same and the first conversion identifier of the response (1) and the first conversion identifier of the response (2) are the same, and does not discard the response (2).

Details of First Embodiment

Next, details of the first embodiment will be described. FIG. 19 to FIG. 25 are flowcharts illustrating details of the stream data process according to the first embodiment. In addition, FIG. 26A, to FIG. 28B are diagrams illustrating details of the stream data process according to the first embodiment.

Task Execution Process

First, within the stream data process, a process of executing a task for sensor data DT (hereinafter referred to as a task execution process) will be described.

Figure 19:
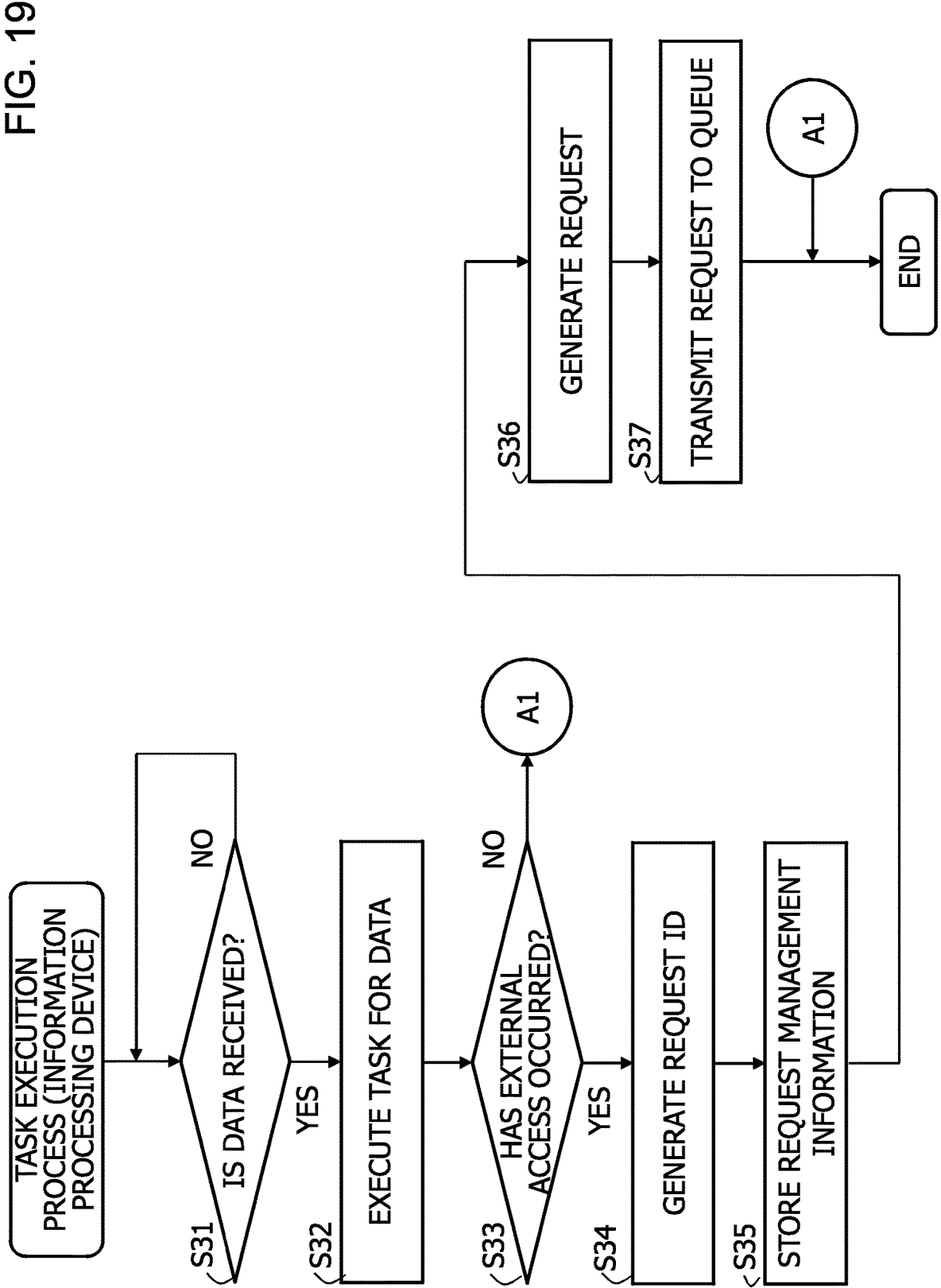

As illustrated in FIG. 19, for instance, the data reception unit 111 waits until the sensor data DT is received (NO in S31).

Then, when the sensor data DT is received (YES in S31), the application task execution unit 112 starts, for instance, execution of the task for the received sensor data DT (S32).

Subsequently, for instance, when there is a need to transmit a request to the external system 3 as the task for the sensor data DT is executed (YES in S33), the request management unit 113 generates a request ID for identifying the request for the external system 3 (S34). Then, the request management unit 113 stores, for instance, information including the request ID generated in the process of S34 as the request management information 131 in the information storage area 130 (S35). Hereinafter, specific examples of the request management information 131 will be described.

Specific Example (1) of Request Management Information

FIG. 26A, FIG. 26B, FIG. 26C and FIG. 35 are diagrams illustrating specific examples of the request management information 131 and the request management information 231. Specifically, FIG. 26A, FIG. 26C and FIG. 35 are diagrams illustrating specific examples of the request management information 131. In addition, FIG. 26B is a diagram illustrating a specific example of the request management information 231.

The request management information 131 illustrated in FIG. 26A and the like includes, as items, for instance, a "request ID" in which a request ID for identifying each request is set, a "time stamp" in which a generation time of the request management information 131 corresponding to each request is set, and a "timeout time" in which a timeout time corresponding to each request (a time at which waiting for the response corresponding to each request ends) is set.

Specifically, in the request management information 131 illustrated in FIG. 26A, "e4fde84d-eedc-3500-a9a0-000000000000" is set as the "request ID," "1614593910" is set as the "time stamp," and "1614594510" is set as the "timeout time."

Referring again to FIG. 19, the request management unit 113 generates, for instance, a request for the external system 3 from information items included in the request management information 131 stored in the information storage area 130 (S36). Hereinafter, specific examples of requests will be described.

Specific Example (1) of Request

FIG. 27A and FIG. 27B illustrate diagrams explaining specific examples of requests. Specifically, FIG. 27A is a diagram explaining a specific example of a request generated in the process of S36 (hereinafter referred to as a request RQ1). In addition, FIG. 27B is a diagram explaining a specific example of a request in which runtime-specific information is added to a request ID in the process of S55 to be described below (hereinafter referred to as a request RQ2).

In the request RQ1 illustrated in FIG. 27A, for instance, in "requestId," information of "request ID" included in the request management information 131 described in FIG. 26A is set. In addition, in the request RQ1 illustrated in FIG. 27A, for instance, in "eventTime," a time corresponding to a time of "time stamp" included in the request management information 131 described in FIG. 26A is set.

Specifically, in the request RQ1 illustrated in FIG. 27A, for instance, "e4fde84d-eedc-3500-a9a0-000000000000" is set as "requestId," and "1614593910128" is set as "eventTime."

Referring again to FIG. 19, the request transmission unit 114 transmits, for instance, the request generated in the process of S36 to the queue 5 (S37).

On the other hand, for instance, when there is no need to transmit a request to the external system 3 as the task is executed for the sensor data DT (NO in S33), the request management unit 113 and the request transmission unit 114 do not perform the process after S34.

First Timeout Process

Next, within the stream data process, a process performed when a request timeout occurs in the information processing device 1 (hereinafter referred to as a first timeout process) will be described.

Figure 20:
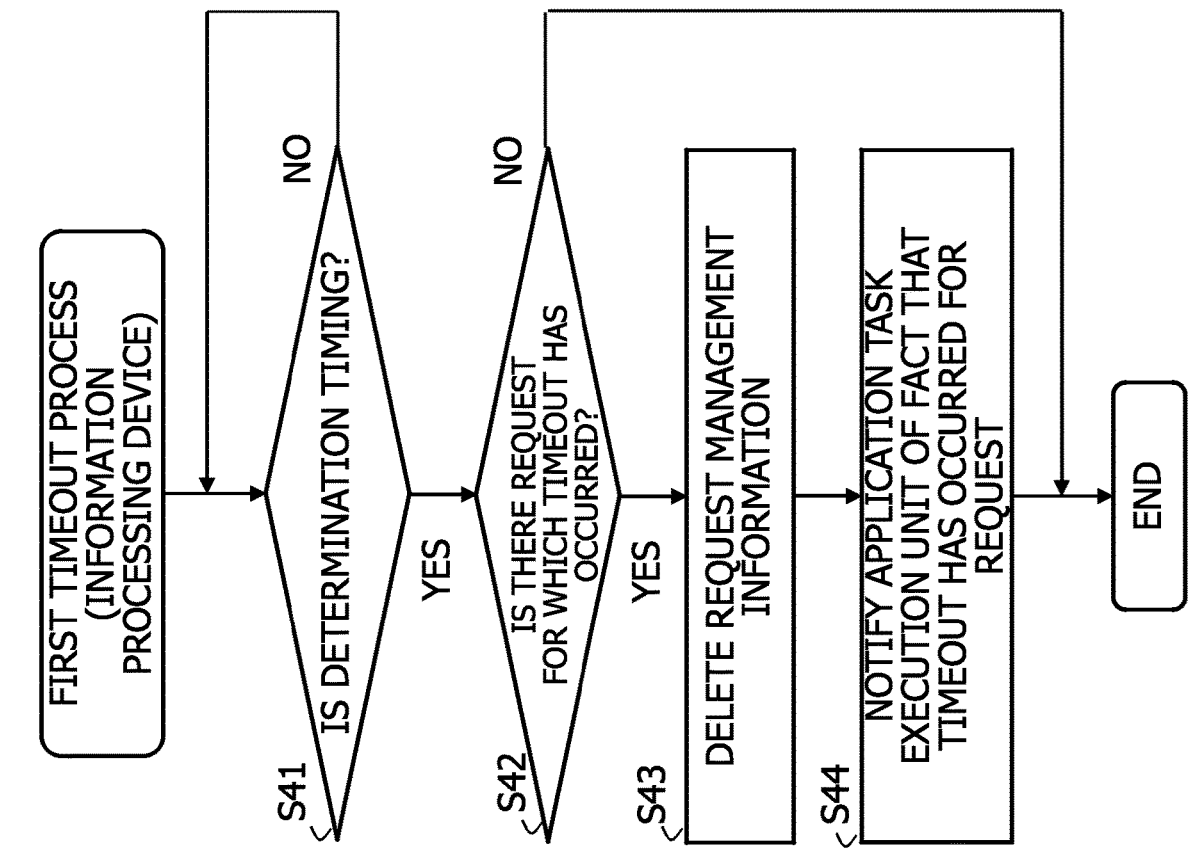

As illustrated in FIG. 20, for instance, the request management unit 113 waits until the determination timing is reached (NO in S41). The determination timing may be, for instance, a periodic timing, e.g., an interval of 1 minute.

Then, when the determination timing is reached (YES in S41), the request management unit 113 refers to, for instance, the request management information 131 stored in the information storage area 130, and determines whether there is a request for which a timeout has occurred (S42).

Specifically, the request management unit 113 refers to, for instance, the request management information 131 illustrated in FIG. 26A, and determines whether there is a request for which the time set in "timeout" has already passed.

As a result, when it is determined that there is a request for which a timeout has occurred (YES in S42), the request management unit 113 deletes the request management information 131 corresponding to the request for which it is determined that a timeout has occurred, for instance, within the request management information 131 stored in the information storage area 130 (S43).

Then, the request management unit 113 notifies the application task execution unit 112 of information indicating that a timeout has occurred for the request determined to exist in the process of S42 (S44).

On the other hand, when it is determined that there is no request for which a timeout has occurred (NO in S42), the request management unit 113 does not perform the process after S43.

Request Reception Process

Next, within the stream data process, a process performed when the access proxy execution device 2 receives the request transmitted from the information processing device 1 (hereinafter referred to as a request reception process) will be described.

Figure 21:
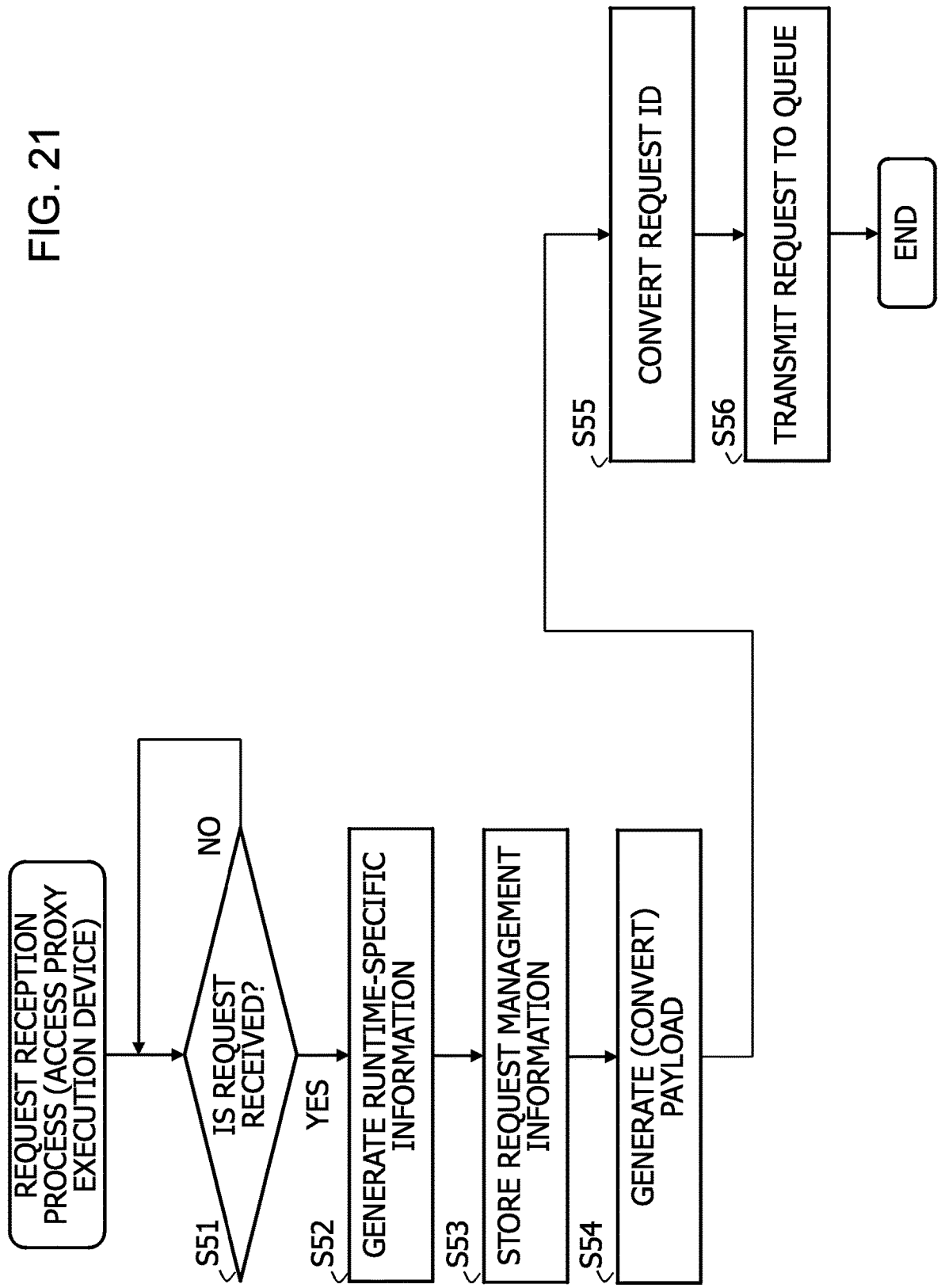

As illustrated in FIG. 21, for instance, the unique information generation unit 213 waits until the request reception unit 211 receives the request transmitted from the information processing device 1 (NO in S51).

Specifically, for instance, the unique information generation unit 213 waits until the request reception unit 211 acquires a request from the queue 5. Here, for instance, the request reception unit 211 may acquire a request at a periodic timing, e.g., an interval of 1 second.

Then, when the request reception unit 211 receives the request transmitted from the information processing device 1 (YES in S51), the unique information generation unit 213 generates, for instance, runtime-specific information corresponding to the received request (S52).

Specifically, the unique information generation unit 213 generates, for instance, a time stamp indicating the time when the request reception unit 211 receives the request as runtime-specific information.

Subsequently, the request management unit 214 stores, for instance, each information item including the runtime-specific information generated in the process of S52 as the request management information 231 in the information storage area 230 (S53). Hereinafter, specific examples of the request management information 231 will be described.

Specific Example (2) of Request Management Information

The request management information 231 illustrated in FIG. 26B includes, as items, for instance, a "request ID" in which a request ID for identifying each request is set, a "time stamp" in which a generation time of the request management information 231 corresponding to each request is set, and a "timeout time" in which a timeout time corresponding to each request (a time at which waiting for the response corresponding to each request ends) is set.

Specifically, in the request management information 231 illustrated in FIG. 26B, "e4fde84d-eedc-3500-a9a0-000000000000" is set as the "request ID," "1614593910" is set as the "time stamp," and "1614594510" is set as the "timeout time."

Referring again to FIG. 21, for instance, the request processing unit 215 generates (converts) a payload of the request received in the process of S51 (S54).

Specifically, the request processing unit 215 converts, for instance, the request received in the process of S51 into a state in which the external system 3 that transmits the request can be identified.

Then, the identifier conversion unit 216 converts, for instance, the request ID included in the request received in the process of S51 (S55).

Specifically, the identifier conversion unit 216 adds, for instance, the runtime-specific information generated in the process of S52 to the request ID included in the request received in the process of S51. Hereinafter, specific examples of requests after the process of S55 is performed will be described.

Specific Example (2) of Request

In the request RQ2 illustrated in FIG. 27B, for instance, the request ID whose end is converted into a time stamp (for instance, a time stamp indicating the time when the request reception unit 211 receives the request) is set in "requestId."

Specifically, in the request RQ2 illustrated in FIG. 27B, for instance, "e4fde84d-eedc-3500-a9a1-614593910764" is set as "requestId."

Referring again to FIG. 21, the request transmission unit 217 transmits, for instance, the request whose request ID is converted in the process of S55 to the queue 6 (S56).

Second Timeout Process

Next, within the stream data process, a process performed when a request timeout occurs in the access proxy execution device 2 (hereinafter referred to as a second timeout process) will be described.

Figure 22:
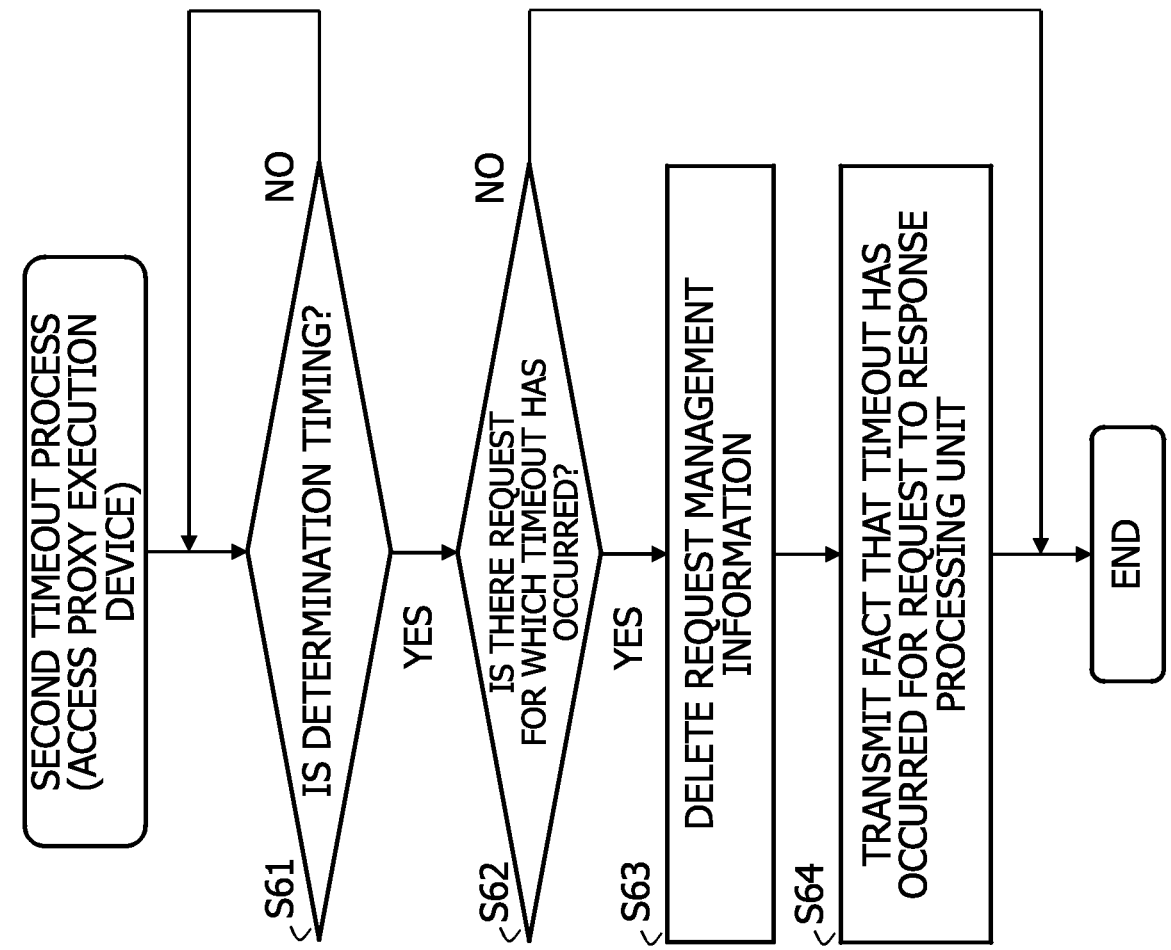

As illustrated in FIG. 22, for instance, the request management unit 214 waits until the determination timing is reached (NO in S61). The determination timing may be, for instance, a periodic timing, e.g., an interval of 1 minute.

Then, when the determination timing is reached (YES in S61), the request management unit 214 refers to, for instance, the request management information 231 stored in the information storage area 230, and determines whether there is a request for which a timeout has occurred (S62).

Specifically, the request management unit 214 refers to, for instance, the request management information 231 illustrated in FIG. 26B, and determines whether there is a request for which the time set in "timeout" has already passed.

As a result, when it is determined that there is a request for which a timeout has occurred (YES in S62), the request management unit 214 deletes the request management information 231 corresponding to the request for which it is determined that a timeout has occurred, for instance, within the request management information 231 stored in the information storage area 230 (S63).

Then, the request management unit 214 transmits information indicating that a timeout has occurred for the request determined to exist in the process of S62 to the response processing unit 221 (S64).

On the other hand, when it is determined that there is no request for which a timeout has occurred (NO in S62), the request management unit 214 does not perform the process after S63.

First Response Reception Process

Next, within the stream data process, a process performed when the access proxy execution device 2 receives the response transmitted from the external system 3 (hereinafter referred to as a first response reception process) will be described.

As illustrated in FIG. 23, for instance, the unique information extraction unit 219 waits until the response reception unit 218 receives the response transmitted from the external system 3 (NO in S71). Specifically, for instance, the unique information extraction unit 219 waits until the response reception unit 218 acquires the response from the queue 6. Here, the response reception unit 218 may acquire, for instance, the response at a periodic timing, e.g., an interval of 1 second. Hereinafter, specific examples of the response received in the process of S71 will be described.

Specific Example (1) of Response

FIG. 28A and FIG. 28B illustrate diagrams explaining specific examples of responses. Specifically, FIG. 28A is a diagram explaining a specific example of a response received in the process of S71 (hereinafter referred to as a response RS1). In addition, FIG. 28B is a diagram explaining a specific example of a response after conversion in the process of S79 to be described below (hereinafter referred to as a response RS2).

In the response RS1 illustrated in FIG. 28A, for instance, the request ID whose end is converted into a time stamp (a time stamp indicating the time when the request reception unit 211 receives the request) is set in "requestId." In addition, in the response RS1 illustrated in FIG. 28A, for instance, "hasNext" indicating whether each response is a final response is set. The final response is the last response transmitted from the external system 3 among the responses corresponding to the requests. In addition, in "hasNext," for instance, "false" indicating that each response is the final response or "true" indicating that each response is not the final response is set.

Specifically, in the response RS1 illustrated in FIG. 28A, for instance, "e4fde84d-eedc-3500-a9a1-614593910764" is set as "requestId" and "false" is set as "hasNext."

Referring again to FIG. 23, when the response transmitted from the external system 3 is received (YES in S71), the unique information extraction unit 219 restores the request ID included in the received response (S72).

Specifically, the unique information extraction unit 219 specifies, for instance, a part other than the runtime-specific information within the request ID included in the response received by the response reception unit 218 as the restored request ID.

In addition, the unique information extraction unit 219 adds, for instance, the runtime-specific information included in the response received in the process of S71 to the response received in the process of S71 (S73).

Specifically, a unique information extraction unit 119 sets the runtime-specific information in items other than the request ID in the response received in the process of S71.

Then, the request management unit 214 refers to, for instance, the request management information 231 stored in the information storage area 230, and determines whether there is the request management information 231 corresponding to the request including the request ID restored in the process of S72 (S74).

As a result, when it is determined that there is the request management information 231 corresponding to the request including the request ID restored in the process of S72 (YES in S74), the request management unit 214 adds, for instance, information needed for the request corresponding to the response received in the process of S71 to the response received in the process of S71 (S76).

Specifically, the request management unit 214 adds, for instance, information needed for processing the response in the information processing device 1 (for instance, information for identifying the task that outputs the request) within the information included in the request corresponding to the response received in the process of S71 (request received in the process of S51) to the response received in the process of S71.

Subsequently, the request management unit 214 determines, for instance, whether the response received in the process of S71 is the final response (S77).

Specifically, the request management unit 214 determines, for instance, whether the "hasNext" of the response received in the process of S71 is "false."

As a result, when it is determined that the response received in the process of S71 is the final response (YES in S77), the request management unit 214 deletes the request management information 231 determined to exist in the process of S74, for instance, within the request management information 231 stored in the information storage area 230 (S78).

On the other hand, when it is determined that the response received in the process of S71 is not the final response (NO in S77), the request management unit 214 does not perform the process of S78.

Then, for instance, the response processing unit 221 generates (converts) a payload of the response to which information is added in the process of S76 (S79). Hereinafter, specific examples of the response after conversion in the process of S79 will be described.

Specific Example (2) of Response

In the request RQ2 illustrated in FIG. 28B, for instance, the request ID reconverted by resetting "0" at the end (the request ID restored in the process of S72) is set in "requestId." In addition, in the request RQ2 illustrated in FIG. 28B, for instance, the runtime-specific information is set in "acceptedTime."

Specifically, in the request RQ2 illustrated in FIG. 28B, for instance, "e4fde84d-eedc-3500-a9a0-000000000000" is set as "requestId," "false" is set as "hasNext," and "1614593910764" is set as "acceptedTime."

Referring again to FIG. 23, the response transmission unit 222 transmits, for instance, the response converted in the process of S79 to the queue 5 (S80).

On the other hand, when it is determined that there is no request management information 231 corresponding to the request including the request ID restored in the process of S72 (NO in S74), the request management unit 214 discards the response received in the process of S71 (S75).

Second Response Reception Process

Next, within the stream data process, a process performed when the information processing device 1 receives the response transmitted from the external system 3 (hereinafter referred to as a second response reception process) will be described.

As illustrated in FIG. 24, for instance, the consistency determination unit 116 waits until the response reception unit 115 receives the response transmitted from the access proxy execution device 2 (NO in S81).

Specifically, for instance, the consistency determination unit 116 waits until the response reception unit 115 acquires a response from the queue 5. Here, the response reception unit 115 may acquire, for instance, the response at a periodic timing, e.g., an interval of 1 second.

Then, when the response reception unit 115 receives the response transmitted from the access proxy execution device 2 (YES in S81), the consistency determination unit 116 refers to, for instance, the request management information 131 stored in the information storage area 130, and determines whether there is the request management information 131 corresponding to the request ID included in the received response (S82).

As a result, when it is determined that there is the request management information 131 corresponding to the request ID included in the response received in the process of S81 (YES in S82), the consistency determination unit 116 determines, for instance, whether the request management information 131 determined to exist includes the runtime-specific information 132 (S84). The runtime-specific information 132 is runtime-specific information stored in the information storage area 130 in the process of S93 to be described below.

Figure 25:
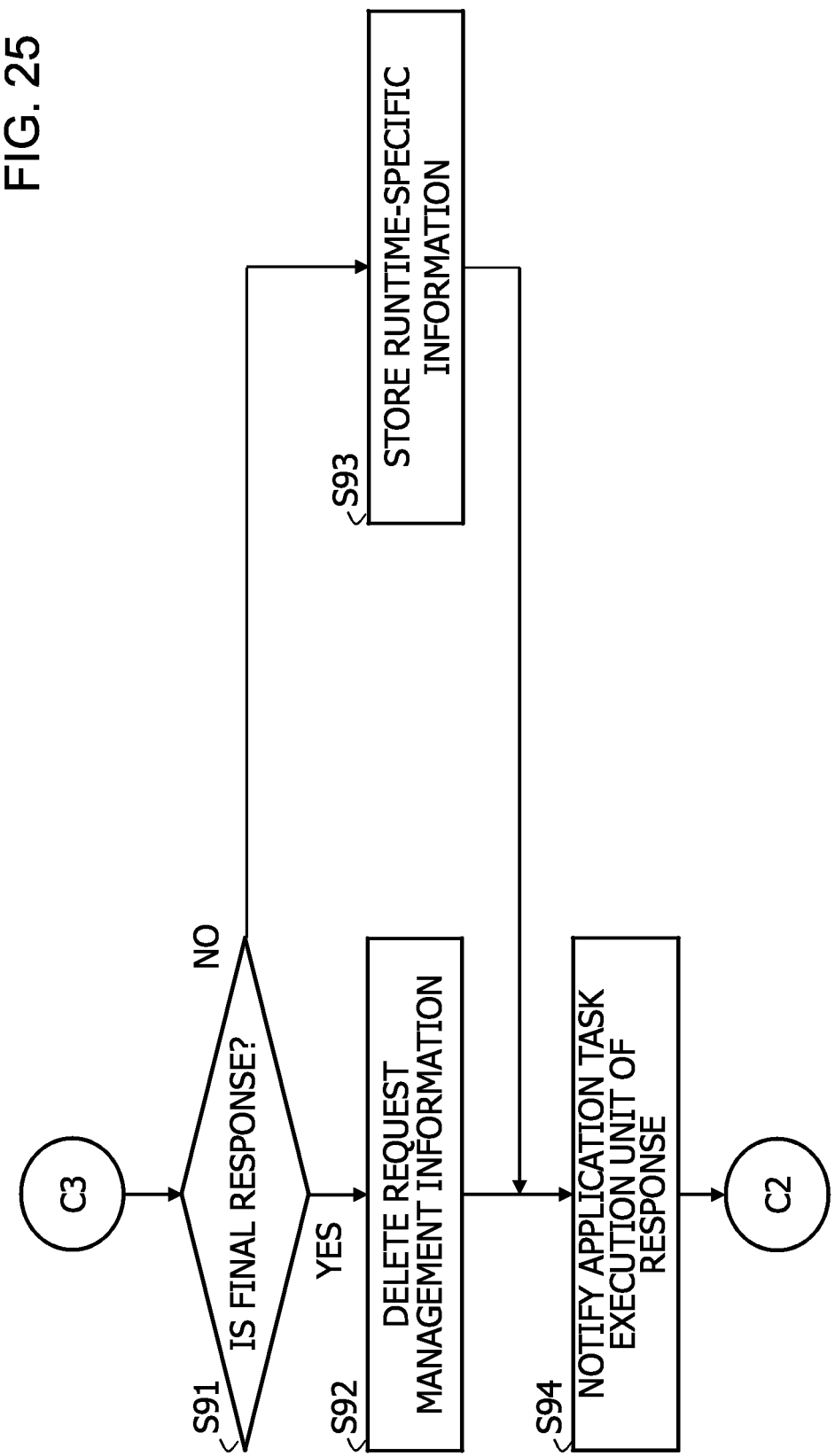

Then, when it is determined that the request management information 131 does not include the runtime-specific information 132 (NO in S84), as illustrated in FIG. 25, for instance, the consistency determination unit 116 determines whether the response received in the process of S81 is the final response (S91).

As a result, when it is determined that the response received in the process of S81 is the final response (YES in S91), the consistency determination unit 116 deletes the request management information 131 determined to exist in the process of S82, for instance, within the request management information 131 stored in the information storage area 130 (S92).

On the other hand, when it is determined that the response received in the process of S81 is not the final response (NO in S91), the consistency determination unit 116 stores, for instance, the runtime-specific information included in the response received in the process of S81 as the runtime-specific information 132 in the information storage area 130 (S93).

Specifically, as illustrated in FIG. 26C, for instance, the consistency determination unit 116 stores the runtime-specific information 132 as a part of the request management information 131 determined to exist in the process of S82 in the information storage area 130.

Then, after the process of S92 or S93, the consistency determination unit 116 notifies, for instance, the application task execution unit 112 of the response received in the process of S81 (S94).

On the other hand, when it is determined that the request management information 131 includes the runtime-specific information 132 (YES in S84), the consistency determination unit 116 determines whether the runtime-specific information included in the response received in the process of S81 matches the runtime-specific information 132 included in the request management information 131 determined to exist in the process of S82 (S85).

As a result, when it is determined that the runtime-specific information included in the response received in the process of S81 matches the runtime-specific information 132 included in the request management information 131 determined to exist in the process of S82 (YES in S85), the consistency determination unit 116 notifies, for instance, the application task execution unit 112 of the response received in the process of S81 (S86).

Then, the consistency determination unit 116 determines, for instance, whether the response received in the process of S81 is the final response (S87).

As a result, when it is determined that the response received in the process of S81 is the final response (YES in S87), the consistency determination unit 116 deletes, for instance, the request management information 131 determined to exist in the process of S82 within the request management information 131 stored in the information storage area 230 (S88).

On the other hand, when it is determined that the response received in the process of S81 is not the final response (NO in S87), the request management unit 214 does not perform the process of S88.

In addition, when it is determined that the runtime-specific information included in the response received in the process of S81 does not match the runtime-specific information 132 included in the request management information 131 determined to exist in the process of S82 (NO in S85), the consistency determination unit 116 discards, for instance, the response received in the process of S81 (S83).

That is, even when a response having the same request ID as the received response is received, if the runtime-specific information is different, the consistency determination unit 116 determines that the same response as the received response has been transmitted again. Then, in this case, the consistency determination unit 116 discards the response received in the process of S81 without notifying the application task execution unit 112 of the received response.

Thereby, the information processing device 1 can prevent the occurrence of inconsistency in the response transmitted from the external system 3.

Here, in a same manner, when it is determined that there is no request management information 131 corresponding to the request ID included in the response received in the process of S81 (NO in S82), the consistency determination unit 116 discards the response received in the process of S81 (S83).

In this manner, the information processing device 1 according to the present embodiment executes, for instance, a task for the received sensor data DT in response to receiving the sensor data DT to be processed. Then, when a process of performing a request for the external system 3 is executed as the task is executed for the sensor data DT, the information processing device 1 transmits the request to the access proxy execution device 2.

On the other hand, the access proxy execution device 2 according to the present embodiment converts the identifier included in the request into a reversibly convertible conversion identifier in response to receiving the request. Then, the access proxy execution device 2 transmits the request including the converted conversion identifier to the external system 3.

In addition, the access proxy execution device 2 reconverts the conversion identifier included in the response into an identifier in response to receiving the response corresponding to the request. Then, the access proxy execution device 2 transmits a response including the reconverted identifier and the conversion identifier to the information processing device 1.

That is, the access proxy execution device 2 according to the present embodiment converts the identifier included in the request into a conversion identifier, and therefore, even when the same request is transmitted a plurality of times as the recovery is executed, each request is transmitted to the external system 3 in a distinguishable manner. Then, when the access proxy execution device 2 receives the response from the external system 3, it transmits the received response to the information processing device 1 while the request corresponding to the response is distinguishable.

Thereby, even when the same request is transmitted a plurality of times as the recovery is executed, the information processing device 1 according to the present embodiment can identify a response corresponding to each request as the response corresponding to different requests. Therefore, the information processing device 1 can specify the response that needs to be discarded among the responses received from the access proxy execution device 2, and can prevent the occurrence of inconsistency in the response.

Outline of Second Embodiment

Figure 29:
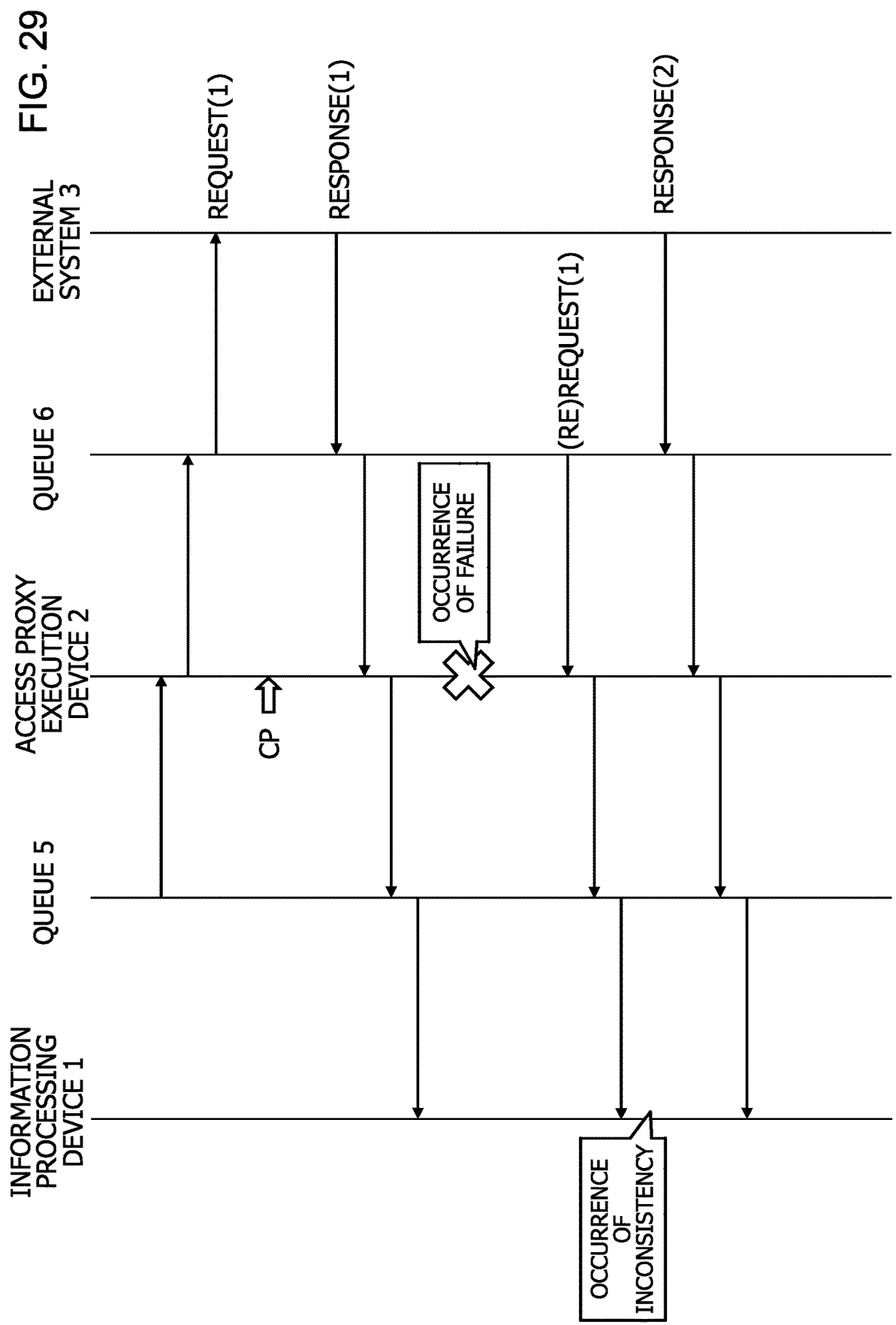
FIG. 29 is a diagram illustrating access to the external system 3.
Figure 30:
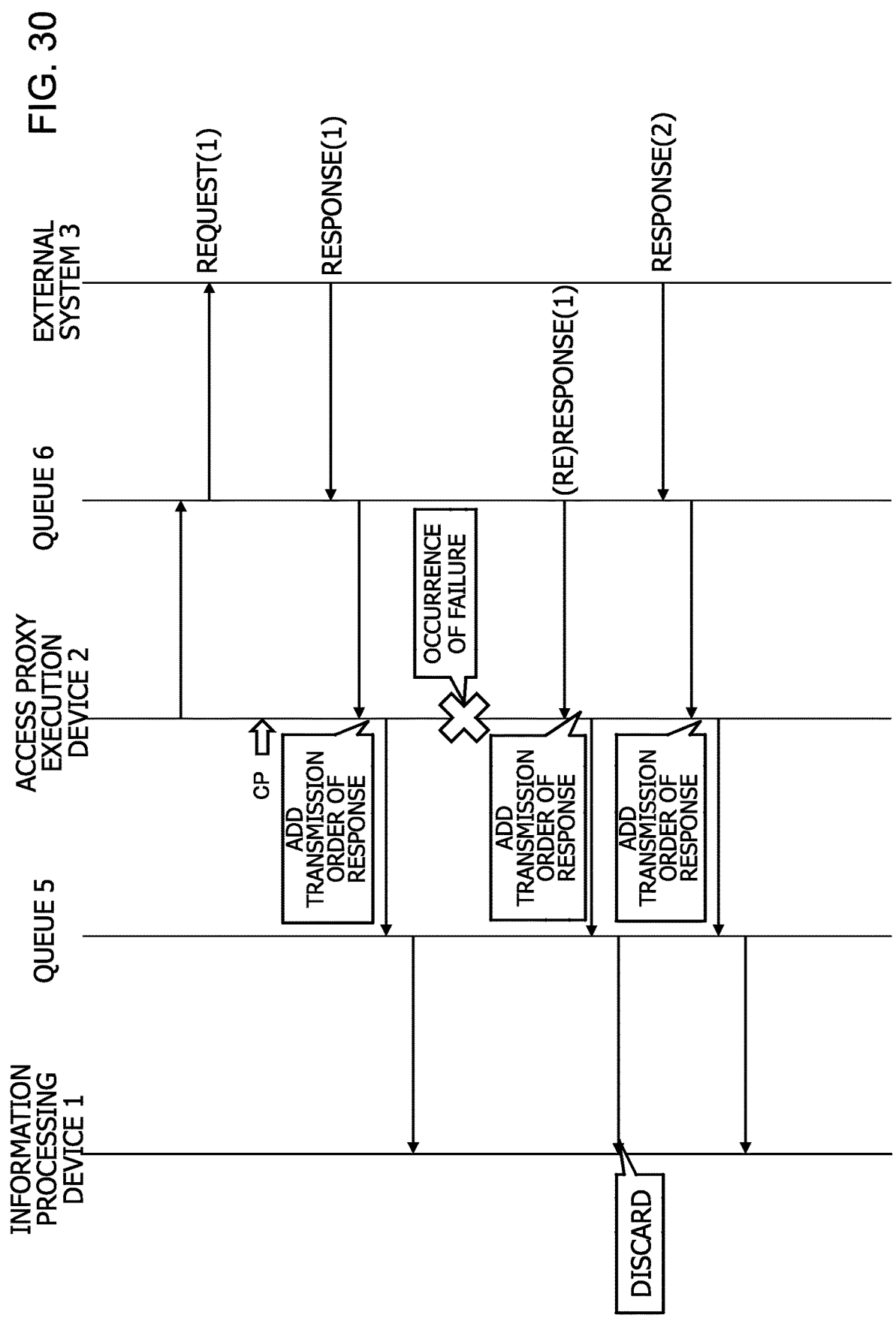
FIG. 30 is a diagram illustrating the outline of the stream data process according to the second embodiment.

Next, the outline of the second embodiment will be described. FIG. 29 is a diagram illustrating access to the external system 3. In addition, FIG. 30 is a diagram illustrating the outline of the stream data process according to the second embodiment. Hereinafter, points different from those of the stream data process according to the first embodiment will be described.

As illustrated in FIG. 29, for instance, when the internal state of the access proxy execution device 2 returns to a time CP due to recovery according to the occurrence of the failure, the access proxy execution device 2 may acquire again the response (1) acquired after the time CP from the queue 6 and transmit it to the information processing device 1 via the queue 5.

Therefore, in this case, the information processing device 1 receives the response (1) and the (re) response (1), which are responses having the same content, and inconsistency occurs in the response corresponding to the request (1).

Therefore, as illustrated in FIG. 30, the access proxy execution device 2 according to the second embodiment adds information indicating the transmission order from the external system 3 (the arrival order in the queue 6) to the response received from the external system 3. Then, the access proxy execution device 2 transmits the response to which the information indicating the transmission order from the external system 3 is added to the information processing device 1.

Then, when the information processing device 1 receives the response from the access proxy execution device 2, it determines whether the transmission order of the received response is later than the transmission order of other received responses. As a result, when it is determined that the transmission order of the received response is not later than the transmission order of other received responses, the information processing device 1 discards the received response.

That is, when the transmission order of the received response is not later than the transmission order of other received responses, the information processing device 1 determines that the received response has been transmitted again from the access proxy execution device 2 and discards the received response without notifying the application task execution unit 112 of the received response.

Thereby, the information processing device 1 according to the present embodiment can further minimize the occurrence of inconsistency in the response transmitted from the external system 3.

Details of Second Embodiment

Next, details of the second embodiment will be described. FIG. 31 to FIG. 34 are flowcharts illustrating details of the stream data process according to the second embodiment. In addition, FIG. 35 is a diagram illustrating details of the stream data process according to the second embodiment.
First Response Reception Process First, the first response reception process according to the second embodiment will be described.

As illustrated in FIG. 31, for instance, the unique information extraction unit 219 waits until the response reception unit 218 receives the response transmitted from the external system 3 (NO in S101).

Then, when the response reception unit 218 receives the response transmitted from the external system 3 (YES in S101), the unique information extraction unit 219 restores, for instance, the request ID included in the received response (S102).

In addition, the unique information extraction unit 219 and the specific information addition unit 220 add, for instance, the runtime-specific information and the response-specific information included in the response received in the process of S101 to the response received in the process of S101 (S103).

Specifically, the unique information extraction unit 119 sets, for instance, the runtime-specific information in the response received in the process of S101 (items other than the request ID of the response received in the process of S101).

In addition, the specific information addition unit 220 specifies, for instance, a storage position (offset) in the queue 6 in which the response received in the process of S101 is stored as response-specific information. Then, the specific information addition unit 220 sets, for instance, the response-specific information in the response received in the process of S101.

That is, the specific information addition unit 220 adds, for instance, response-specific information, which is information indicating the transmission order (the arrival order in the queue 6) of the response received in the process of S101 from the external system 3, to the response received in the process of S101.

Then, the request management unit 214 refers to, for instance, the request management information 231 stored in the information storage area 230, and determines whether there is the request management information 231 corresponding to the request including the request ID restored in the process of S102 (S104).

As a result, when it is determined that there is the request management information 231 corresponding to the request including the request ID restored in the process of S102 (YES in S104), the request management unit 214 adds information needed for the request corresponding to the response received in the process of S101 to the response received in the process of S101 (S106).

Subsequently, it is determined whether the response received in the process of S101 is the final response (S107).

As a result, when it is determined that the response received in the process of S101 is the final response (YES in S107), the request management unit 214 deletes the request management information 231 determined to exist in the process of S104, for instance, within the request management information 231 stored in the information storage area 230 (S108).

On the other hand, when it is determined that the response received in the process of S101 is not the final response (NO in S107), the request management unit 214 does not perform the process of S108.

Then, for instance, the response processing unit 221 generates (converts) a payload of the response to which information is added in the process of S106 (S109).

Then, the response transmission unit 222 transmits, for instance, the response converted in the process of S109 to the queue 5 (S110).

On the other hand, when it is determined that there is no request management information 231 corresponding to the request including the request ID restored in the process of S102 (NO in S104), the request management unit 214 deletes the request management information 231 determined to exist in the process of S104 (S105).
Third Response Reception Process Next, within the stream data process according to the second embodiment, a process performed when the information processing device 1 receives the response transmitted from the external system 3, which is a process performed before the second response reception process (hereinafter referred to as a third response reception process) will be described.

Figure 32:
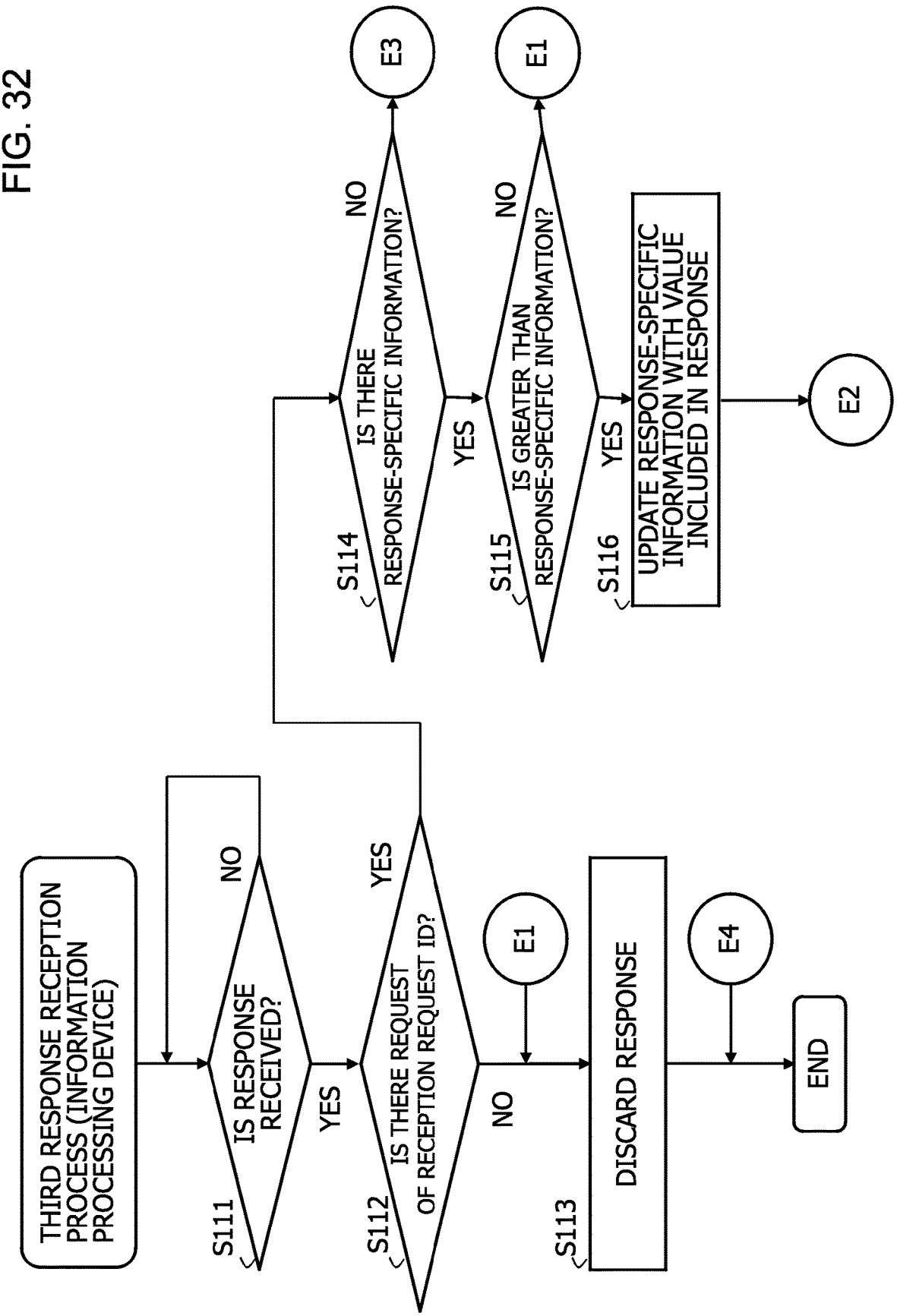

As illustrated in FIG. 32, for instance, the duplication determination unit 117 waits until the response reception unit 115 receives the response transmitted from the access proxy execution device 2 (NO in S111).

Then, when the response reception unit 115 receives the response transmitted from the access proxy execution device 2 (YES in S111), the duplication determination unit 117 refers to, for instance, the request management information 131 stored in the information storage area 130, and determines whether there is the request management information 131 corresponding to the request ID included in the received response (S112).

As a result, when it is determined that there is the request management information 131 corresponding to the request ID included in the response received in the process of S111 (YES in S112), the duplication determination unit 117 determines, for instance, whether the request management information 131 determined to exist includes the response-specific information 133 (S114). The response-specific information 133 is response-specific information stored in the information storage area 130 in the process of S133 to be described below.

Figure 34:
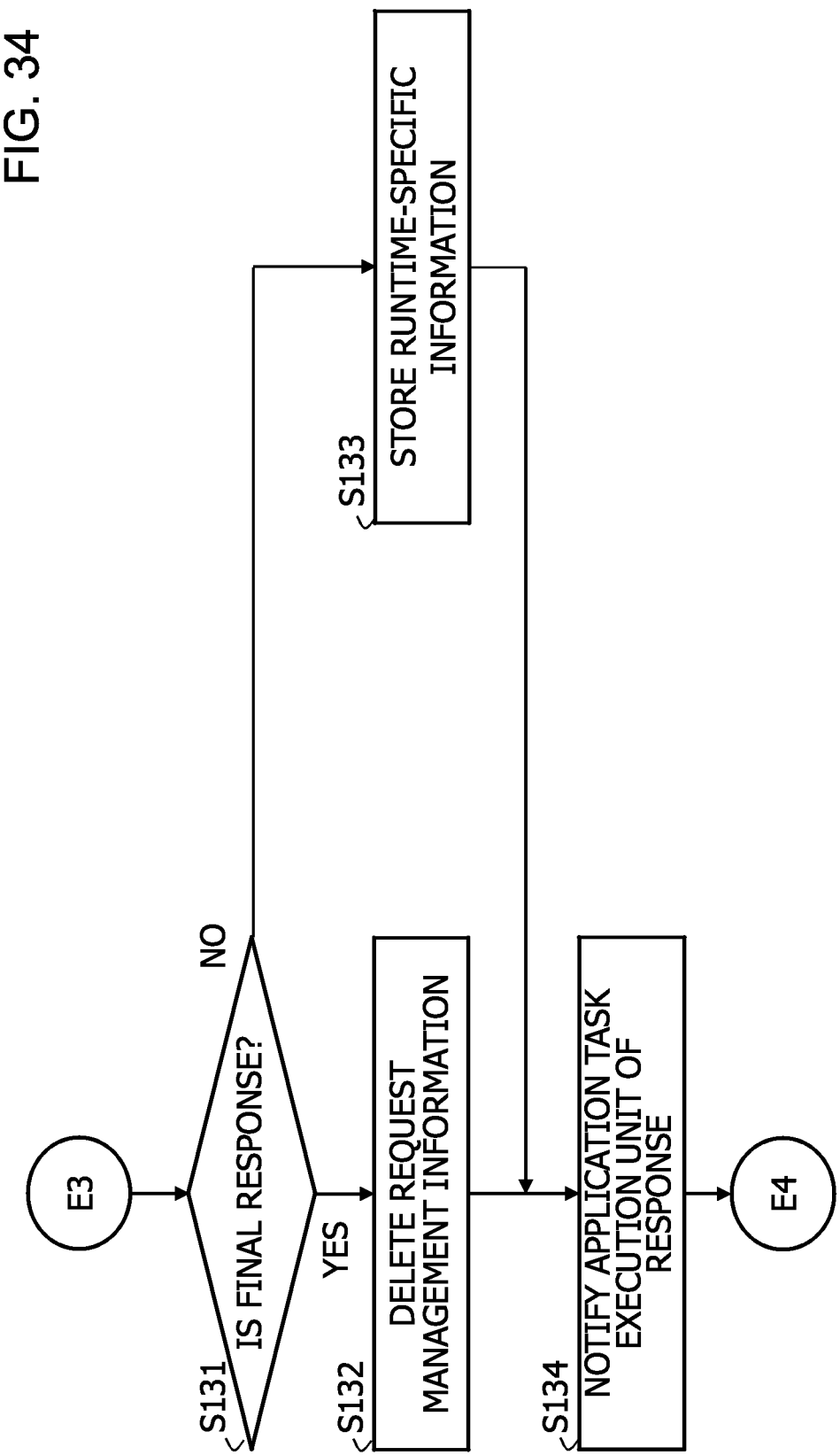

Then, when it is determined that the request management information 131 does not include the response-specific information 133 (NO in S114), as illustrated in FIG. 34, the duplication determination unit 117 determines whether the response received in the process of S111 is the final response (S131).

As a result, when it is determined that the response received in the process of S111 is the final response (YES in S131), the duplication determination unit 117 deletes, for instance, the request management information 131 determined to exist in the process of S112 within the request management information 131 stored in the information storage area 130 (S132).

On the other hand, when it is determined that the response received in the process of S111 is not the final response (NO in S131), the duplication determination unit 117 stores, for instance, the response-specific information included in the response received in the process of S111 as the response-specific information 133 in the information storage area 130 (S133).

Specifically, as illustrated in FIG. 35, for instance, the request management unit 113 stores the response-specific information 133 as a part of the request management information 131 determined to exist in the process of S112 in the information storage area 130.

Then, after the process of S132 or S133, the duplication determination unit 117 notifies, for instance, the application task execution unit 112 of the response received in the process of S111 (S134).

On the other hand, when it is determined that the request management information 131 includes the response-specific information 133 (YES in S114), the request management unit 113 determines, for instance, whether the response-specific information included in the response received in the process of S111 is greater than the response-specific information 133 included in the request management information 131 determined to exist in the process of S112 (S115).

As a result, when it is determined that the response-specific information included in the response received in the process of S111 is greater than the response-specific information 133 included in the request management information 131 determined to exist in the process of S112 (YES in S115), the duplication determination unit 117 updates, for instance, the response-specific information 133 included in the request management information 131 determined to exist in the process of S112 with the response-specific information included in the response received in the process of S111 (S116).

Figure 33:
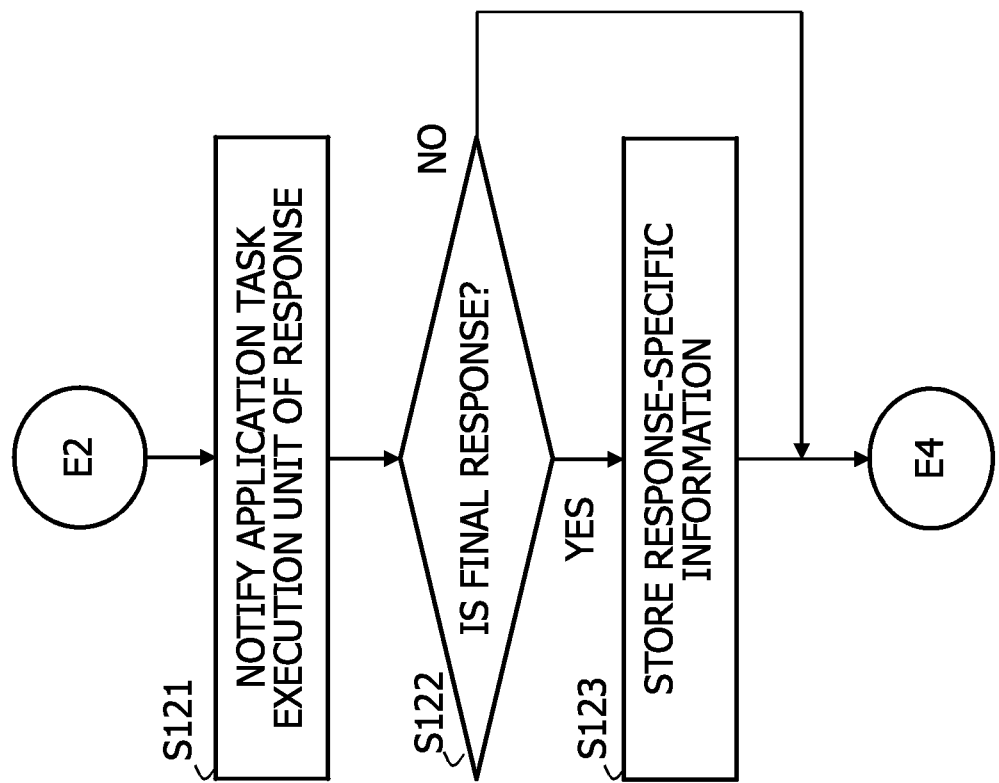

Then, as illustrated in FIG. 33, the duplication determination unit 117 notifies the application task execution unit 112 of the response received in the process of S111 (S121).

Then, the duplication determination unit 117 determines whether the response received in the process of S111 is the final response (S122).

As a result, when it is determined that the response received in the process of S111 is the final response (YES in S122), the duplication determination unit 117 deletes, for instance, the request management information 131 determined to exist in the process of S112 within the request management information 131 stored in the information storage area 130 (S123).

On the other hand, when it is determined that the response received in the process of S111 is not the final response (NO in S122), the request management unit 214 does not perform the process of S123.

In addition, for instance, when it is determined that the response-specific information included in the response received in the process of S111 is not greater than the response-specific information 133 included in the request management information 131 determined to exist in the process of S112 (NO in S115), the duplication determination unit 117 discards the request received in the process of S111 (S113).

That is, when the response-specific information of the response received in the process of S111 is not greater than the response-specific information 133 stored in the information storage area 130, the information processing device 1 determines that the received response has been transmitted again from the access proxy execution device 2, and discards the response received in the process of S111.

Thereby, the information processing device 1 according to the present embodiment can further minimize the occurrence of inconsistency in the response transmitted from the external system 3.

Here, in a same manner, for instance, when it is determined that there is no request management information 131 corresponding to the request ID included in the response received in the process of S111 (NO in S112), the duplication determination unit 117 discards the request received in the process of S111 (S113).

Outline of Third Embodiment

Figure 36:
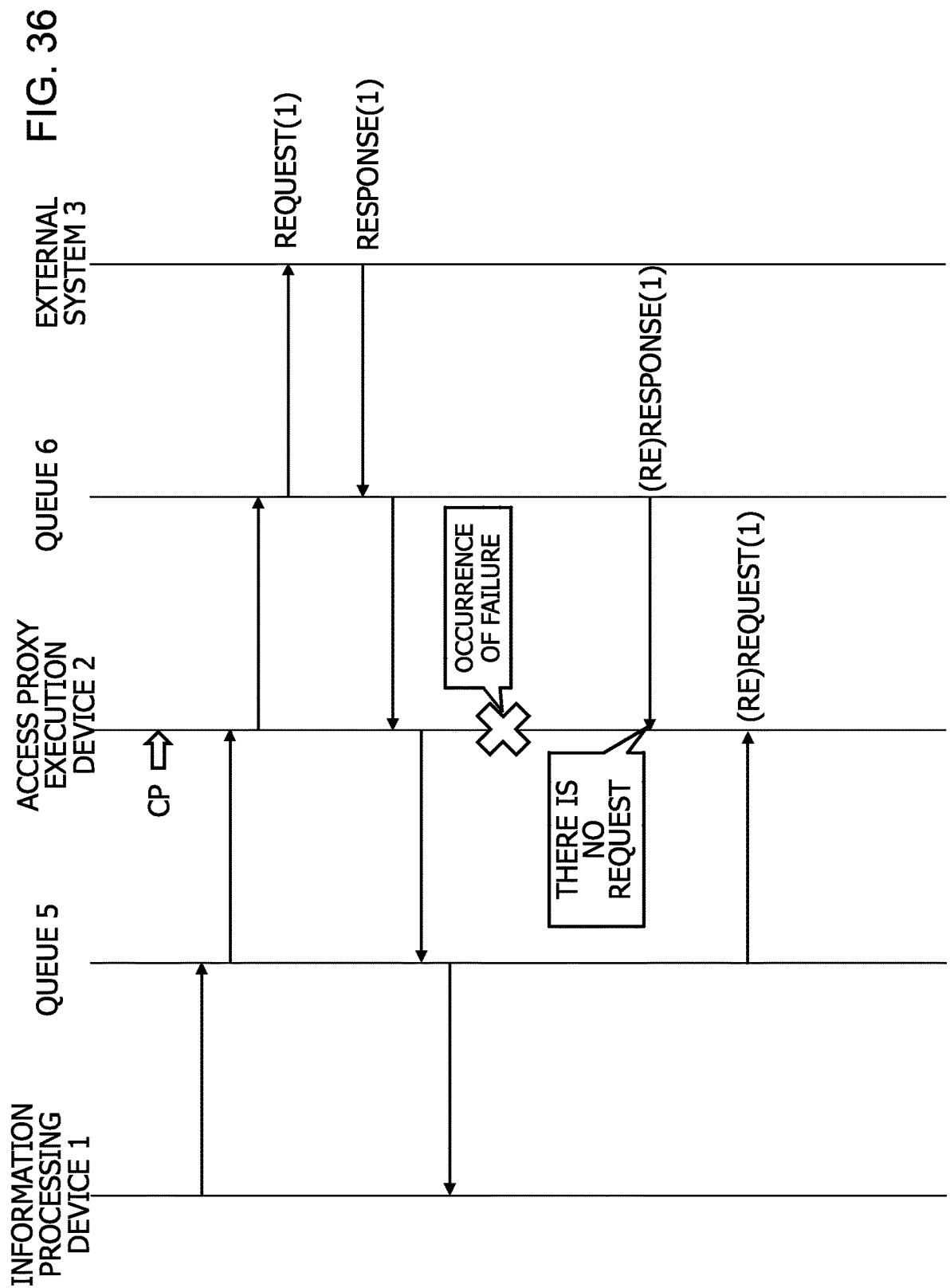
FIG. 36 is a diagram illustrating access to the external system 3.
Figure 37:
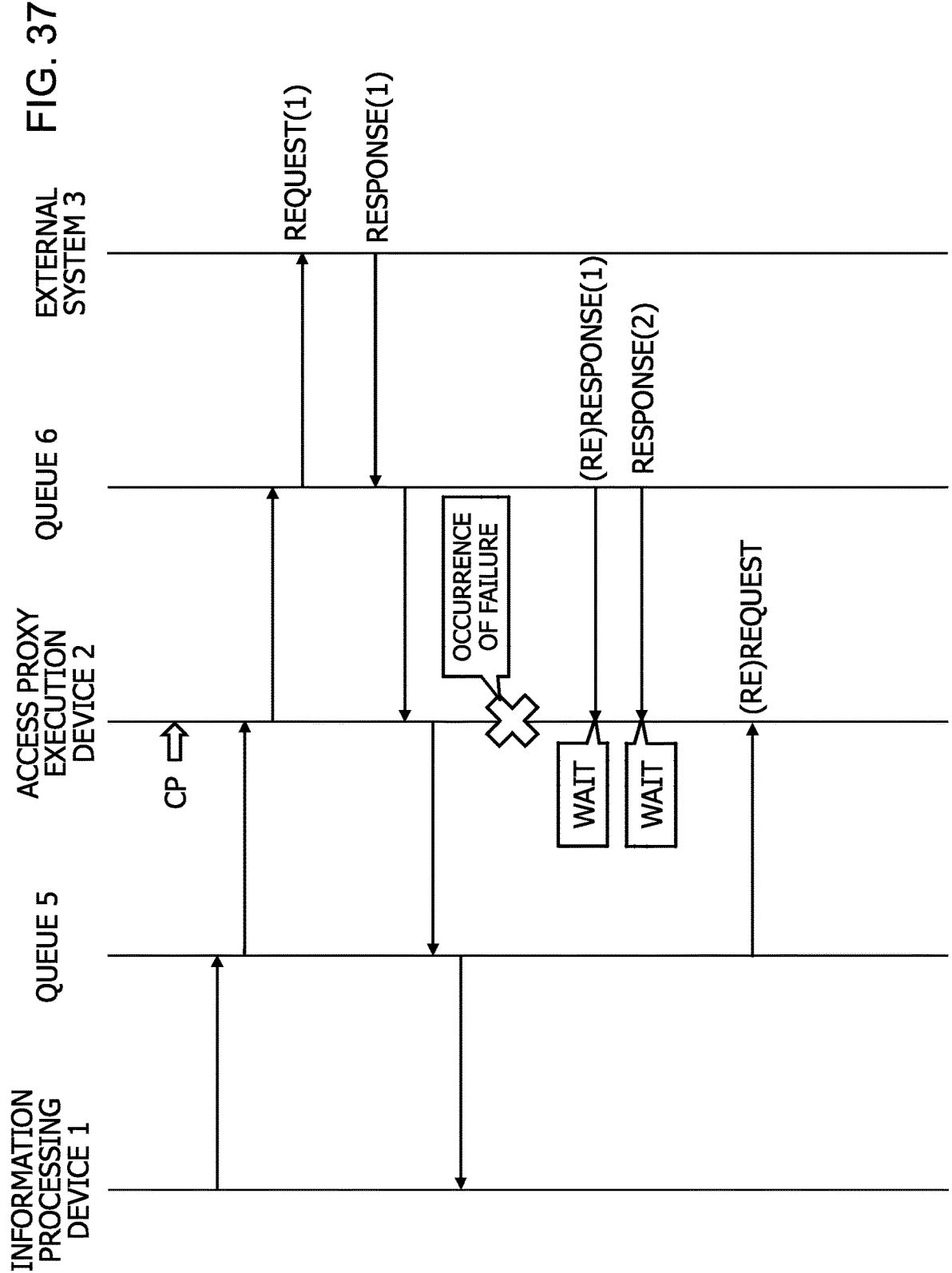
FIG. 37 is a diagram illustrating the outline of the stream data process according to the third embodiment.

Next, the outline of the third embodiment will be described. FIG. 36 is a diagram illustrating access to the external system 3. In addition, FIG. 37 is a diagram illustrating the outline of the stream data process according to the third embodiment. Hereinafter, points different from those of the stream data process according to the first embodiment will be described.

As illustrated in FIG. 36, for instance, when the internal state of the access proxy execution device 2 returns to a time CP due to recovery according to the occurrence of the failure, the access proxy execution device 2 may acquire again the request (1) acquired after the time CP from the queue 5 and transmit it to the external system 3 via the queue 6, and acquire again the response (1) acquired after the time CP from the queue 6 and transmit it to the information processing device 1 via the queue 5.

In this case, the access proxy execution device 2 can acquire the (re) response (1) before the (re) request (1). Therefore, even when the access proxy execution device 2 receives the (re) response (1), since there is no request management information 231 corresponding to the (re) request (1), the received (re) response (1) may be discarded. Therefore, in this case, the information processing device 1 is not able to receive all the responses for the request (1), and inconsistency occurs in the response corresponding to the request (1).

Here, as illustrated in FIG. 37, when the access proxy execution device 2 according to the third embodiment receives the response transmitted from the external system 3 before the request transmitted from the information processing device 1, it waits until the request corresponding to the received response is received.

Thereby, the information processing device 1 according to the present embodiment can further minimize the occurrence of inconsistency in the response transmitted from the external system 3.

Details of Third Embodiment

Next, details of the third embodiment will be described. FIG. 38 to FIG. 41 are flowcharts illustrating details of the stream data process according to the third embodiment. Hereinafter, the response waiting until the request is received will be referred to as a wait response.
Request Reception Process Next, the request reception process according to the third embodiment will be described.

Figure 38:
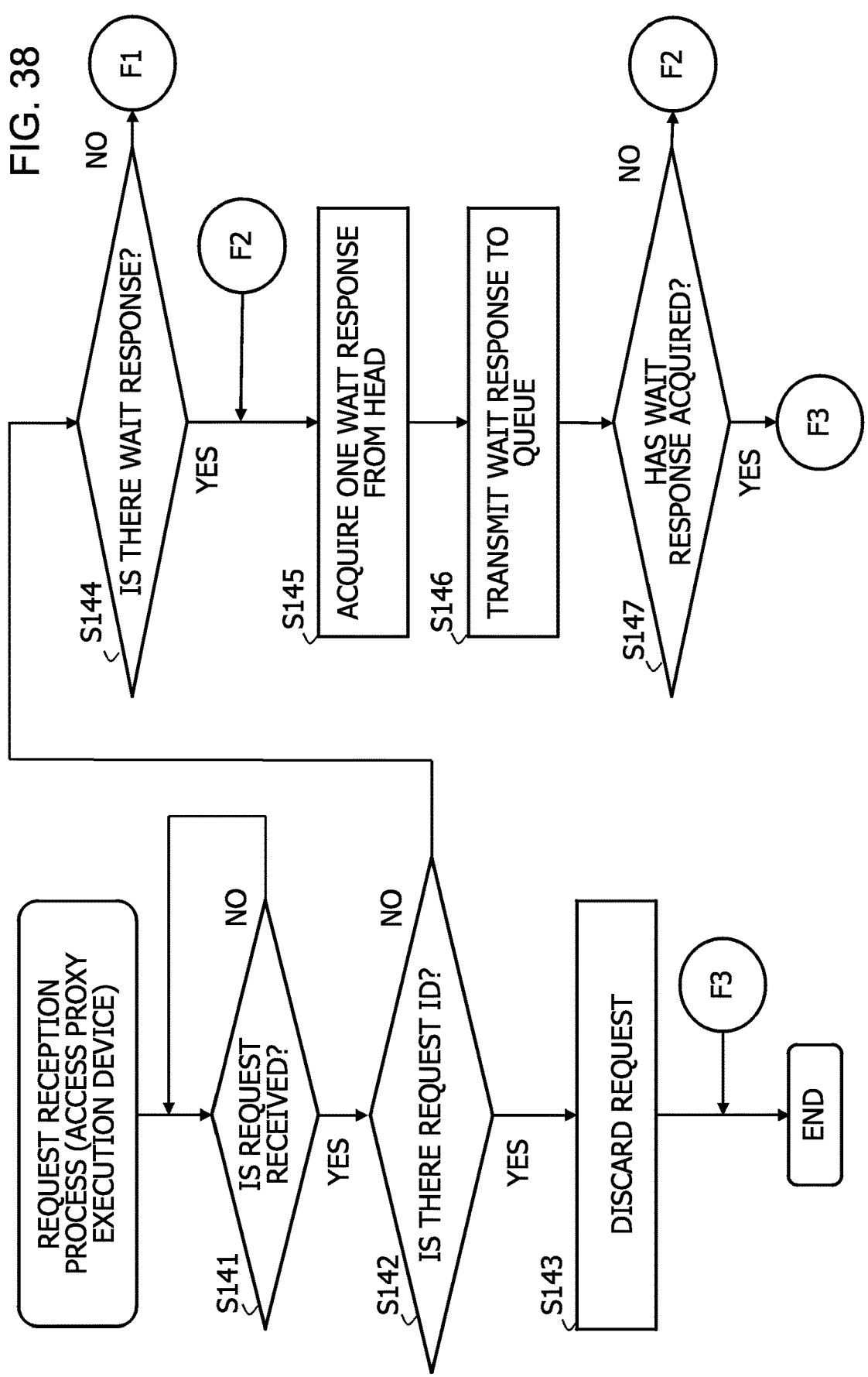

As illustrated in FIG. 38, for instance, the request management unit 214 waits until the request reception unit 211 receives the request transmitted from the information processing device 1 (NO in S141).

Then, when the request reception unit 211 receives the request transmitted from the information processing device 1 (YES in S141), the request management unit 214 refers to, for instance, the request management information 231 stored in the information storage area 230, and determines whether there is the request management information 231 corresponding to the request ID included in the request received in the process of S141 (S142).

As a result, when it is determined that there is the request management information 231 corresponding to the request ID included in the request received in the process of S141 (YES in S142), the request management unit 214 discards, for instance, the request received in the process of S141 (S143).

On the other hand, when it is determined that there is no request management information 231 corresponding to the request ID included in the request received in the process of S141 (NO in S142), the request management unit 214 determines, for instance, whether there is a wait response corresponding to the request ID included in the request received in the process of S141 in a wait response queue (not illustrated) (S144).

As a result, when it is determined that there is a wait response corresponding to the request ID included in the request received in the process of S141 (YES in S144), the request management unit 214 acquires, for instance, one wait response determined to exist from the head (S145).

Subsequently, the response transmission unit 222 transmits, for instance, the wait response acquired in the process of S145 to the queue 5 (S146).

Specifically, for instance, the response transmission unit 222 generates (converts) a payload of the wait response acquired in the process of S145 and transmits the converted response to the queue 5.

Then, when all the wait responses corresponding to the request ID included in the request received in the process of S141 are acquired (YES in S147), the access proxy execution device 2 ends the request reception process.

On the other hand, when all the wait responses corresponding to the request ID included in the request received in the process of S141 are not acquired (NO in S147), the request management unit 214 performs the process after S145 again.

Figure 39:
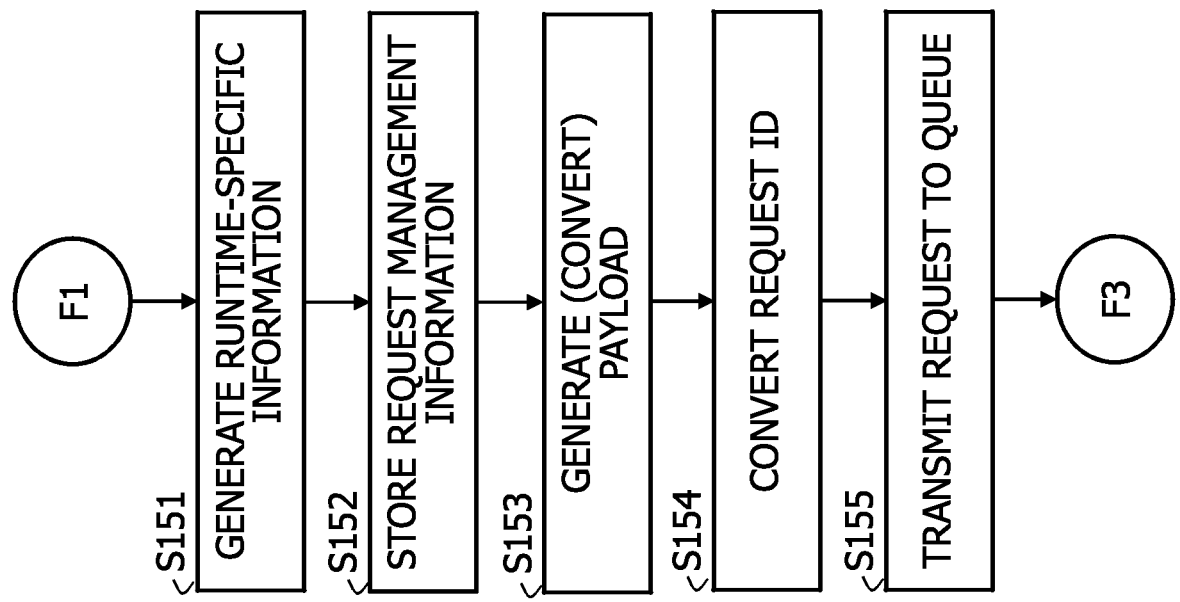

In addition, when it is determined that there is no wait response corresponding to the request ID included in the request received in the process of S141 (NO in S144), as illustrated in FIG. 39, the unique information generation unit 213 generates, for instance, runtime-specific information corresponding to the request received in the process of S141 (S151).

Subsequently, the request management unit 214 stores, for instance, each information item including the runtime-specific information generated in the process of S151 as the request management information 231 in the information storage area 230 (S152).

Then, for instance, the request processing unit 215 generates (converts) a payload of the request received in the process of S152 (S153).

In addition, the identifier conversion unit 216 converts, for instance, the request ID included in the request received in the process of S152 (S154).

Then, the request transmission unit 217 transmits, for instance, the request whose request ID is converted in the process of S154, to the queue 6 (S155).
First Response Reception Process Next, the first response reception process according to the third embodiment will be described.

As illustrated in FIG. 40, for instance, the unique information extraction unit 219 waits until the response reception unit 218 receives the response transmitted from the external system 3 (NO in S161).

Then, when the response reception unit 218 receives the response transmitted from the external system 3 (YES in S161), the unique information extraction unit 219 restores, for instance, the request ID included in the received response (S162).

In addition, the unique information extraction unit 219 adds, for instance, the runtime-specific information included in the response received in the process of S161 to the response received in the process of S161 (S163).

Then, the request management unit 214 refers to, for instance, the request management information 231 stored in the information storage area 230, and determines whether there is the request management information 231 corresponding to the request including the request ID restored in the process of S162 (S164).

As a result, when it is determined that there is the request management information 231 corresponding to the request including the request ID restored in the process of S162 (YES in S164), the request management unit 214 adds, for instance, information needed for the request corresponding to the response received in the process of S161 to the response received in the process of S161 (S166).

Subsequently, the request management unit 214 determines, for instance, whether the response received in the process of S161 is the final response (S167).

As a result, when it is determined that the response received in the process of S161 is the final response (YES in S167), the request management unit 214 deletes the request management information 231 determined to exist in the process of S164, for instance, within the request management information 231 stored in the information storage area 230 (S168).

On the other hand, when it is determined that the response received in the process of S161 is not the final response (NO in S167), the request management unit 214 does not perform the process of S168.

Then, for instance, the response processing unit 221 generates (converts) a payload of the response to which information is added in the process of S166 (S169).

Then, the response transmission unit 222 transmits, for instance, the response converted in the process of S169 to the queue 5 (S170).

On the other hand, when it is determined that there is no request management information 231 corresponding to the request including the request ID restored in the process of S162 (NO in S164), the request management unit 214 adds, for instance, the response received in the process of S161 as a wait response to the wait response queue (S165).

That is, in this case, the request management unit 214 waits for the request corresponding to the response received in the process of S161 by setting the response received in the process of S161 as a wait response.

Thereby, the information processing device 1 according to the present embodiment can further minimize the occurrence of inconsistency in the response transmitted from the external system 3.

Response Deletion Process

Next, within the stream data process according to the third embodiment, a process of deleting a wait response stored in the wait response queue (hereinafter referred to as a response deletion process) will be described.

Figure 41:
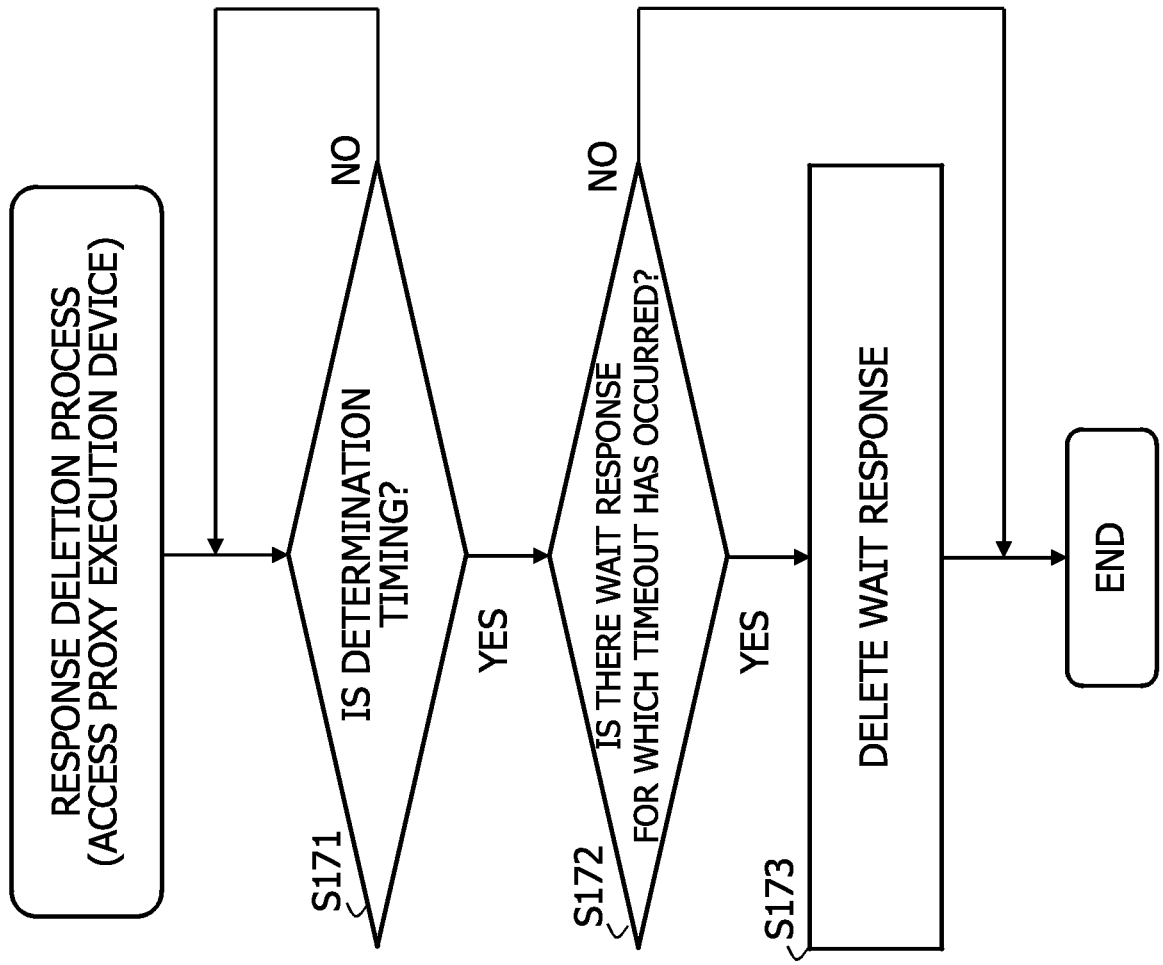

As illustrated in FIG. 41, for instance, the request management unit 214 waits until the determination timing is reached (NO in S171). The determination timing may be, for instance, a periodic timing, e.g., an interval of 1 minute.

Then, when the determination timing is reached (YES in S171), the request management unit 214 determines, for instance, whether there is a wait response in which the time elapsed since it is stored in the queue is a predetermined time or longer among wait responses stored in the wait response queue (S172).

As a result, when it is determined that there is a wait response in which the time elapsed since it is stored in the queue is a predetermined time or longer (YES in S172), the request management unit 214 deletes, for instance, the wait response in which the time elapsed since it is stored in the queue is a predetermined time or longer among wait responses stored in the wait response queue (S173).

On the other hand, when it is determined that there is no wait response in which the time elapsed since it is stored in the queue is a predetermined time or longer (NO in S172), the request management unit 214 does not perform the process of S173.

Outline of Fourth Embodiment

Figure 42:
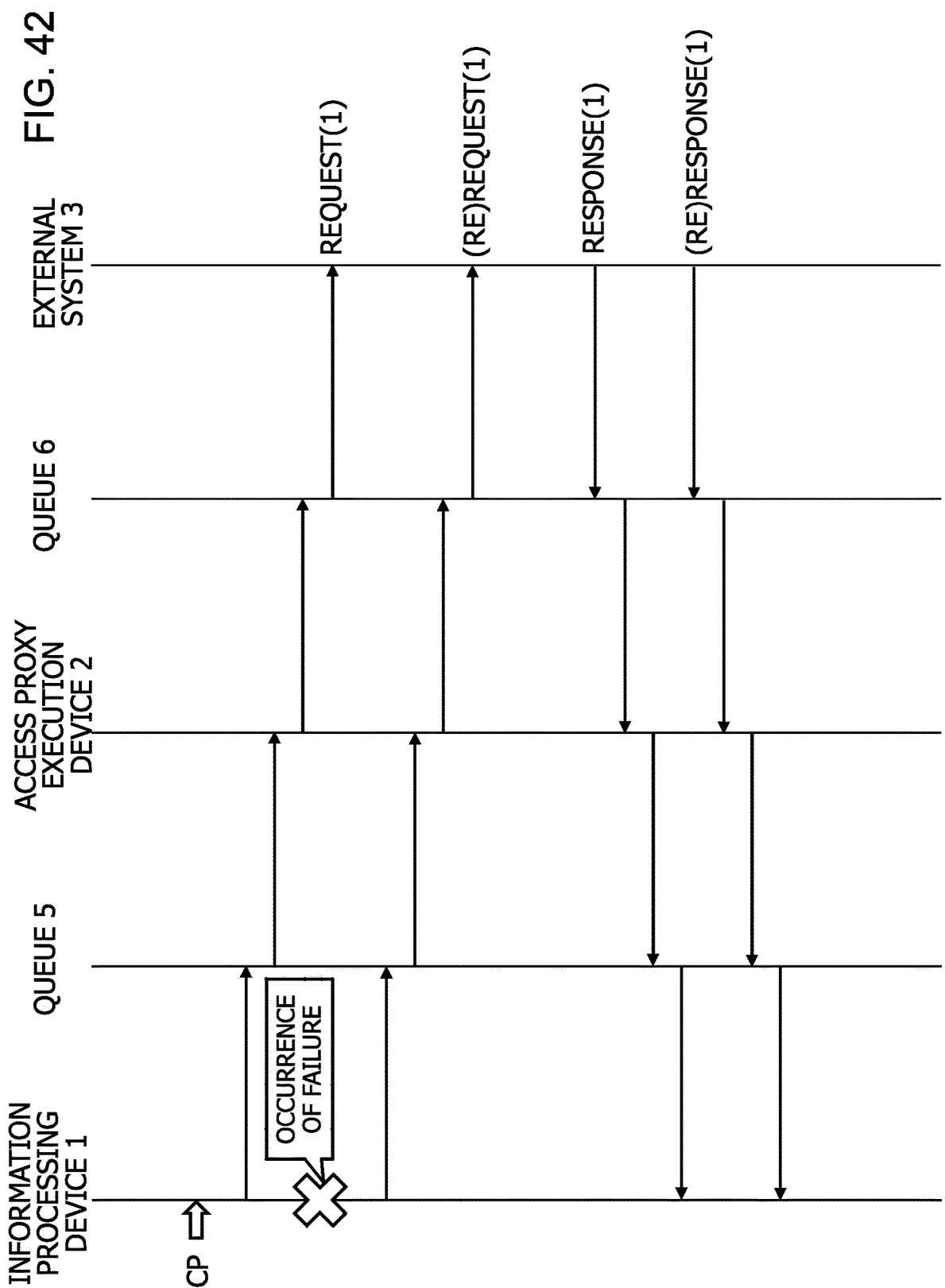
FIG. 42 is a diagram illustrating access to the external system 3.
Figure 43:
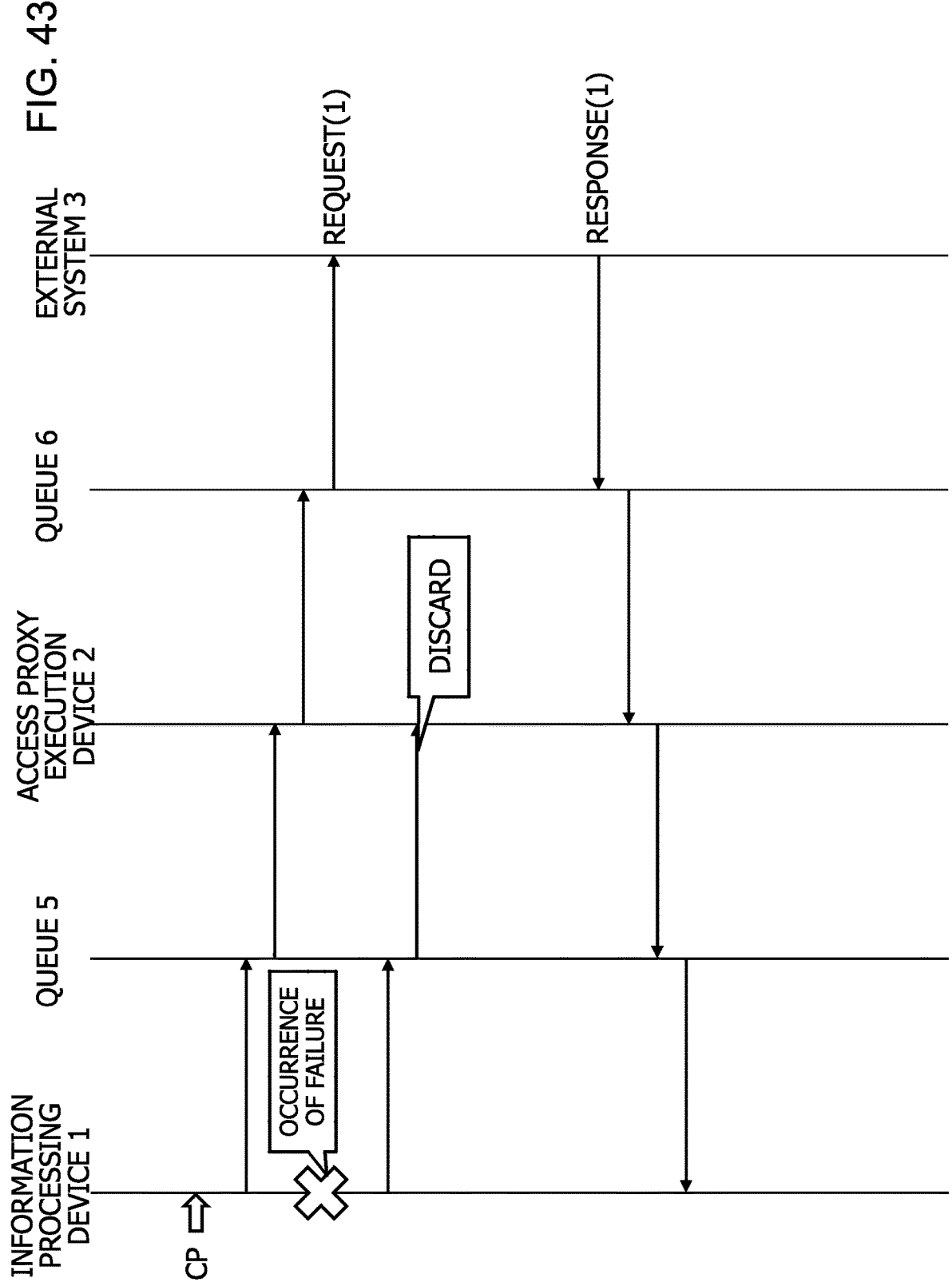
FIG. 43 is a diagram illustrating the outline of the stream data process according to the fourth embodiment.

Next, the outline of the fourth embodiment will be described. FIG. 42 is a diagram illustrating access to the external system 3. In addition, FIG. 43 is a diagram illustrating the outline of the stream data process according to the fourth embodiment. Hereinafter, points different from those of the stream data process according to the first embodiment will be described.

As illustrated in FIG. 42, for instance, when the internal state of the information processing device 1 returns to a time CP due to recovery according to the occurrence of the failure, the information processing device 1 transmits again the request transmitted after the time CP to the queue 5.

Therefore, in this case, the request (1) is transmitted to the external system 3 twice, and the external system 3 transmits the (re) response (1) corresponding to the (re) request (1) in addition to the response (1) corresponding to the request (1) to the information processing device 1. That is, in this case, the information processing device 1 receives the response (1) and the (re) response (1), which are responses having the same content, and inconsistency occurs in the response corresponding to the request (1).

Therefore, as illustrated in FIG. 43, when the request is received from the information processing device 1, the access proxy execution device 2 according to the fourth embodiment stores the request ID included in the received request. Then, when the access proxy execution device 2 receives another request having the stored request ID from the information processing device 1, it discards the received other request without transmitting the received other request to the queue 6.

That is, when the access proxy execution device 2 receives a request having the same request ID as the request received in the past, it determines that the same request has been transmitted from the information processing device 1 and discards the received request.

Thereby, the information processing device 1 according to the present embodiment can further minimize the occurrence of inconsistency in the response transmitted from the external system 3.

Details of Fourth Embodiment

Figure 44:
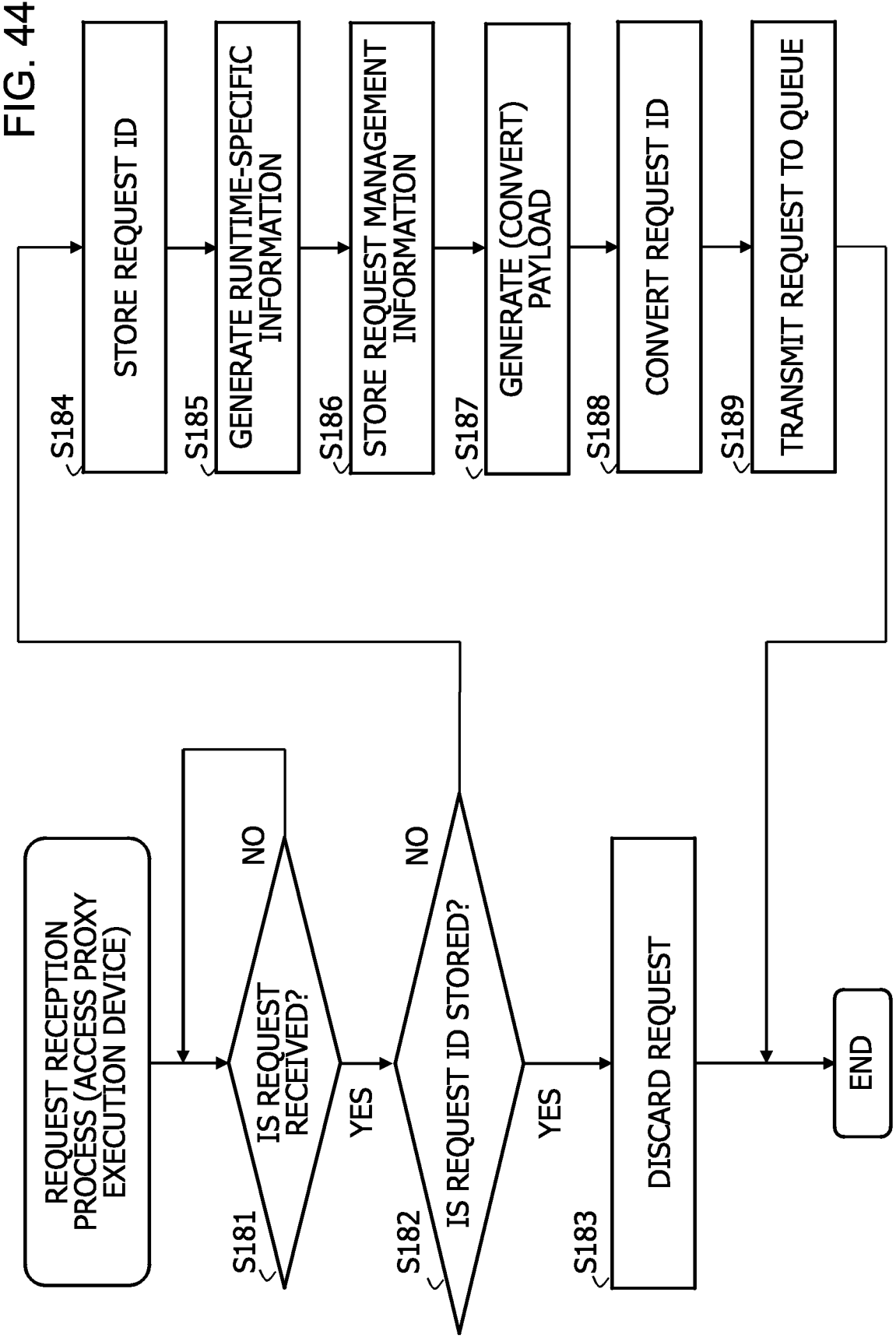
FIG. 44 and FIG. 45 are flowcharts illustrating details of the stream data process according to the fourth embodiment.
Figure 45:
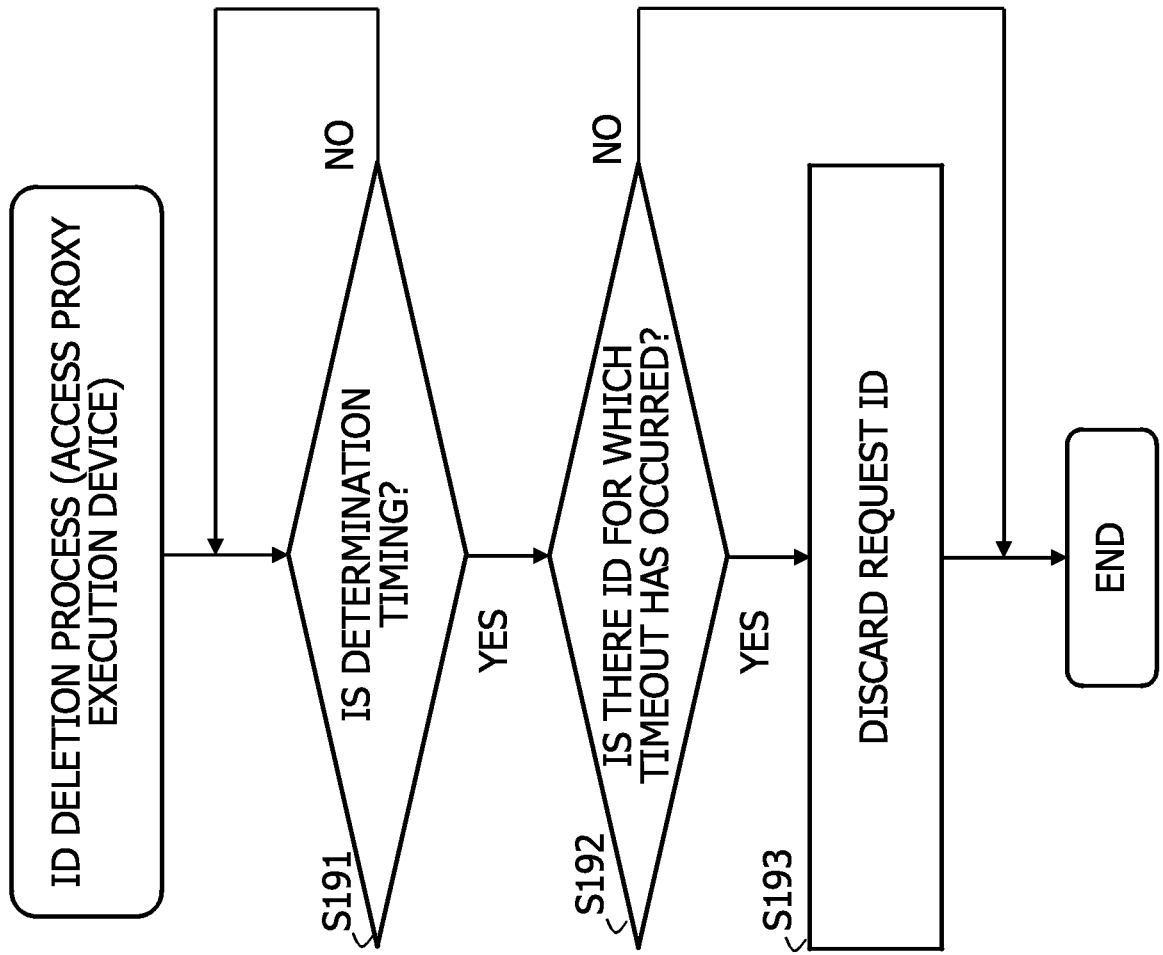

Next, details of the fourth embodiment will be described. FIG. 44 and FIG. 45 are flowcharts illustrating details of the stream data process according to the fourth embodiment. In addition, FIG. 46 is a diagram illustrating details of the stream data process according to the fourth embodiment.

Request Reception Process

Next, the request reception process according to the fourth embodiment will be described.

As illustrated in FIG. 44, for instance, the request management unit 214 waits until the request reception unit 211 receives the request transmitted from the information processing device 1 (NO in S181).

Then, when the request reception unit 211 receives the request transmitted from the information processing device 1 (YES in S181), the request management unit 214 refers to, for instance, the request ID information 232 stored in the information storage area 230, and determines whether there is the request management information 231 corresponding to the request ID included in the request received in the process of S181 (S182).

As a result, when it is determined that there is the request management information 231 corresponding to the request ID included in the request received in the process of S181 (YES in S182), the request management unit 214 discards, for instance, the request received in the process of S181 (S183).

On the other hand, when it is determined that there is no request management information 231 corresponding to the request ID included in the request received in the process of S181 (NO in S182), the request management unit 214 stores, for instance, the request ID included in the request received in the process of S181 as the request ID information 232 in the information storage area 230 (S184). Hereinafter, specific examples of the request ID information 232 will be described.

Specific Example of Request ID Information

FIG. 46 is a diagram illustrating a specific example of the request ID information 232.

In the request ID information illustrated in FIG. 46, "b0db6333-6196-4a76-ab0a-ced4d6dd9593" and "7fc986ee-49b4-4c31-b09b-2ca0ba1df969" are stored as the "request ID."

Referring again to FIG. 44, the unique information generation unit 213 generates, for instance, runtime-specific information corresponding to the request received in the process of S181 (S185).

Subsequently, the request management unit 214 stores, for instance, each information item including the runtime-specific information generated in the process of S185 as the request management information 231 in the information storage area 230 (S186).

Then, for instance, the request processing unit 215 generates (converts) a payload of the request received in the process of S181 (S187).

In addition, the identifier conversion unit 216 converts, for instance, the request ID included in the request received in the process of S181 (S188).

Then, the request transmission unit 217 transmits, for instance, the request whose request ID is converted in the process of S188 to the queue 6 (S189).

ID Deletion Process

Next, within the stream data process according to the fourth embodiment, a process of deleting a request ID included in the request ID information 232 (hereinafter referred to as an ID deletion process) will be described.

As illustrated in FIG. 45, for instance, the request management unit 214 waits until the determination timing is reached (NO in S191). The determination timing may be, for instance, a periodic timing, e.g., an interval of 1 minute.

Then, when the determination timing is reached (YES in S191), the request management unit 214 determines, for instance, whether there is a request ID in which the time elapsed since it is stored as the request ID information 232 is a predetermined time or longer among request IDs included in the request ID information 232 stored in the information storage area 230 (S192).

As a result, when it is determined that there is a request ID in which the time elapsed since it is stored as the request ID information 232 is a predetermined time or longer (YES in S192), the request management unit 214 deletes, for instance, the request ID in which the time elapsed since it is stored as the request ID information 232 is a predetermined time or longer among request IDs included in the request ID information 232 stored in the information storage area 230 (S193).

On the other hand, when it is determined that there is no request ID in which the time elapsed since it is stored as the request ID information 232 is a predetermined time or longer (NO in S192), the request management unit 214 does not perform the process of S193.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing system comprising:
a first information processing device; and
a second information processing device,
the first information processing device including:
a first memory; and
a first processor coupled to the first memory and the first processor configured to:
execute, in response to received data to be processed, a task for the received data, and
transmit a first processing request of a first process executed for a specific information processing system to a second information processing device as the task for the received data is executed; and
the second information processing device including:
a second memory; and
a second processor coupled to the second memory and the second processor configured to:
generate a first conversion identifier by adding a first additional identifier indicating a generation timing of the first conversion identifier to a first identifier included in the first processing request, in response to receiving the first processing request,
transmit the first processing request including the generated first conversion identifier to the specific information processing system,
divide the first conversion identifier included in a first execution result of the first process corresponding to the first processing request into the first identifier and the first additional identifier, in response to receiving the first execution result, and
transmit the first execution result including the divided first identifier and the divided first additional identifier to the first information processing device.

2. The data processing system according to claim 1, wherein the second processor
generates a second conversion identifier by adding a second additional identifier indicating a generation timing of the second conversion identifier to a second identifier included in a second processing request of a second process executed for the specific information processing system as the task for the received data is executed, in response to receiving the second processing request,
transmits the second processing request including the generated second conversion identifier to the specific information processing system,
divides the second conversion identifier included in a second execution result of the second process corresponding to the second processing request into the second identifier and the second additional identifier in response to receiving the second execution result, and
transmits the second execution result including the divided second identifier and the divided second additional identifier to the first information processing device, and
wherein the first processor
determines whether the first identifier and the second identifier are same in response to receiving the first execution result and the second execution result,
determines whether the first additional identifier and the second additional identifier are same when determination is made that the first identifier and the second identifier are the same, and
discards either the first execution result or the second execution result when determination is made that the first additional identifier and the second additional identifier are different from each other.

3. The data processing system according to claim 2, wherein, when determination is made that the first additional identifier and the second additional identifier are different from each other, the first processor compares a receiving timing of the first execution result and a receiving timing of the second execution result, discards the first execution result when the first execution result is received after the second execution result, and discards the second execution result when the second execution result is received after the first execution result.

4. The data processing system according to claim 2, wherein the first additional identifier is a time stamp indicating a time when the second processor receives the first processing request, and
wherein the second additional identifier is a time stamp indicating a time when the second processor receives the second processing request.

5. The data processing system according to claim 2, wherein the second processor transmits to the first information processing device the first execution result including the first identifier and a transmission order of the first execution result from the specific information processing system.

6. The data processing system according to claim 5, wherein the second processor transmits to the first information processing device the second execution result including the second identifier and a transmission order of the second execution result from the specific information processing system, and
wherein the first processor determines
whether the first identifier and the second identifier are same in response to receiving the first execution result and the second execution result,
compares the transmission order corresponding to the first execution result with the transmission order corresponding to the second execution result when determination is made that the first identifier and the second identifier are the same, and
discards the second execution result when the second execution result is received after the first execution result and the transmission order corresponding to the second execution result is not after the transmission order corresponding to the first execution result.

7. The data processing system according to claim 2, wherein the second processor
stores the first identifier included in the first processing request in a storage in response to receiving the first processing request,
determines whether the first identifier stored in the storage and the second identifier included in the second processing request are same, in response to receiving the second processing request, and
discards the second processing request without transmitting the second processing request to the specific information processing system when determination is made that the first identifier and the second identifier are the same.

8. The data processing system according to claim 1, wherein, when the second processor receives the first execution result before the first processing request, the second processor waits until the first processing request is received.

9. A non-transitory computer-readable storage medium storing therein a data processing program that causes an information processing device to execute a process comprising:

generating a first conversion identifier by adding a first additional identifier indicating a generation timing of the first conversion identifier to a first identifier included in a first processing request of a first process, in response to receiving the first processing request for a specific information processing system from an other information processing device;
transmitting the first processing request including the generated first conversion identifier to the specific information processing system;
dividing the first conversion identifier included in a first execution result of the first process corresponding to the first processing request into the first identifier and the first additional identifier, in response to receiving the first execution result; and
transmitting the first execution result including the divided first identifier and the divided first additional identifier to the other information processing device.

10. A non-transitory computer-readable storage medium storing therein a data processing program that causes a first information processing device, among plurality of information processing devices, to execute a process comprising:
executing a task for received data in response to receiving data to be processed;
transmitting a first processing request of a first process for a specific information processing system to a second information processing device among the plurality of information processing devices, as the task for the received data is executed;
transmitting a second processing request of a second process for the specific information processing system to the second information processing device as the task for the received data is executed;
determining whether a first identifier included in the first processing request and a second identifier included in the second processing request are same in response to receiving, from the second information processing device, a first execution result of the first process corresponding to the first processing request including a first conversion identifier generated by adding a first additional identifier indicating a generation timing of the first conversion identifier to the first identifier included in the first processing request by the second information processing device and a second execution result of second process corresponding to the second processing request including a second conversion identifier generated by adding a second additional identifier indicating a generation timing of the second conversion identifier to the second identifier included in the second processing request by the second information processing device;
determining whether the first additional identifier and the second additional identifier are same when determination is made that the first identifier and the second identifier are the same; and
discarding either the first execution result or the second execution result when determination is made that the first additional identifier and the second additional identifier are different from each other.

* * * * *